US010097725B2

(12) United States Patent
Kim et al.

(10) Patent No.: US 10,097,725 B2
(45) Date of Patent: Oct. 9, 2018

(54) IMAGE FORMING APPARATUS, AND POSITION GUIDANCE METHOD AND IMAGE FORMING SYSTEM THEREFOR

(71) Applicant: S-Printing Solution Co., Ltd., Suwon-si, Gyeonggi-do (KR)

(72) Inventors: Jin Sil Kim, Suwon-si (KR); Jin Ha Jun, Seoul (KR); Dae Hyun Kim, Yongin-si (KR); Yun Mo Kim, Suwon-si (KR)

(73) Assignee: S-Printing Solution Co., Ltd., Suwon-si (KR)

( * ) Notice: Subject to any disclaimer, the term of this patent is extended or adjusted under 35 U.S.C. 154(b) by 0 days.

(21) Appl. No.: 15/322,642

(22) PCT Filed: Jun. 24, 2015

(86) PCT No.: PCT/KR2015/006445
§ 371 (c)(1),
(2) Date: Dec. 28, 2016

(87) PCT Pub. No.: WO2016/003108
PCT Pub. Date: Jan. 7, 2016

(65) Prior Publication Data
US 2017/0134606 A1   May 11, 2017

(30) Foreign Application Priority Data

Jul. 1, 2014   (KR) .................. 10-2014-0081880

(51) Int. Cl.
*H04N 1/32* (2006.01)
*H04N 1/00* (2006.01)
(Continued)

(52) U.S. Cl.
CPC ..... *H04N 1/32117* (2013.01); *H04N 1/00106* (2013.01); *H04N 1/00244* (2013.01); *H04N 1/00307* (2013.01); *H04N 1/00315* (2013.01); *H04N 1/00323* (2013.01); *H04N 1/32539* (2013.01); *H04N 1/32776* (2013.01); *H04W 4/023* (2013.01); *H04N 2201/0055* (2013.01); *H04N 2201/0075* (2013.01);
(Continued)

(58) Field of Classification Search
CPC .................................................. H04N 1/32117
USPC ........................................................ 358/1.15
See application file for complete search history.

(56) References Cited

U.S. PATENT DOCUMENTS

2002/0161547 A1   10/2002  Fidler
2004/0003098 A1    1/2004  Coffy et al.
(Continued)

FOREIGN PATENT DOCUMENTS

CN    1650594    8/2005
CN    103890748  6/2014
(Continued)

*Primary Examiner* — Jacky X Zheng
(74) *Attorney, Agent, or Firm* — Jefferson IP Law, LLP

(57) ABSTRACT

An image forming apparatus may include a communication unit configured to communicate with a portable electronic device and a controller configured to receive a location-related information that includes information about distances between the portable electronic device and a plurality of beacons, and store a location of the portable electronic device to register a location of the image forming apparatus.

11 Claims, 34 Drawing Sheets

(51) Int. Cl.
*H04N 1/327* (2006.01)
*H04W 4/02* (2018.01)

(52) U.S. Cl.
CPC .......... *H04N 2201/0094* (2013.01); *H04N 2201/3205* (2013.01); *H04N 2201/3253* (2013.01); *H04N 2201/3273* (2013.01); *H04N 2201/3278* (2013.01)

(56) References Cited

U.S. PATENT DOCUMENTS

| | | |
|---|---|---|
| 2005/0136845 A1 | 6/2005 | Masuoka et al. |
| 2009/0143080 A1 | 6/2009 | Brede et al. |
| 2010/0245886 A1 | 9/2010 | Okajima et al. |
| 2012/0127523 A1* | 5/2012 | Terashita .............. G06F 3/1203 358/1.15 |
| 2013/0091309 A1 | 4/2013 | Bjontegard et al. |
| 2015/0378296 A1* | 12/2015 | Kim .................. G03G 15/5091 399/80 |
| 2016/0360477 A1* | 12/2016 | Saeki ...................... B41J 29/00 |

FOREIGN PATENT DOCUMENTS

| | | | |
|---|---|---|---|
| JP | 2012-113349 A | 6/2012 |
| KR | 10-2001-0041081 A | 5/2001 |
| KR | 10-2013-0047386 A | 5/2013 |
| KR | 10-2014-0079397 A | 6/2014 |

* cited by examiner

[Fig. 1]
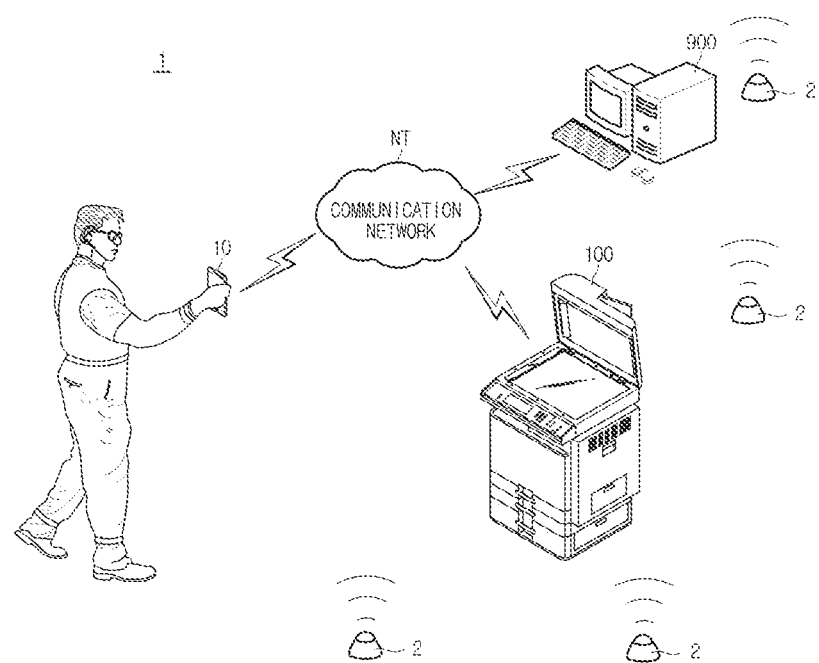

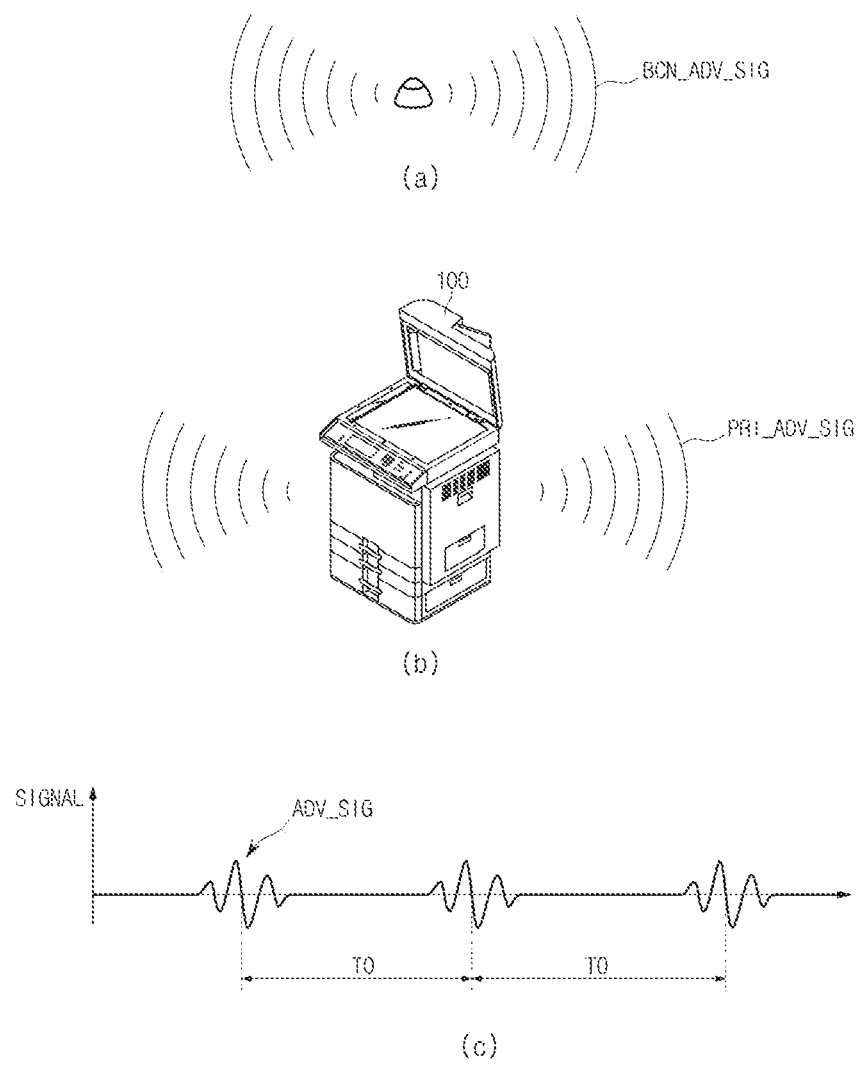
[Fig. 2]

[Fig. 3]
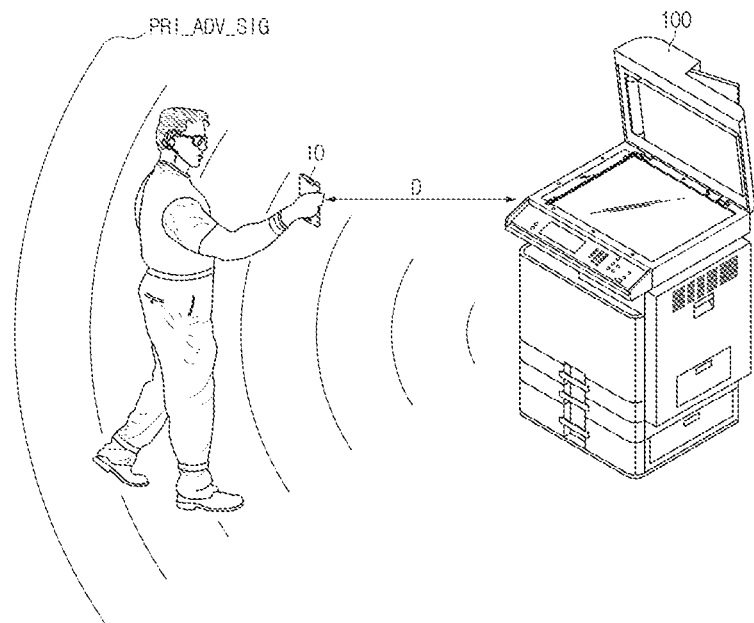
[Fig. 4]
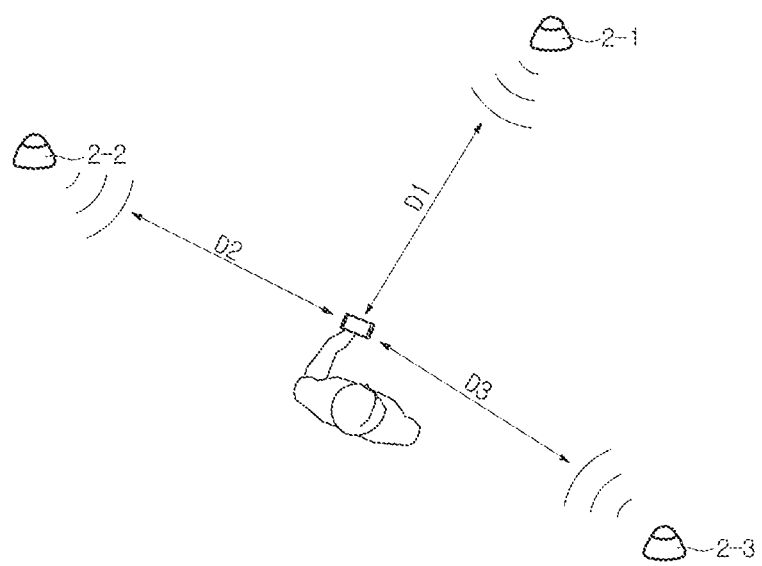

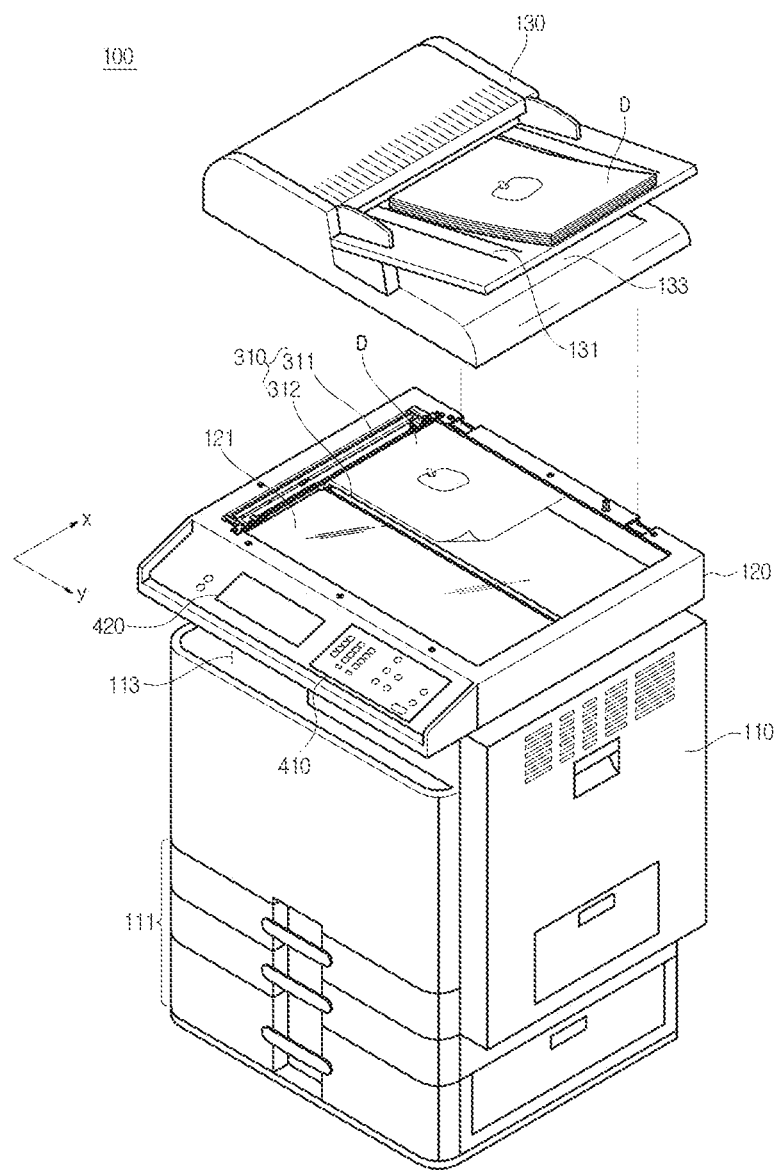
[Fig. 5]

[Fig. 6]
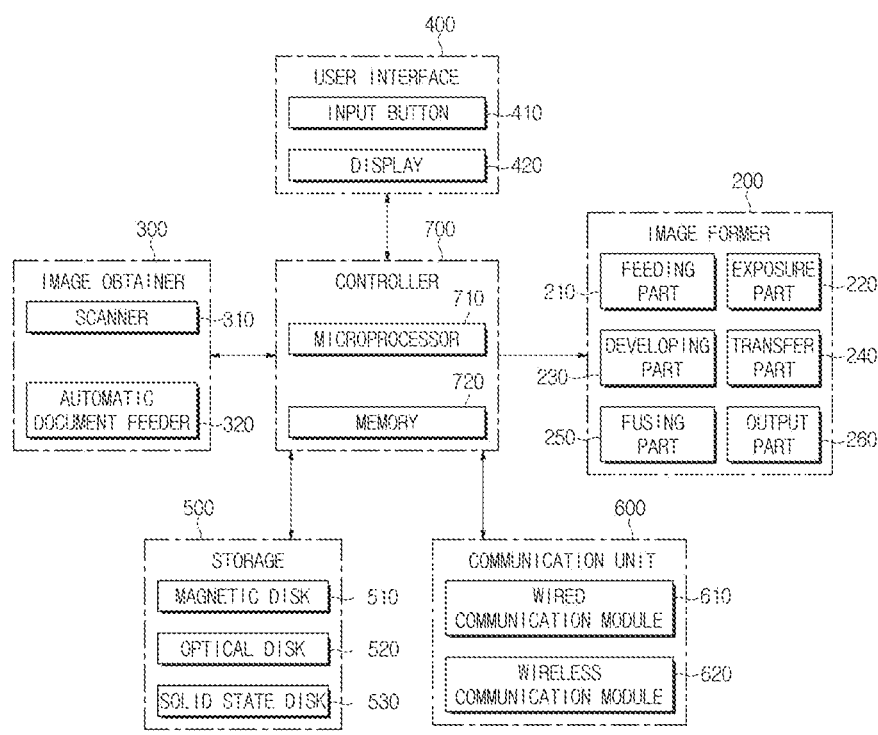

[Fig. 7]
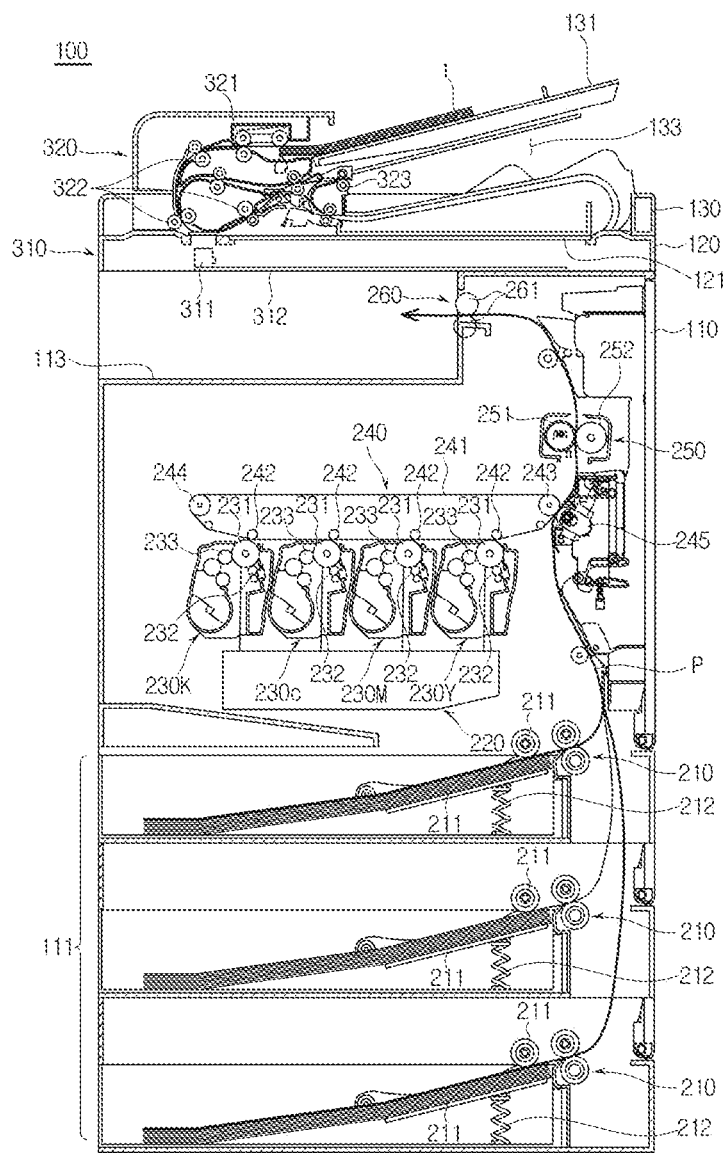

[Fig. 8]
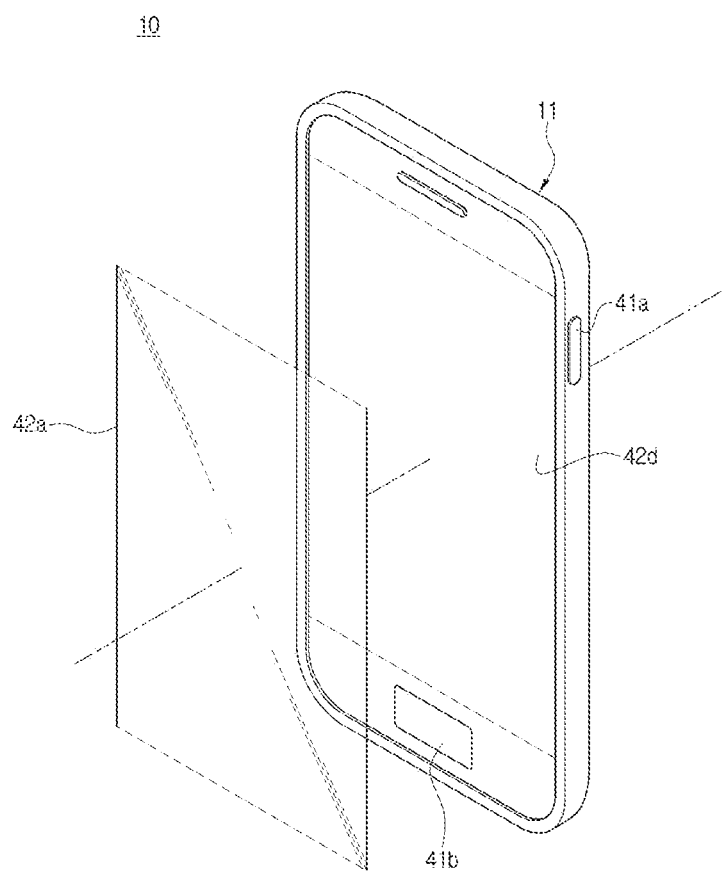

[Fig. 9]
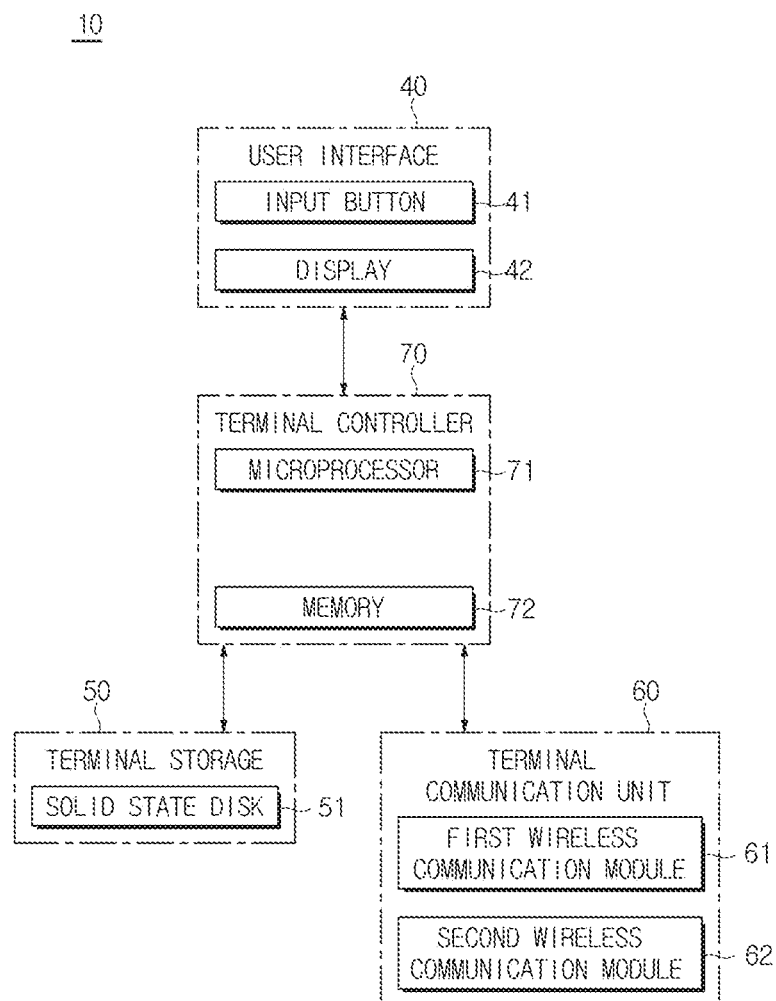

[Fig. 10]
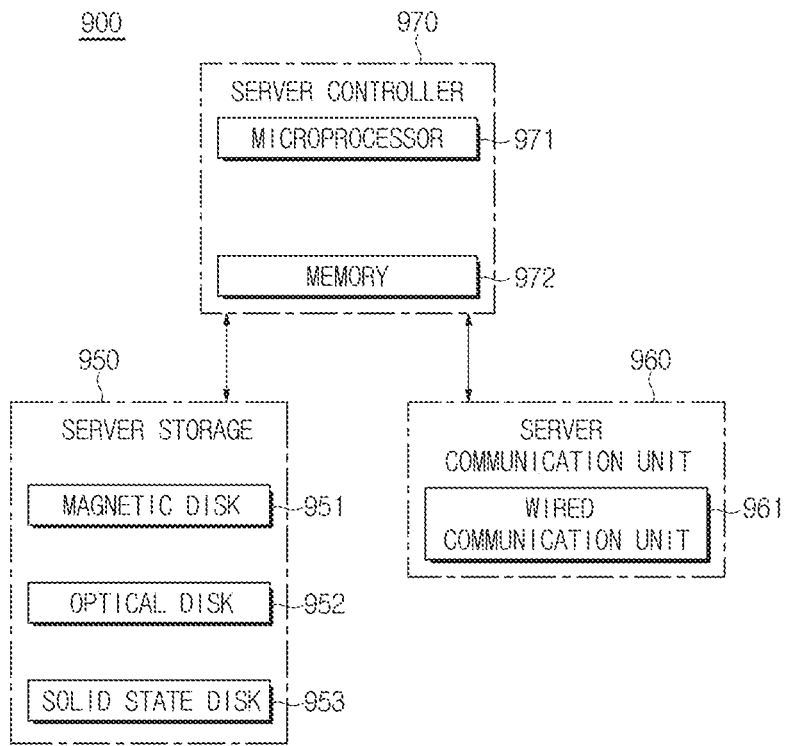
[Fig. 11]
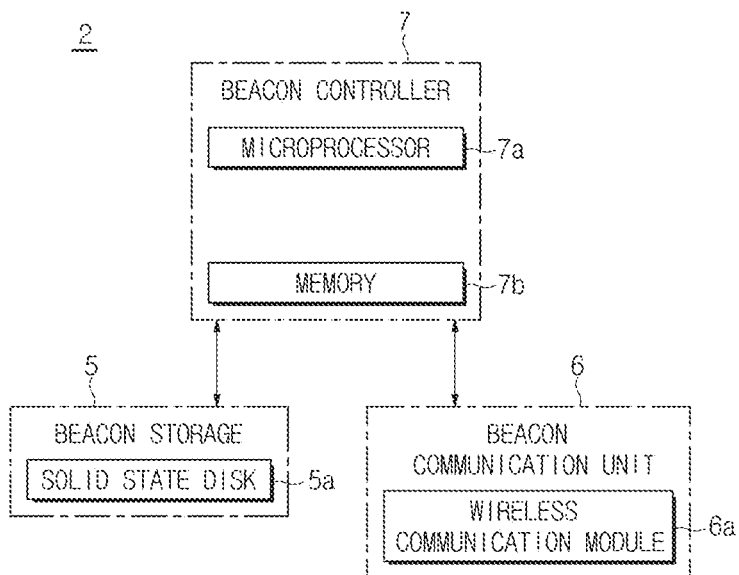

[Fig. 12]
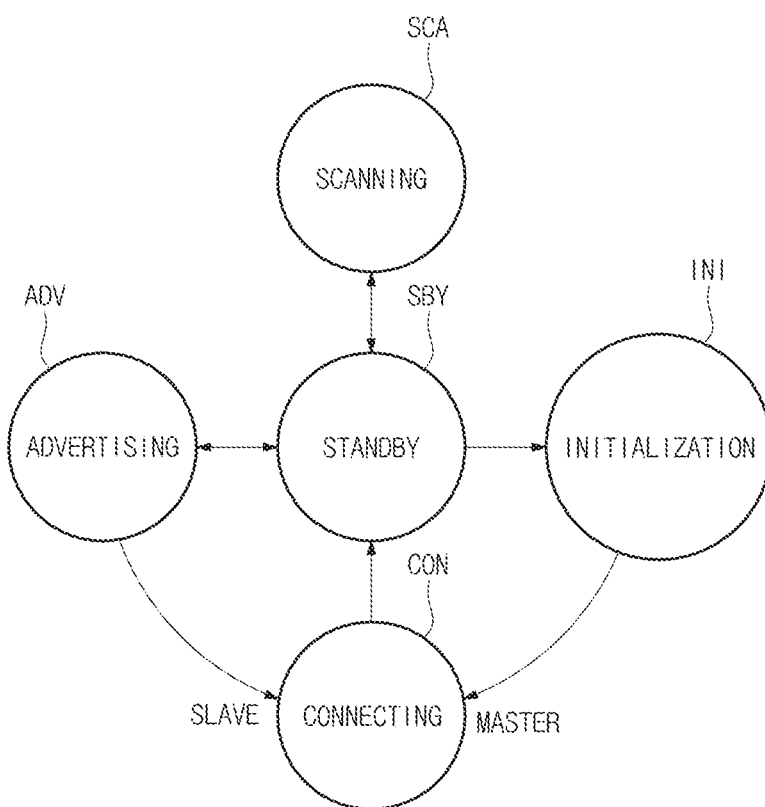

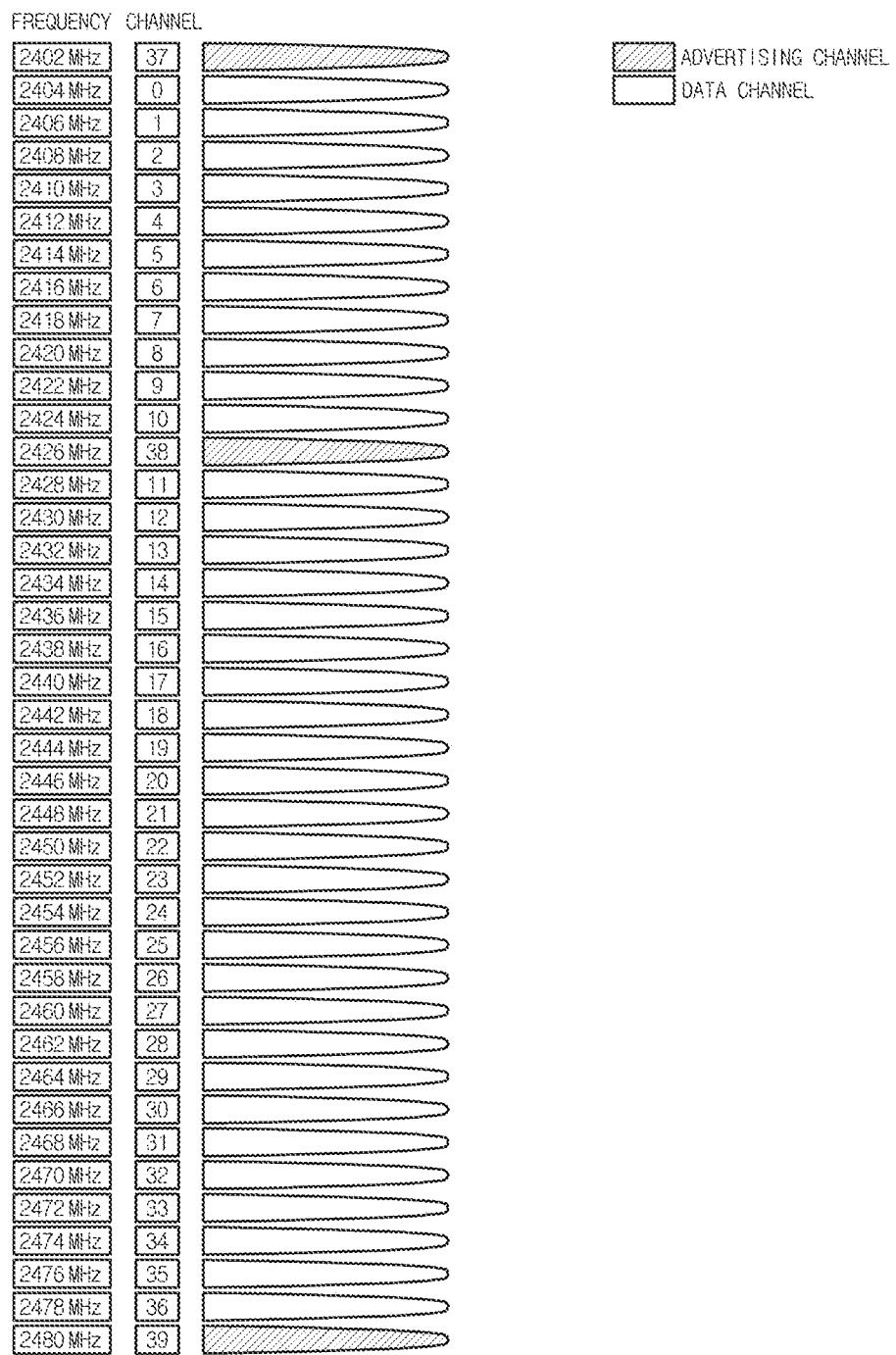
[Fig. 13]

[Fig. 14]
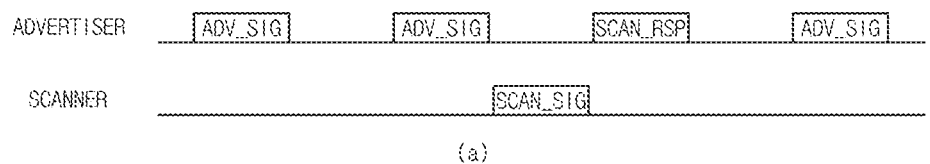
(a)
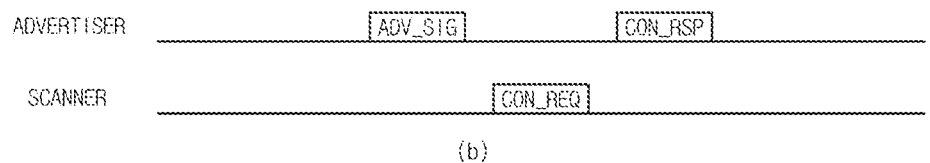
(b)
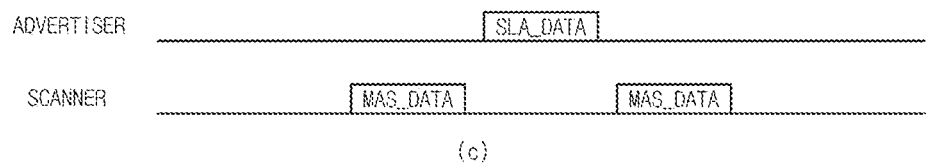
(c)
[Fig. 15]
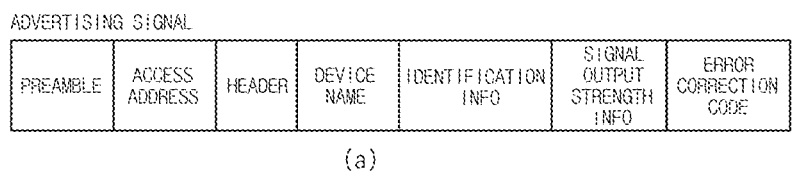
(a)
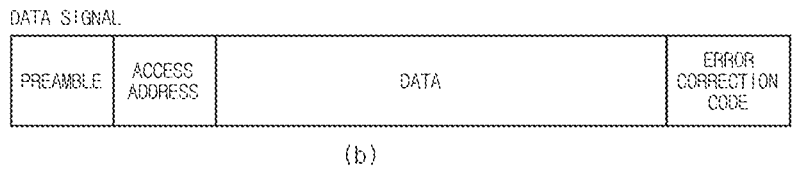
(b)

[Fig. 16]
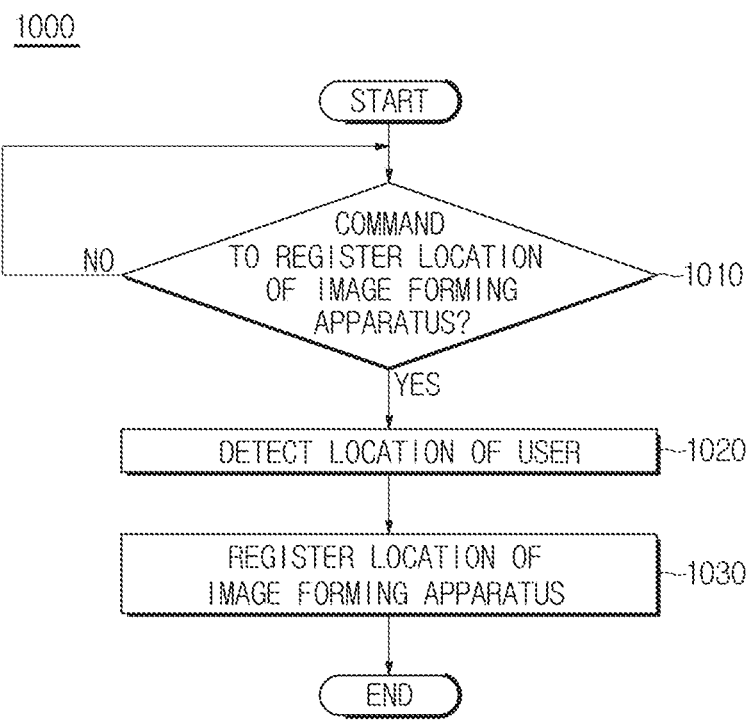

[Fig. 17]
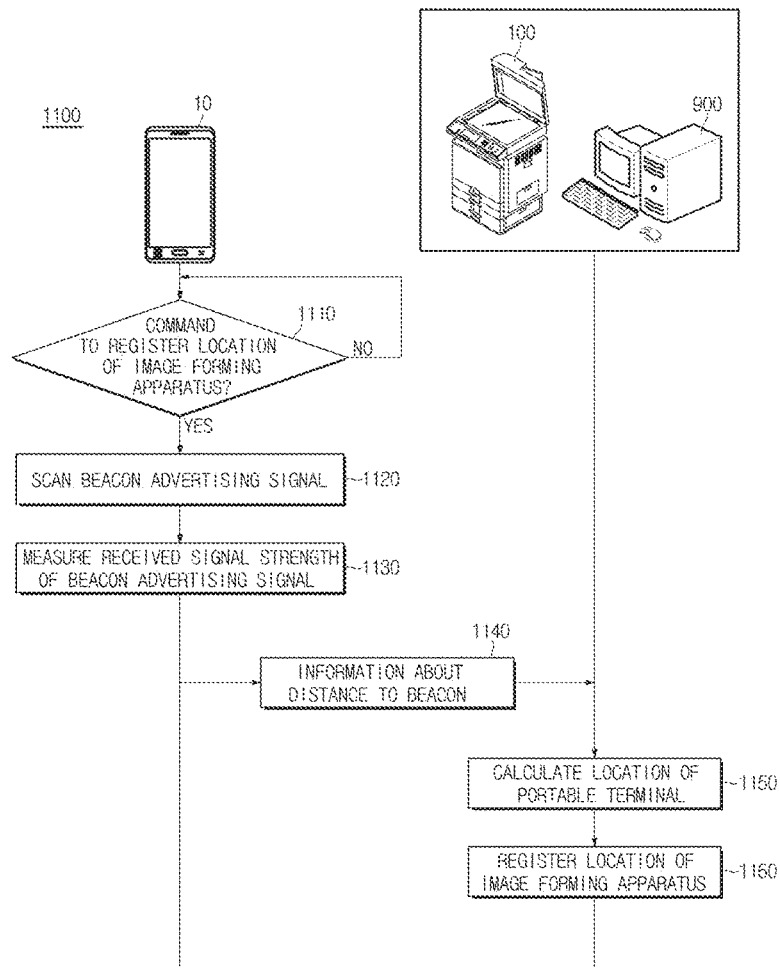
[Fig. 18]
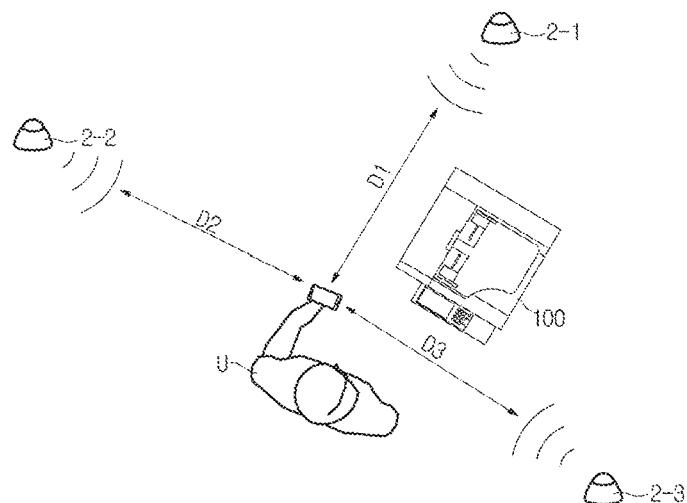

[Fig. 19]
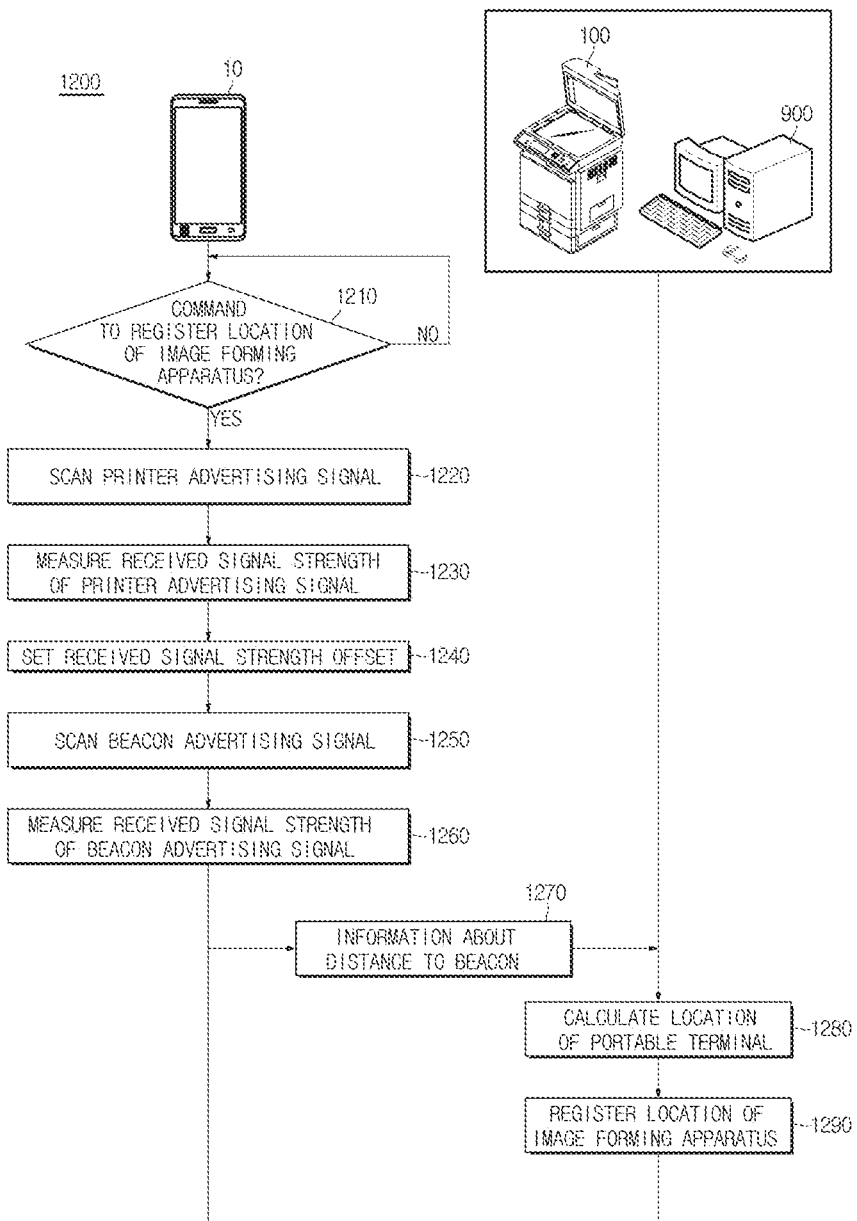

[Fig. 20]
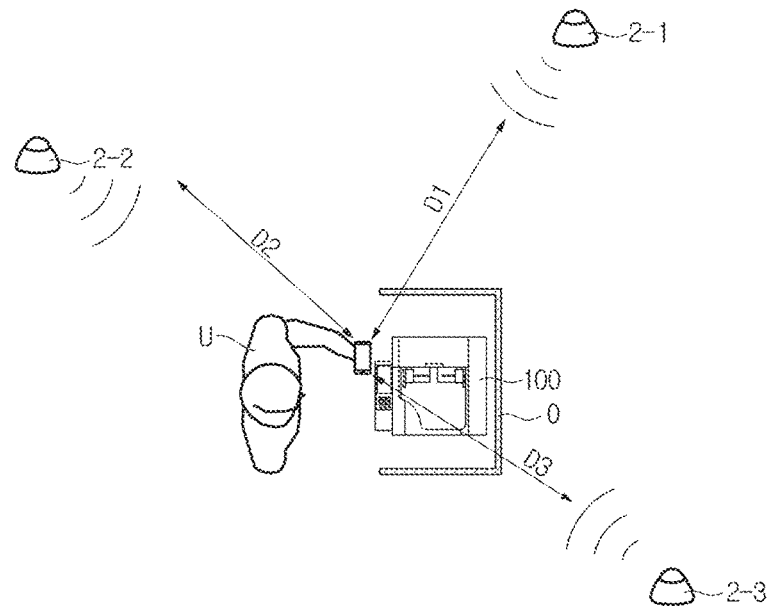
[Fig. 21]
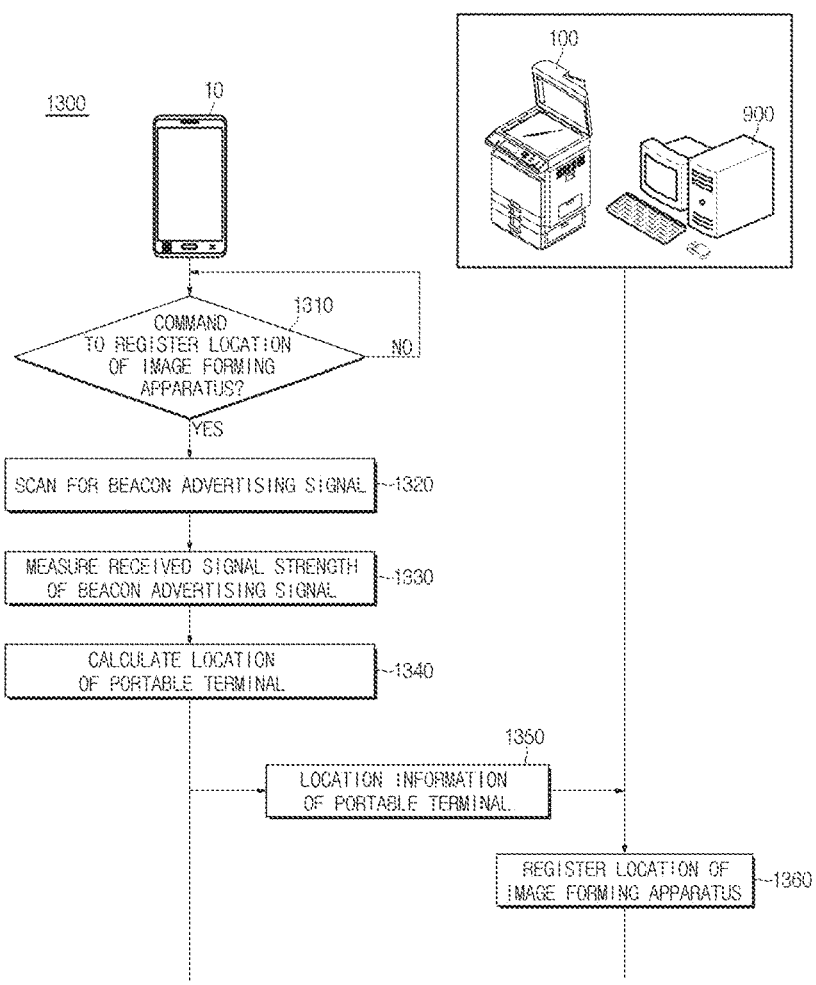

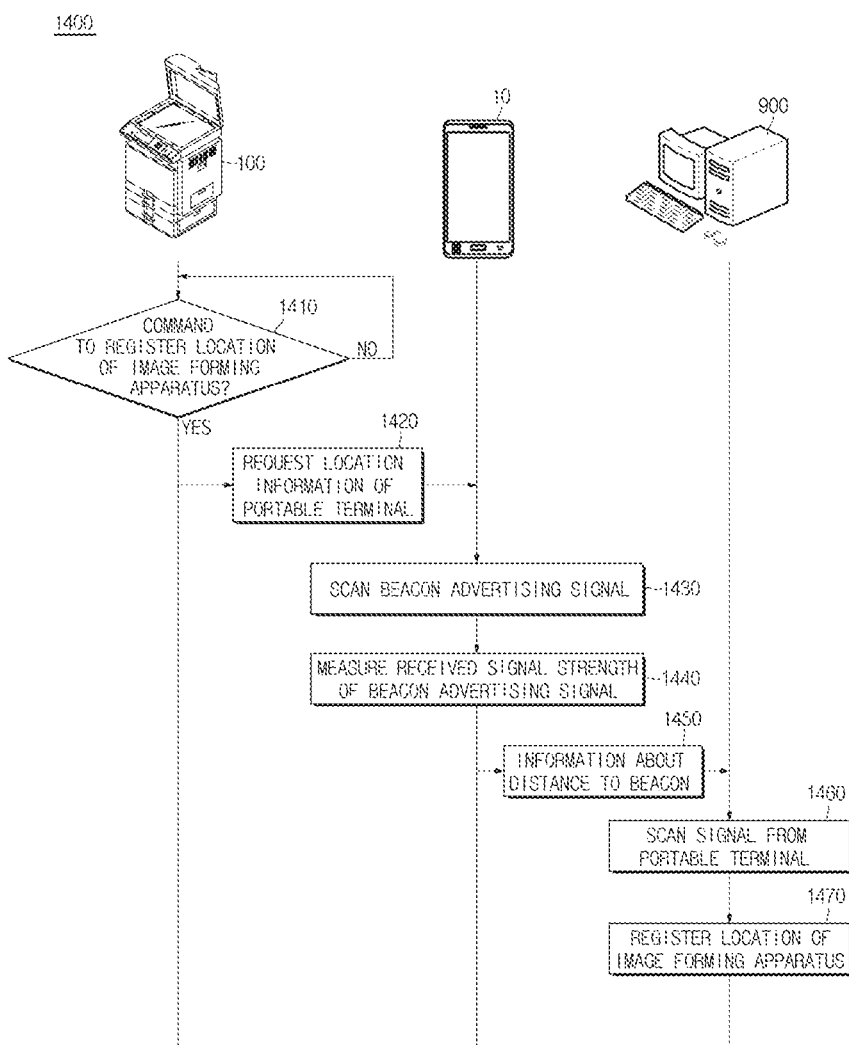

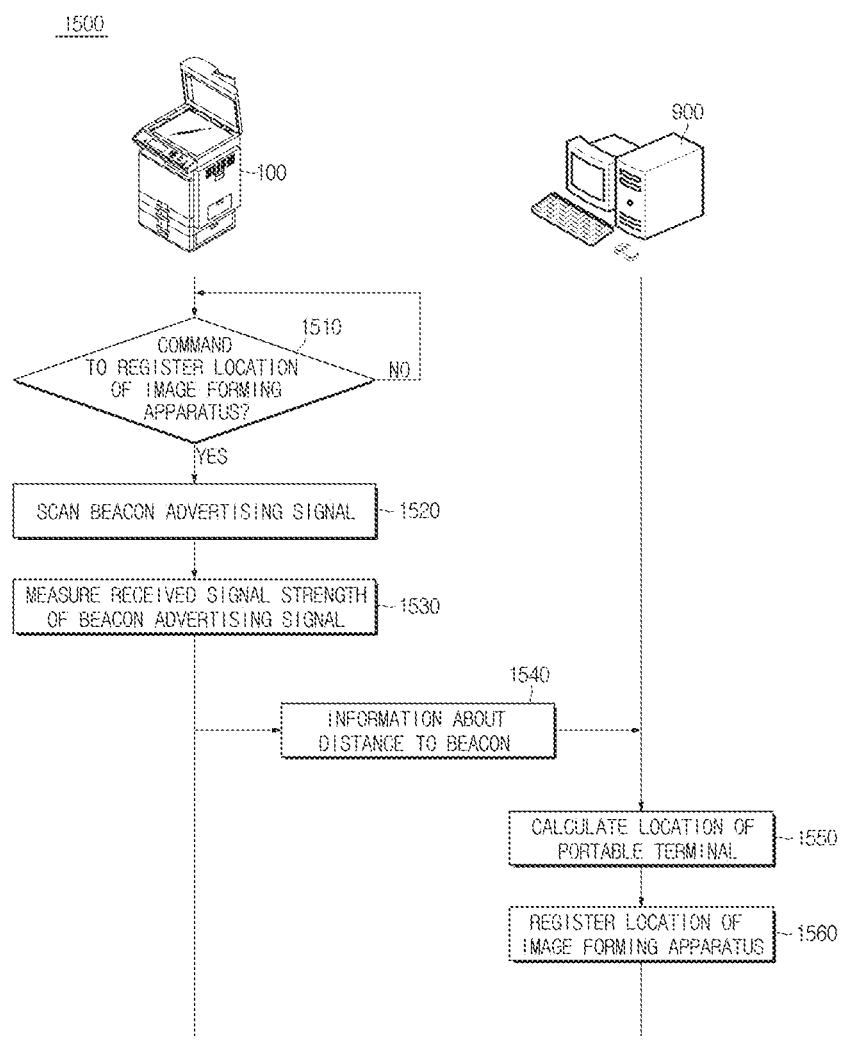
[Fig. 23]

[Fig. 24]
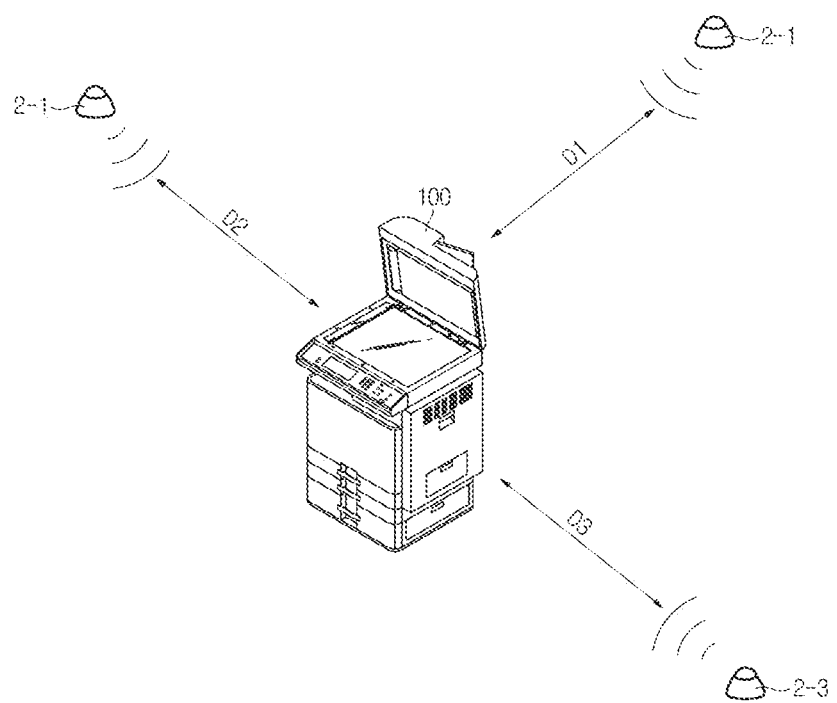

[Fig. 25]
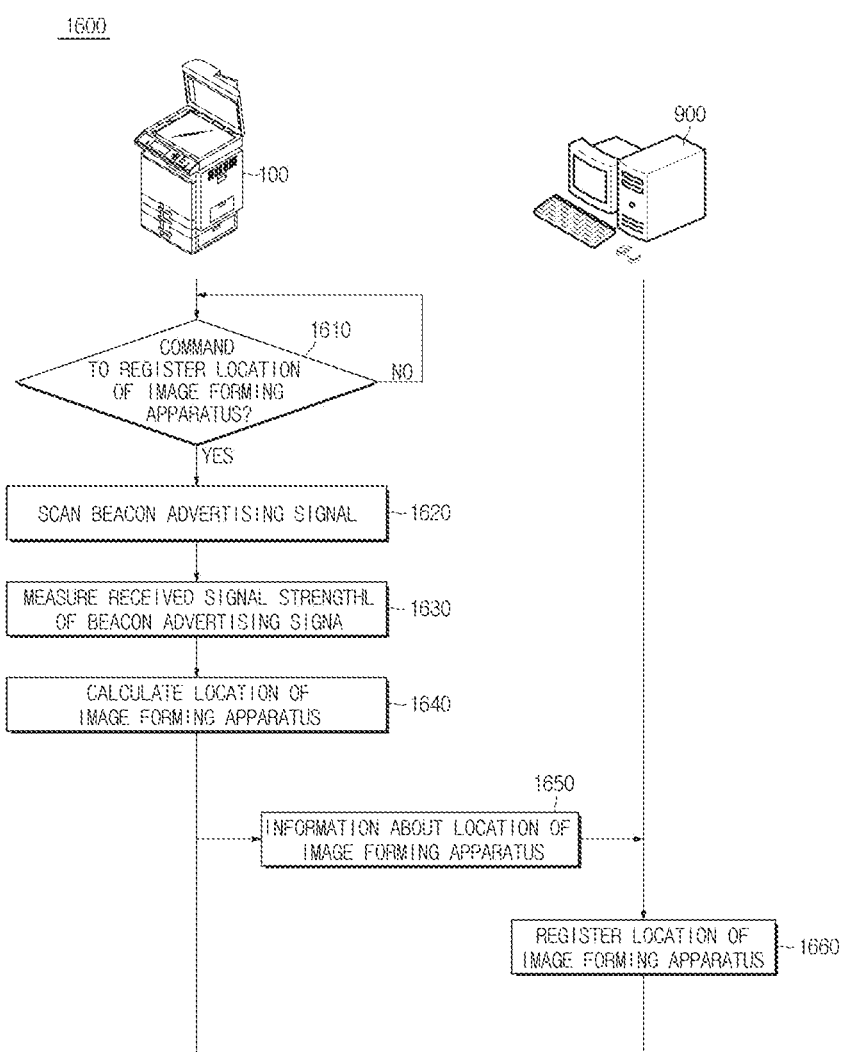

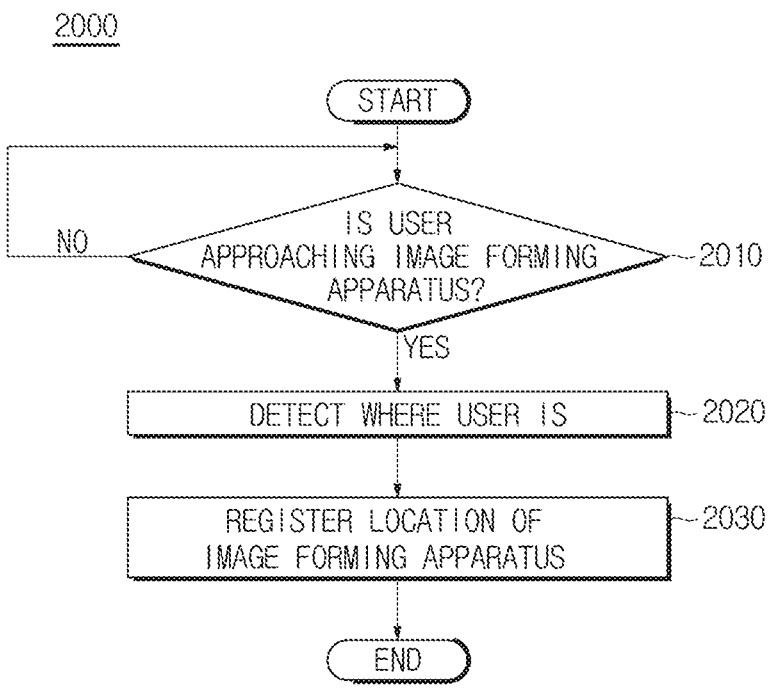
[Fig. 26]

[Fig. 27]
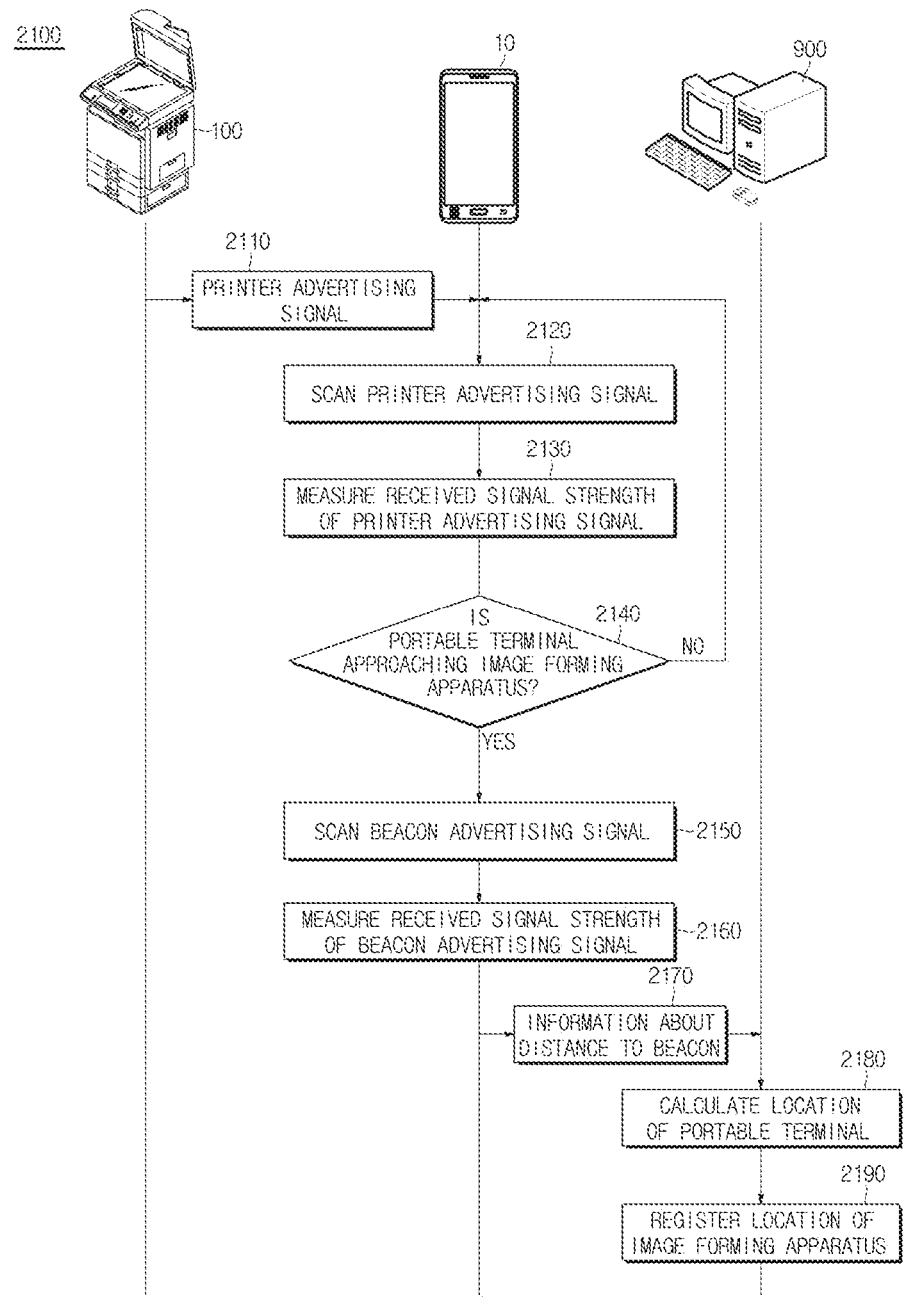

[Fig. 28]
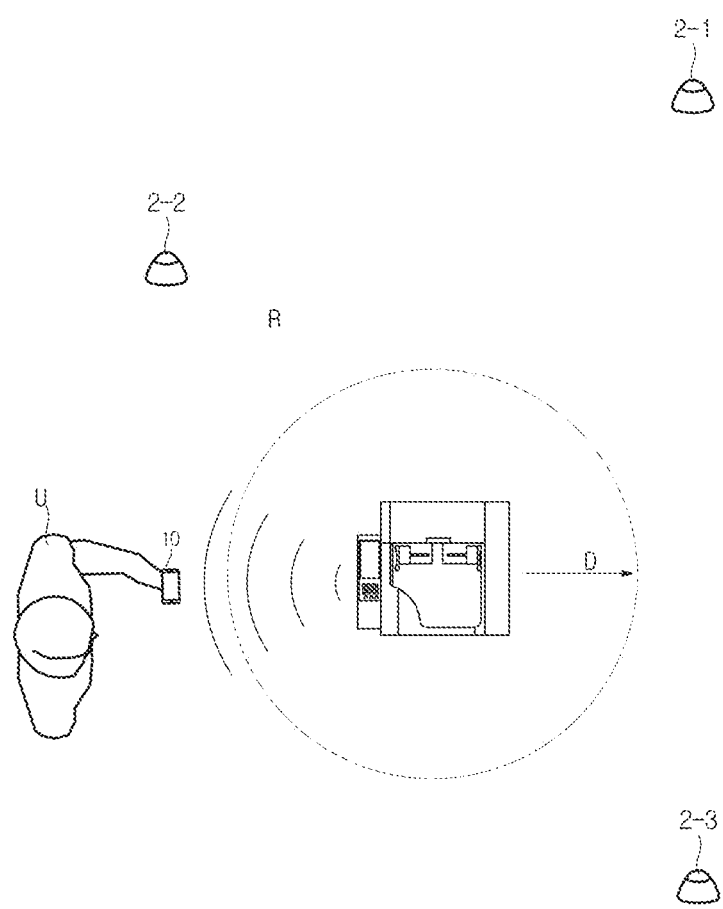

[Fig. 29]
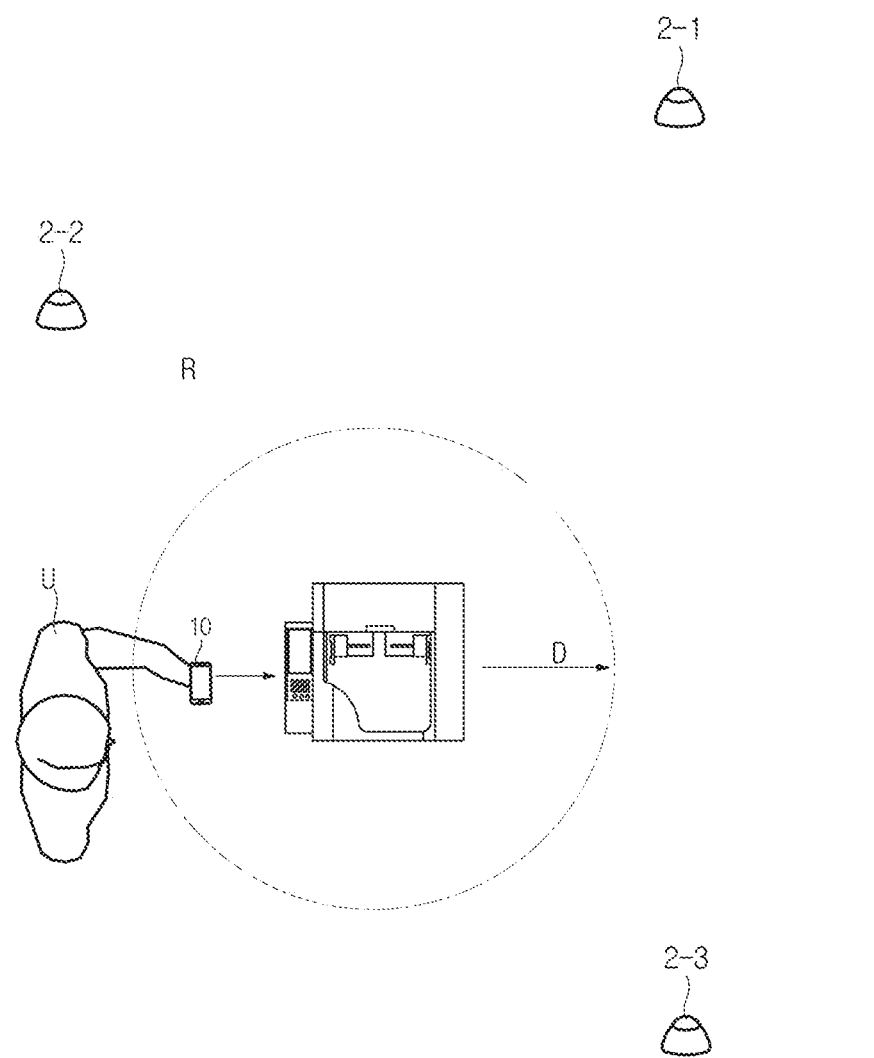

[Fig. 30]
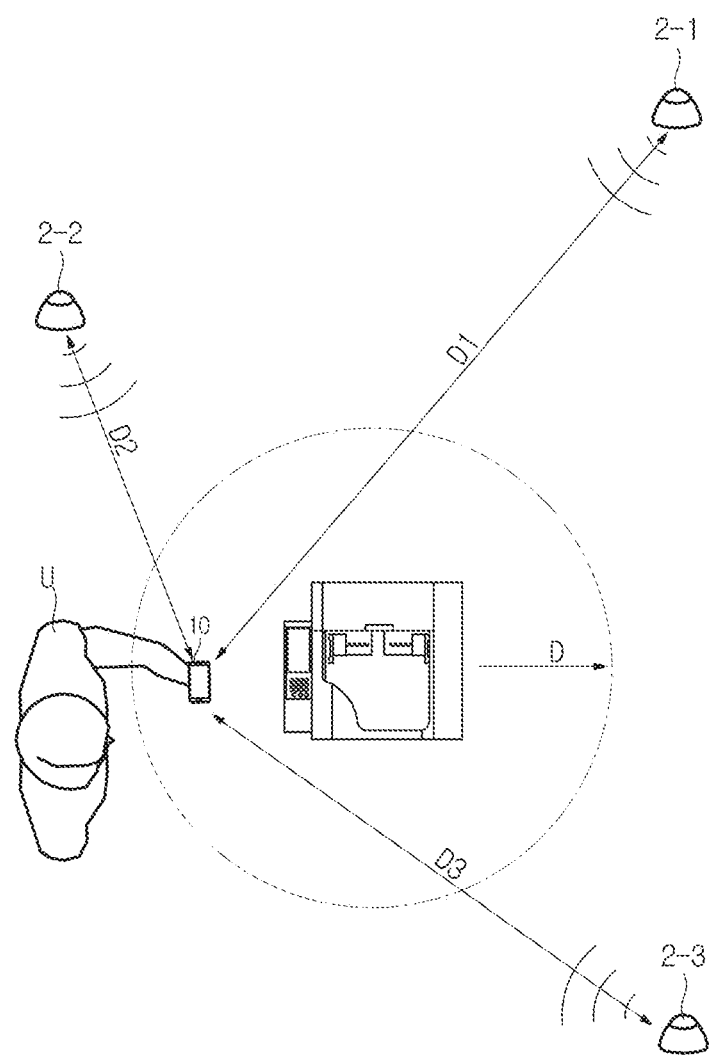

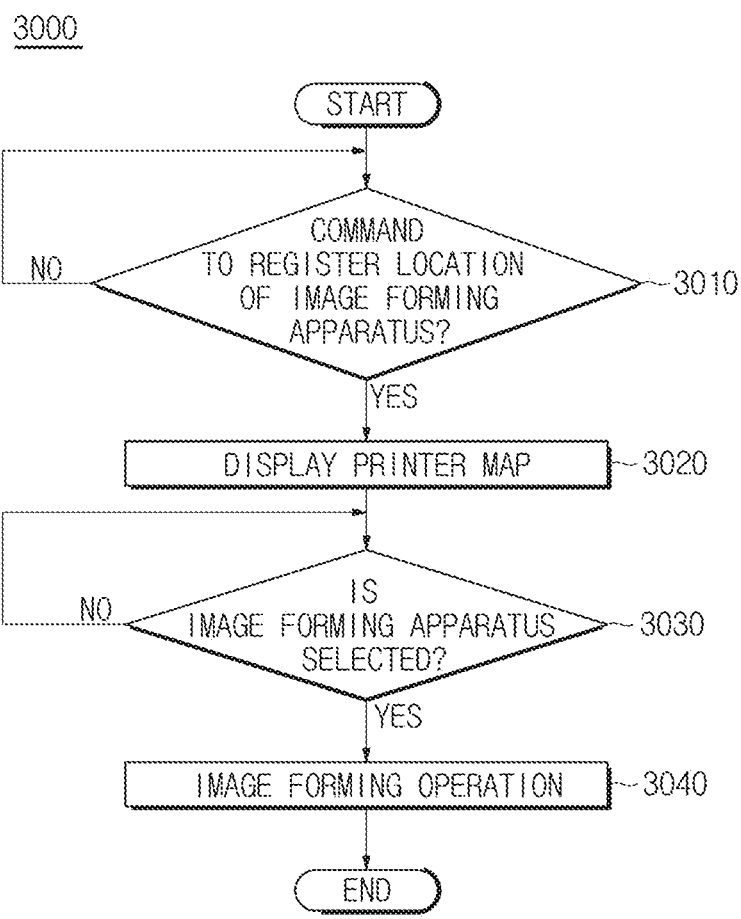
[Fig. 31]

[Fig. 32]
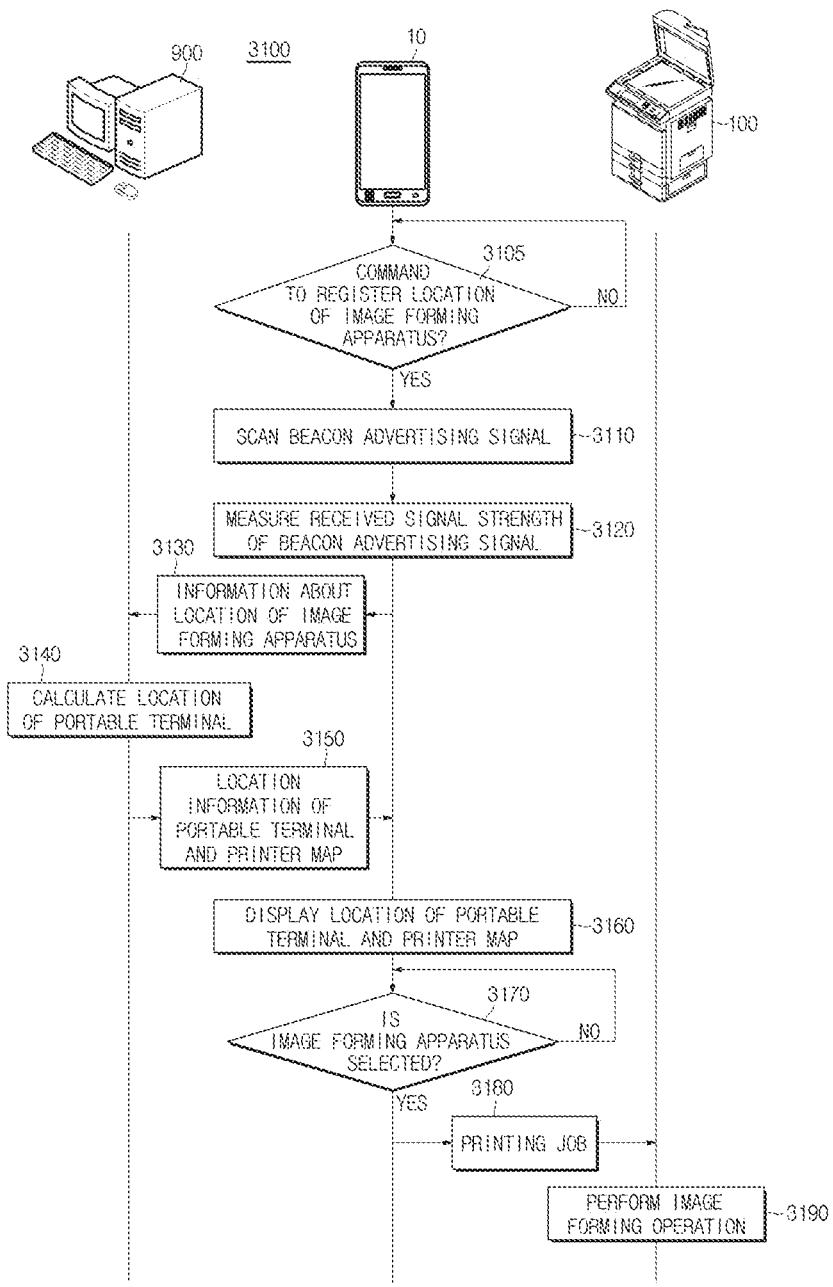

[Fig. 33]
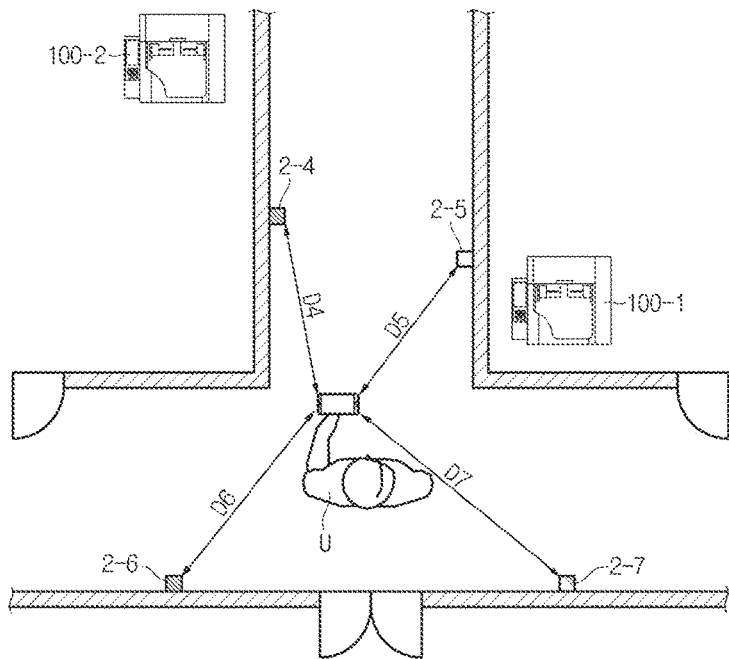
[Fig. 34]
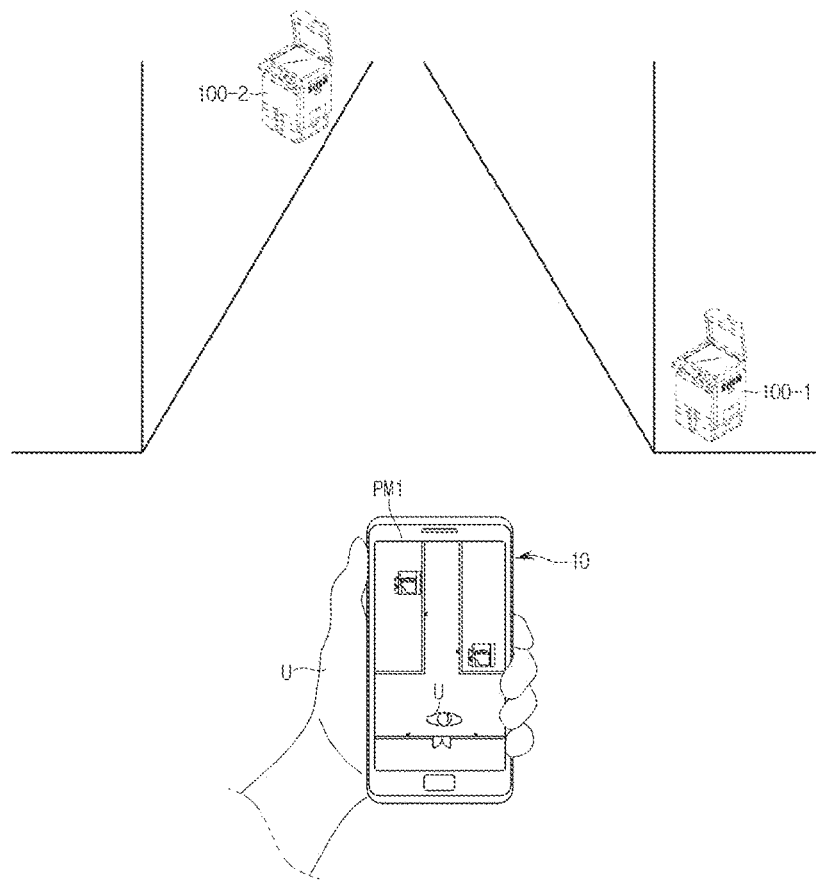

[Fig. 35]
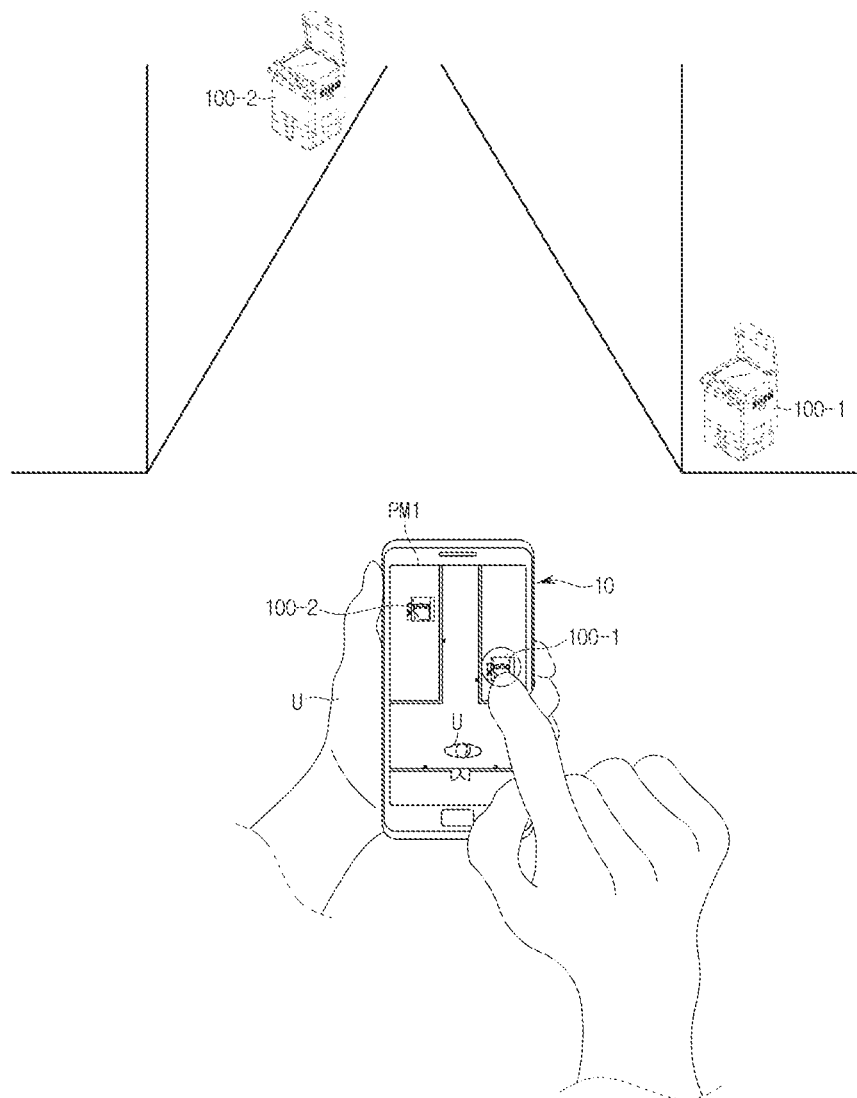

[Fig. 36]
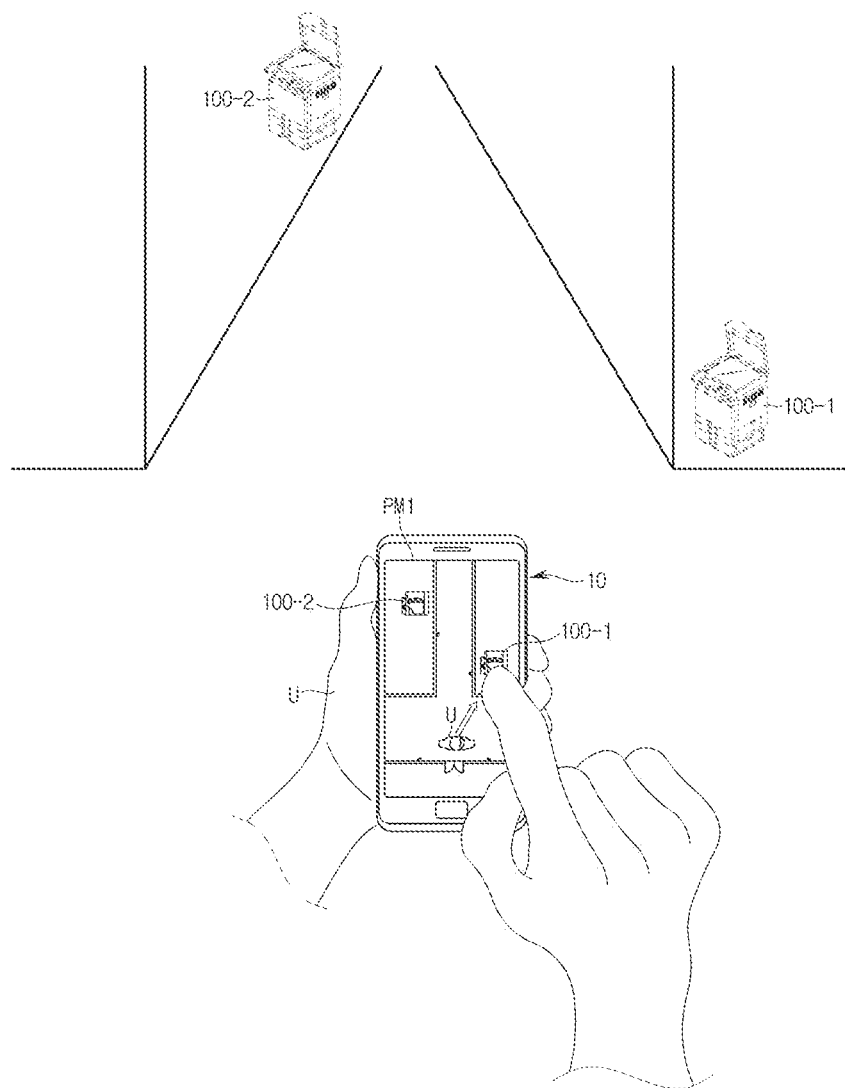

[Fig. 37]
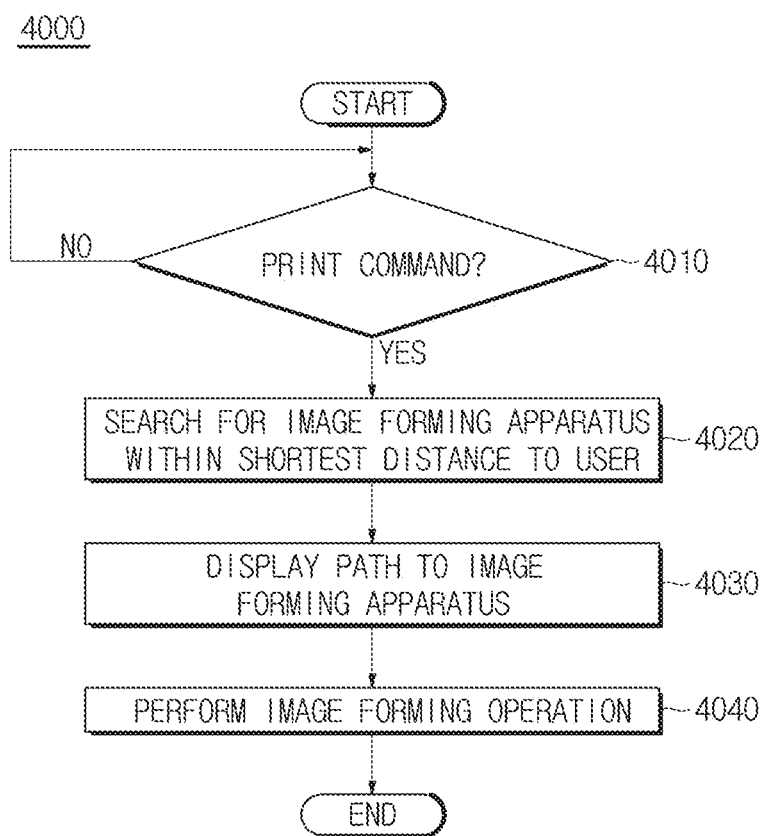

[Fig. 38]
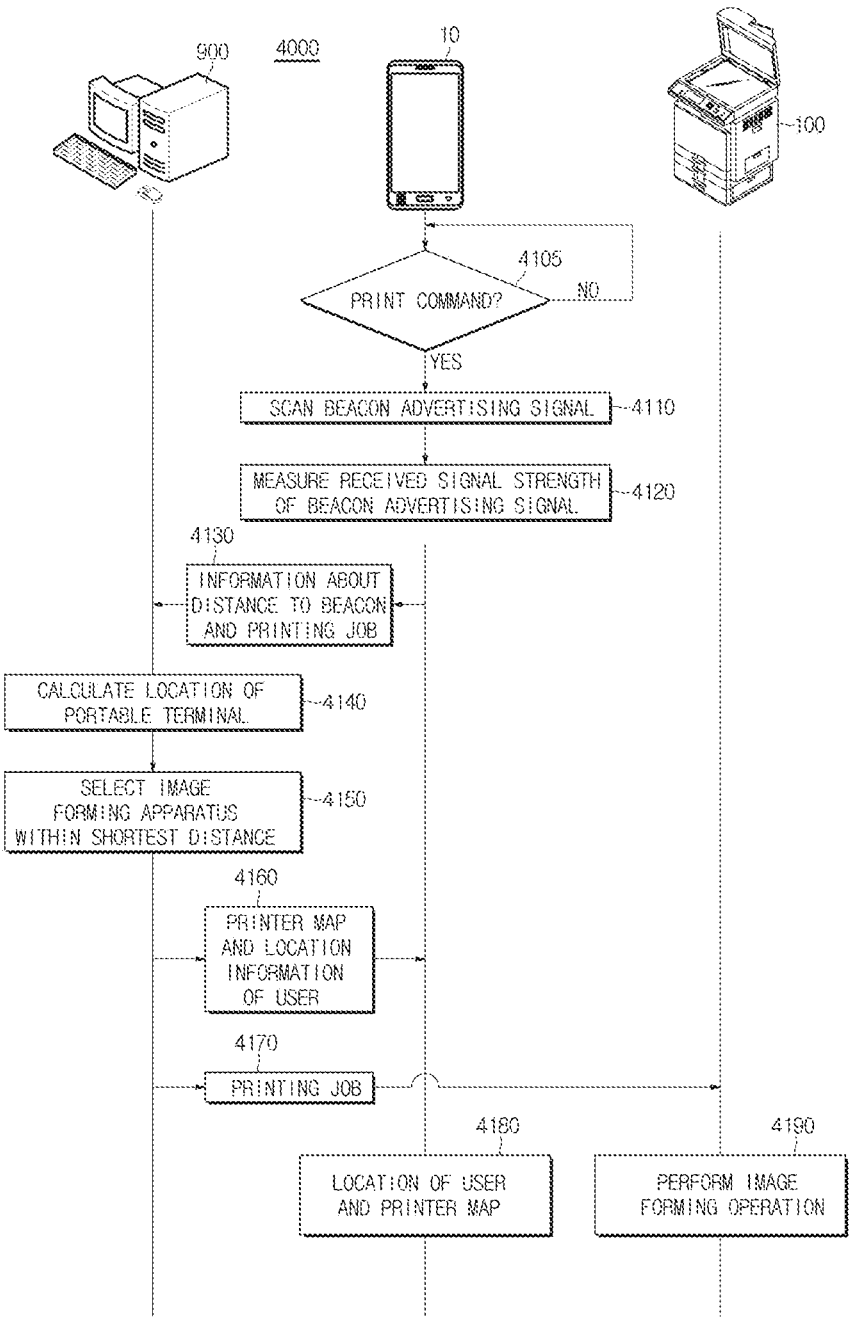

[Fig. 39]
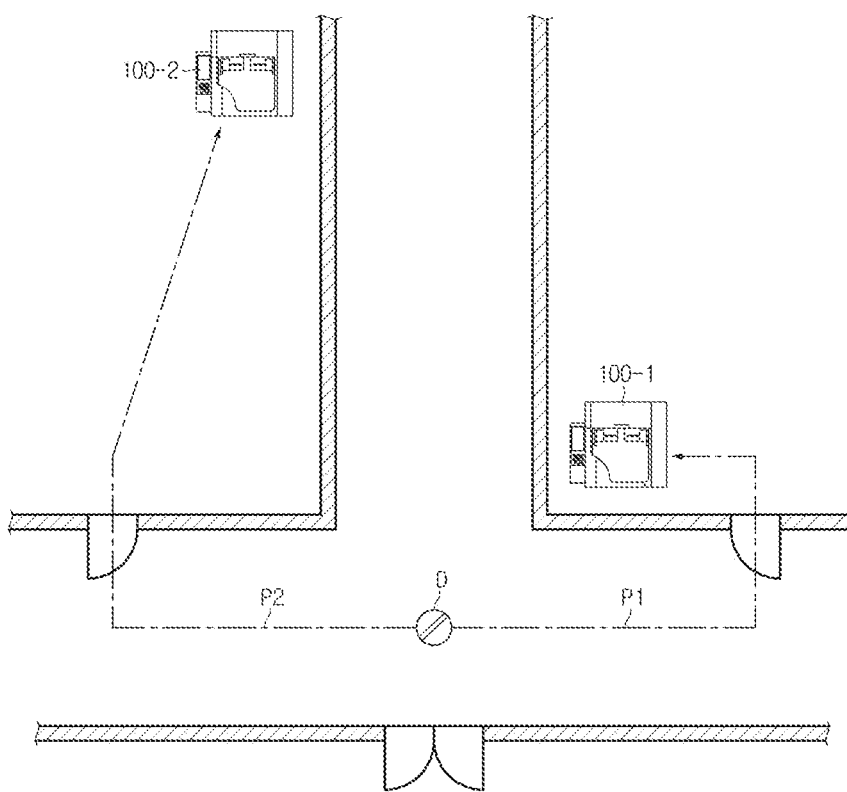

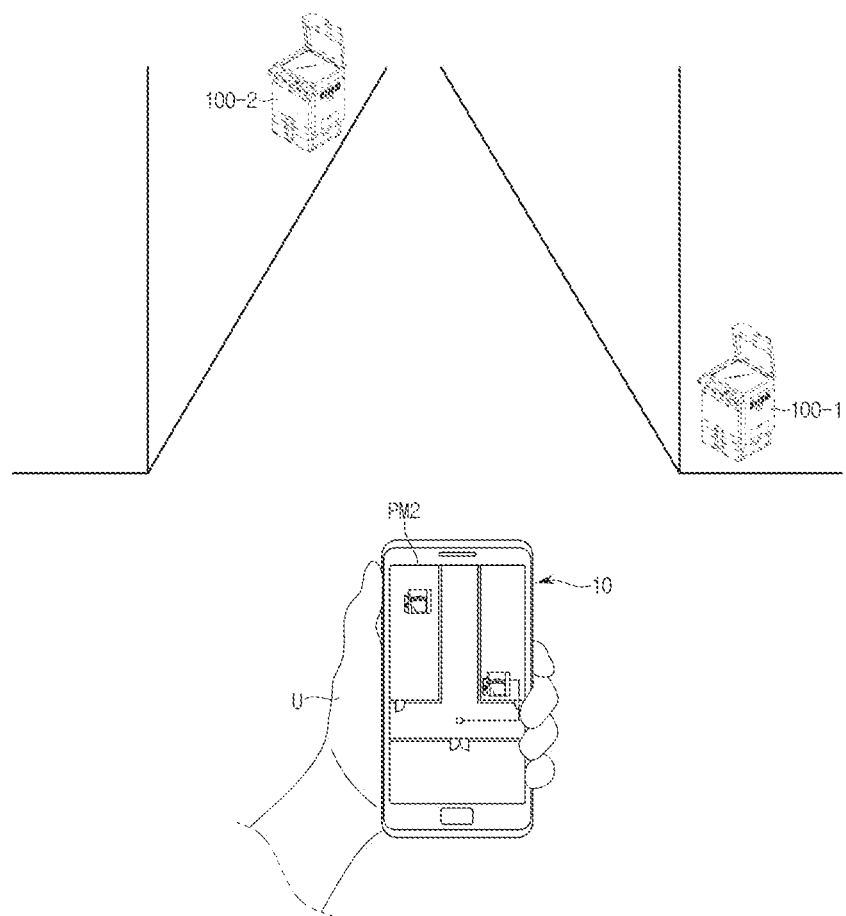
[Fig. 40]

IMAGE FORMING APPARATUS, AND POSITION GUIDANCE METHOD AND IMAGE FORMING SYSTEM THEREFOR

BACKGROUND OF THE INVENTION

1. Field of the Invention

The present disclosure relates to an image forming apparatus, location guidance method and image forming system for allowing the user to easily select an image forming apparatus to perform a printing job.

2. Description of the Related Art

In general, an image forming apparatus refers to an apparatus capable of printing certain images on some print media, such as print paper. The image forming apparatus includes a printer, a copier, a facsimile machine, or the like, and may even include a multi-functional device implemented by combining some or all functions of the printer, copier, facsimile machine, etc.

The image forming apparatus comes in inkjet type that prints an image on a print medium by jetting and applying ink in liquid droplets to desired locations on the print medium, an electro-photography type that prints an image by supplying toner to an electrostatic latent image formed by scanning light on a photosensitive member and transferring the toner-supplied electrostatic latent image onto the print medium.

However, if the user is not aware of where the image forming apparatus is, the user has to check the location and identification information of an image forming apparatus with his/her naked eyes and then forward the printing job to the corresponding image forming apparatus.

SUMMARY OF THE INVENTION

To solve the above problem, an object of the present disclosure is to provide an image forming apparatus, location guidance method and image forming system for allowing the user or manager to easily register the location of an image forming apparatus.

Another object of the present disclosure is to provide an image forming apparatus, location guidance method and image forming system for allowing the user to easily select an image forming apparatus to perform a printing job.

Another object of the present disclosure is to provide an image forming apparatus, location guidance method and image forming system for enabling an image forming apparatus the user may easily find to perform a printing job.

In accordance with an aspect of the present disclosure, an image forming apparatus may include a communication unit configured to communicate with a portable electronic device and a controller configured to receive a location-related information that includes information about distances between the portable electronic device and a plurality of beacons, and store a location of the portable electronic device to register a location of the image forming apparatus.

In accordance with an embodiment, the controller may calculate the location of the portable electronic device based on the information about distance.

In accordance with an embodiment, the controller may register the location of the image forming apparatus if the portable electronic device enters into a first area of the image forming apparatus.

In accordance with an aspect of the present disclosure, a location guidance method in an image forming apparatus may include calculating a distance between at least one beacon and a first portable electronic device, calculating a location of the first portable electronic device based on the distance between the at least one beacon and the first portable electronic device and storing the location of the first portable electronic device to register a location of the image forming apparatus.

In accordance with an embodiment, the calculating of the distance may include calculating the distance between the at least one beacon and the first portable electronic device based on a received signal strength of a beacon signal output from the at least one beacon, upon reception of a command to register the location from a user.

In accordance with an embodiment, the calculating of the distance may include calculating the distance between the at least one beacon and the first portable electronic device based on a received signal strength of a beacon signal output from the at least one beacon, if a distance between the image forming apparatus and the first portable electronic device is less than a reference distance.

In accordance with an embodiment, the calculating of the distance may include calculating the distance between the at least one beacon and the first portable electronic device based on a received signal strength of a beacon signal output from the at least one beacon, if a received signal strength of a signal output from the image forming apparatus exceeds a reference strength.

In accordance with an embodiment, the calculating of the distance may include setting a received signal strength offset based on a received signal strength of a printing signal output from the image forming apparatus, and calculating the distance between the at least one beacon and the first portable electronic device based on a received signal strength of a beacon signal output from the at least one beacon and the offset.

In accordance with an embodiment, the location guidance method in an image forming apparatus may further include displaying a map that represents a registered location of the image forming apparatus on at least one of the first portable electronic device and a second portable electronic device.

In accordance with an embodiment, the location guidance method in an image forming apparatus may further include selecting one of image forming apparatuses represented on the map and performing an image forming operation in the selected image forming apparatus.

In accordance with an embodiment, the selecting of the image forming apparatus may include selecting an image forming apparatus pointed by a user from among the image forming apparatuses represented on the map.

In accordance with an embodiment, the selecting of the image forming apparatus may include selecting an image forming apparatus dragged-and-dropped by a user from among the image forming apparatuses represented on the map.

In accordance with an embodiment, the selecting of the image forming apparatus may include selecting an image forming apparatus located within a shortest distance from where a user is, from among the image forming apparatuses represented on the map.

In accordance with an embodiment, the map may represent a path to the selected image forming apparatus from where the user is.

In accordance with an embodiment, the selecting of the image forming apparatus may include searching image forming apparatuses according to a print option input by a user and selecting an image forming apparatus located within a shortest distance from where the user is, from among the searched image forming apparatuses.

In accordance with an aspect of the present disclosure, an image forming system may include at least one image forming apparatus, a plurality of beacons configured to output beacon signals, a first portable electronic device configured to calculate distances from the plurality of beacons based on received signal strengths of the beacon signals if entering into a first area of the at least one image forming apparatus, and an image forming server configured to calculate a location of the first portable electronic device based on the distances and store the location of the first portable electronic device, in order to register a location of the image forming apparatus.

In accordance with an embodiment, the first portable electronic device may calculate distances from the plurality of beacons based on received signal strengths of the beacon signals if a received signal strength of a printing signal output from the at least one image forming apparatus exceeds a reference strength.

In accordance with an embodiment, the image forming system may further include a second portable electronic device configured to display a map that represents a location of the image forming apparatus.

In accordance with an embodiment, the second portable electronic device may send a printing job to the image forming server and select one of image forming apparatuses represented on the map.

In accordance with an embodiment, the image forming server may send the printing job to the selected image forming apparatus.

According to an aspect of the present disclosure, provided is an image forming apparatus, location guidance method and image forming system for allowing the user or manager to easily register the location of an image forming apparatus by registering the location of a portable electronic device the user or manager carries as a location of the image forming apparatus.

According to another aspect of the present disclosure, provided is an image forming apparatus, location guidance method and image forming system for allowing the user to easily select an image forming apparatus to perform a printing job by displaying a printer map on which the location of the image forming apparatus is represented.

According to another aspect of the present disclosure, provided is an image forming apparatus, location guidance method and image forming system for allowing the user to easily find an image forming apparatus by enabling an image forming apparatus within the shortest distance from the user to perform a printing job and displaying a path to the image forming apparatus.

BRIEF DESCRIPTION OF DRAWINGS

FIG. 1 shows an arrangement of an image forming apparatus according to an embodiment;

FIG. 2 shows advertising signals output from a beacon and an image forming apparatus included in an image forming system according to an embodiment;

FIG. 3 shows measurement of a distance between an image forming apparatus and a portable electronic device included in an image forming system according to an embodiment;

FIG. 4 shows a portable electronic device included in an image forming system generating location information of the portable electronic device according to an embodiment;

FIG. 5 shows the exterior of an image forming apparatus included in an image forming system according to an embodiment;

FIG. 6 is a block diagram of an image forming apparatus included in an image forming system according to an embodiment;

FIG. 7 is a side cross-sectional view of an image forming apparatus included in an image forming system according to an embodiment;

FIG. 8 shows the exterior of a portable electronic device included in an image forming system according to an embodiment;

FIG. 9 is a block diagram of a portable electronic device included in an image forming system according to an embodiment;

FIG. 10 is a block diagram of an image forming server included in an image forming system according to an embodiment;

FIG. 11 is a block diagram of a beacon included in an image forming system according to an embodiment;

FIG. 12 shows communication operation modes of an image forming apparatus, portable electronic device and beacon according to an embodiment;

FIG. 13 shows frequency bands in which an image forming apparatus, a portable electronic device and a beacon perform communication according to an embodiment;

FIG. 14 shows communication signals transmitted/received by an image forming apparatus, portable electronic device and beacon according to an embodiment;

FIG. 15 shows information included in communication signals transmitted/received between an image forming apparatus, portable electronic device and beacon according to an embodiment;

FIG. 16 is an example of operation of how an image forming system registers a location of an image forming apparatus according to an embodiment;

FIG. 17 is an example of location registration operation of an image forming apparatus, portable electronic device, and image forming server included in an image forming system according to an embodiment;

FIG. 18 is an example of detecting the location of a portable electronic device included in an image forming system according to an embodiment;

FIG. 19 is another example of location registration operation of an image forming apparatus, portable electronic device, and image forming server included in an image forming system according to an embodiment;

FIG. 20 is another example of detecting the location of a portable electronic device included in an image forming system according to an embodiment.

FIG. 21 is another example of location registration operation of an image forming apparatus, portable electronic device, and image forming server included in an image forming system according to an embodiment;

FIG. 22 is another example of location registration operation of an image forming apparatus, portable electronic device, and image forming server included in an image forming system according to an embodiment;

FIG. 23 is another example of location registration operation of an image forming apparatus, portable electronic device, and image forming server included in an image forming system according to an embodiment;

FIG. 24 is another example of detecting the location of an image forming apparatus included in an image forming system according to an embodiment;

FIG. 25 is another example of location registration operation of an image forming apparatus, portable electronic device, and image forming server included in an image forming system according to an embodiment;

FIG. 26 is another example of operation of how an image forming system registers a location of an image forming apparatus according to an embodiment;

FIG. 27 is an example of location registration operation of an image forming apparatus, portable electronic device, and image forming server included in an image forming system according to an embodiment;

FIG. 28 is an example of detecting a distance between an image forming apparatus and a portable electronic device included in an image forming system according to an embodiment;

FIG. 29 shows a portable electronic device approaching an image forming apparatus in an image forming system according to an embodiment;

FIG. 30 is an example of detecting the location of a portable electronic device included in an image forming system according to an embodiment;

FIG. 31 is an example of image forming operation of how an image forming system displays a location of an image forming apparatus according to an embodiment;

FIG. 32 is an example of image forming operation of an image forming apparatus, portable electronic device, and image forming server included in an image forming system according to an embodiment;

FIG. 33 is an example of how an image forming system detects where the user is according to an embodiment;

FIG. 34 is an example of how an image forming system displays a printing map according to an embodiment;

FIG. 35 shows an example of how an image forming system receives a selection of an image forming apparatus from the user according to an embodiment;

FIG. 36 shows another example of how an image forming system receives a selection of an image forming apparatus from the user according to an embodiment;

FIG. 37 is an example of image forming operation of how an image forming system selects an optimal image forming apparatus according to an embodiment;

FIG. 38 is an example of image forming operation of an image forming apparatus, portable electronic device, and image forming server included in an image forming system according to an embodiment;

FIG. 39 shows an example of how an image forming system selects an optimal image forming apparatus, according to an embodiment; and FIG. 40 shows an example of how an image forming system guides the user to an optimal image forming apparatus, according to an embodiment.

DESCRIPTION OF THE PREFERRED EMBODIMENTS

Embodiments and features as described and illustrated in the present disclosure are only preferred examples, and various modifications thereof may also fall within the scope of the disclosure.

Throughout the drawings, like reference numerals refer to like parts or components.

The terminology used herein is for the purpose of describing particular embodiments only and is not intended to limit the present disclosure. It is to be understood that the singular forms "a," "an," and "the" include plural references unless the context clearly dictates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The terms including ordinal numbers like "first" and "second" may be used to explain various components, but the components are not limited by the terms. The terms are only for the purpose of distinguishing a component from another. Thus, a first element, component, region, layer or section discussed below could be termed a second element, component, region, layer or section without departing from the teachings of the present disclosure. Descriptions shall be understood as to include any and all combinations of one or more of the associated listed items when the items are described by using the conjunctive term "~ and/or ~," or the like.

A "touch" may be made by one of the fingers including the thumb or an input unit capable of making touch gestures (e.g., a stylus). The touch may include hovering by one of the fingers including the thumb or an input unit capable of making touch gestures. The touch may include not only a single touch but also multi touch.

Embodiments of the present disclosure will now be described with reference to accompanying drawings.

FIG. 1 shows an arrangement of an image forming apparatus according to an embodiment.

Referring to FIG. 1, an image forming system 1 in accordance with an embodiment may include a portable electronic device 10, an image forming apparatus 100, an image forming server 900, and a beacon 2.

The image forming system 1 registers the location of the image forming apparatus 100 using the portable electronic device 10 and the beacon 2.

More specifically, if the portable electronic device 10 is located near the image forming apparatus 100, the image forming system 1 may use information about a distance between the portable electronic device 10 and the beacon 2 to calculate the location of the portable electronic device 10, and register the calculated location of the portable electronic device 10 as the location of the image forming apparatus 100. It is assumed that the operation is performed when the portable electronic device 10 is located near the image forming apparatus 100.

After this, if the user searches the image forming apparatus 100, the image forming system 1 displays the registered location of the image forming apparatus 100 for the user through the portable electronic device 10.

More specifically, if the user instructs to search the location of the image forming apparatus 100, the image forming system 1 calculates the location of the user based on information about a distance between the portable electronic device 10 the user carries and the beacon 2, and displays a printer map corresponding to the user. Since information about the location of the image forming apparatus 100 is also displayed on the printer map, the user may easily determine where the image forming apparatus 100 is.

First, operations of the portable electronic device 1, the image forming apparatus 100, the image forming server 900, and the beacon 2, which make up the image forming system 1, will now be briefly described.

The portable electronic device 10 may be a universal computing device for receiving control commands from the user, processing the information, and displaying the processed information.

For example, the portable electronic device 10 may be a smart phone, a cellular phone, a personal digital assistant (PDA), a wearable device, etc.

There may be a word processor application for editing e.g., documents, a graphic application for displaying and editing e.g., pictures, a browsing application for accessing a broadband communication network, such as the Internet and displaying information stored in a server connected to the broadband communication network, etc., installed in the portable electronic device 10. Furthermore, a print control application may be installed in the portable electronic device 10 to perform functions of the image forming system 1, as will be described below.

The user may run various application installed in the portable electronic device 10 and input a print command for a document or image displayed on the portable electronic device 10. Upon reception of the print command from the user, the print control application runs.

The portable electronic device 10 may send the image forming apparatus 100 a printing job corresponding to an image displayed on the portable electronic device 10 as the print control application runs.

The printing job herein may include the print command, image data, authentication information of the user who sends the print command, identification information of the image forming apparatus 100 to perform image forming operation, etc.

The user authentication information may include identification information to identify the user, such as the user's name, identification number, etc., or e.g., a password set up by the user. In addition, identification information of the portable electronic device 10 the user carries may also be used as the authentication information of the user. Furthermore, the identification information of the portable electronic device 10 may include an Internet Protocol (IP) address, a Media Access Control (MAC) address, etc., of the portable electronic device 10.

The identification information of the image forming apparatus 100 may include an IP address, an MAC address, etc., of the image forming apparatus 100.

The portable electronic device 10 may access a communication network NT through wireless communication for mobility, in which case, the portable electronic device 10 may access the communication network NT directly or via an access point (AP).

In addition, the portable electronic device 10 may directly communicate with the image forming apparatus 100.

During wireless communication with the image forming apparatus 100, the portable electronic device 10 may calculate a distance to the image forming apparatus 100 based on the strength of a signal output from the image forming apparatus 100. It is not, however, limited to calculating the distance based on the strength of communication signals, and the portable electronic device 10 may also calculate a distance to the image forming apparatus 100 based on response time of the image forming apparatus 100 during direct communication with the image forming apparatus 100.

Furthermore, the portable electronic apparatus 10 may calculate a distance to the beacon 2 using a signal output from the beacon 2, and calculate the location of the portable electronic device 10 based on the distance to the beacon 2.

The image forming apparatus 100 receives a printing job and forms an image corresponding to image data included in the received printing job on a print medium. In addition, the image forming apparatus 100 may obtain image data from a document upon reception of a copy command from the user, and form an image corresponding to the obtained image data on a print medium.

The image forming apparatus 100 may directly communicate with the portable electronic device 10, and perform various operations depending on a distance between the portable electronic device 10 and the image forming apparatus 100.

For example, the image forming apparatus 100 may perform user authentication, image forming preparation operation, and image forming operation in order, as the distance to the portable electronic device 10 gets shorter.

The image forming apparatus 100 may include a printer. However, the image forming apparatus 100 is not limited to the printer, and it may include a multi-functional copier that incorporates all the functions of the printer, scanner, copy machine, facsimile, etc.

An image forming server 900 may be connected to a communication network NT to receive a printing job sent by a client, such as the portable electronic device 10, and send the received printing job to the image forming apparatus 100.

The image forming server 900 may also store a location of the beacon 2 as will be described below, and calculate locations of the portable electronic device 10 and image forming apparatus 100 based on the location of the beacon 2. The image forming server 900 also stores a printer map, on which the physique of an area in which the image forming apparatus 100 is located, and the location of the image forming apparatus 100 are represented.

The physique of the area in which the image forming apparatus 100 is located may include not only an outdoor layout but also layouts of indoor walls and office rooms. In other words, the printer map also represents layouts inside a building as well as the outdoor layout.

The image forming server 900 may be arranged separately from the image forming apparatus 100, or arranged integrally with the image forming apparatus 100.

In the case that the image forming server 900 is arranged integrally with the image forming apparatus 100, operation of the image forming server 900 as will be described later may be understood as the operation of the image forming apparatus 100.

The beacon 2 outputs a signal to detect the location of the portable electronic device 10. Specifically, the beacon 2 may output a signal in a predetermined strength, and the image forming system 1 may calculate the location of the portable electronic device 10 based on received signal strength of the signal from the beacon 2 received by the portable electronic device 10.

The beacon 2 may be arranged separately from the communication network NT, as shown in FIG. 1, and may communicate with the image forming server 900 or the portable electronic device 10 over the communication network NT as required.

There may be a plurality of beacons 2 in order for the image forming system 1 to accurately calculate the location of the portable electronic device 10.

These beacons 2 may be replaced by a plurality of image forming apparatuses 100. Since the image forming apparatus 100 also outputs a signal to be used in calculating the distance to the portable electronic device 10 as the beacon 2, the image forming apparatus 100 may even perform the function of the beacon 2.

In other words, the beacon 2, as will be described later, may be replaced by the image forming apparatus 100 whose location has been registered.

FIG. 2 shows advertising signals output from a beacon and an image forming apparatus included in an image forming system, according to an embodiment.

The beacon 2 outputs a beacon advertising signal BCN_ADV_SIG as shown in (a) of FIG. 2, and the image forming apparatus 10 outputs a printer advertising signal PRI_ADV_SIG as shown in (b) of FIG. 2.

The portable electronic device 10 may calculate a distance to the beacon 2 based on a received signal strength of the beacon advertising signal BCN_ADV_SIG output from the beacon 2, and calculate a distance to the image forming apparatus 100 based on a received signal strength of the printer advertising signal PRI_ADV_SIG output from the image forming apparatus 100.

An advertising signal ADV_SIG output from the beacon 2 or the image forming apparatus 100 may be output in a predetermined period T0 as shown in (c) of FIG. 2, and may include output strength of the advertising signal ADV_SIG, identification information of the beacon 2 or image forming apparatus 100 that outputs the advertising signal ADV_SIG, etc.

In the image forming system 1 in accordance with an embodiment, the image forming apparatus 100 and the beacon 2 output the advertising signal ADV_SIG, and the portable electronic device 1 calculates a distance to the beacon 2 or a distance to the image forming apparatus 100 based on the advertising signal ADV_SIG, without being limited thereto.

For example, the portable electronic device 10 may output the advertising signal ADV_SIG, and the beacon 2 or the image forming apparatus 100 may calculate a distance to the portable electronic device 10 based on the advertising signal ADV_SIG.

FIG. 3 shows measurement of a distance between an image forming apparatus and a portable electronic device included in an image forming system, according to an embodiment.

As shown in FIG. 3, the image forming apparatus 100 outputs the printer advertising signal PRI_ADV_SIG at predetermined intervals.

The portable electronic device 10 may receive the printer advertising signal PRI_ADV_SIG output from the image forming apparatus 100, and generate information about a distance between the image forming apparatus 100 and the portable electronic device 10 based on the received printer advertising signal PRI_ADV_SIG.

Specifically, the portable electronic device 10 may calculate a distance to the image forming apparatus 100 using the strength of the printer advertising signal PRI_ADV_SIG output from the image forming apparatus 100.

It is widely known that radio signals (electromagnetic waves) are attenuated in inverse proportion to the square of a distance between a transmitter and a receiver. Since the printer advertising signal PRI_ADV_SIG corresponds to the radio signal, the strength of the printer advertising signal PRI_ADV_SIG decreases in inverse proportion to the square of a distance between the image forming apparatus 100 and the portable electronic device 10.

Accordingly, using a ratio of the output strength included in the printer advertising signal PRI_ADV_SIG output from the image forming apparatus 100 and the received signal strength of the printer advertising signal PRI_ADV_SIG received by the portable electronic device 10, the portable electronic device 10 may estimate a distance between the image forming apparatus 100 and the portable electronic device 10.

The image forming system 1 in accordance with an embodiment calculates a distance between the image forming apparatus 100 and the portable electronic device 10 based on the received signal strength of the printer advertising signal PRI_ADV_SIG, without being limited thereto. For example, the portable electronic device 10 may also calculate a distance to the image forming apparatus 100 based on response time of the image forming apparatus 100 during direct communication with the image forming apparatus 100.

The distance information generated by the portable electronic device 10 is not limited to the distance between the image forming apparatus 100 and the portable electronic device 10.

For example, the distance information generated by the portable electronic device 10 may include the received signal strength itself of the printer advertising signal PRI_ADV_SIG received by the portable electronic device 10. This is because the distance between the portable electronic device 10 and the image forming apparatus 10 may be calculated using the received signal strength of the printer advertising signal PRI_ADV_SIG received by the portable electronic device 10.

In another example, the distance information generated by the portable electronic device 10 may include an area in which the portable electronic device 10 is located, among a plurality of areas defined based on the distance from the image forming apparatus 100.

Specifically, an area within a third reference distance from the image forming apparatus 100 may be defined as a third area, an area within a second reference distance from the image forming apparatus 100 may be defined as a second area, and an area within a first reference distance from the image forming apparatus 100 may be defined as a first area.

Furthermore, the image forming system 1 may determine a received signal strength of the printer advertising signal PRI_ADV_SIG received by the portable electronic device 10 at the first reference distance from the image forming apparatus 100 to be a first reference strength, a received signal strength of the printer advertising signal PRI_ADV_SIG received by the portable electronic device 10 at the second reference distance from the image forming apparatus 100 to be a second reference strength, and a received signal strength of the printer advertising signal PRI_ADV_SIG received by the portable electronic device 10 at the third reference distance from the image forming apparatus 100 to be a third reference strength.

In this case, if the received signal strength of the printer advertising signal PRI_ADV_SIG received by the portable electronic device 10 is equal to or greater than the first reference strength, the portable electronic device 10 may be determined to be located in the first area, if the received signal strength of the printer advertising signal PRI_ADV_SIG received is equal to or greater than the second reference strength, the portable electronic device 10 may be determined to be located in the second area, and if the received signal strength of the printer advertising signal PRI_ADV_SIG received is equal to or greater than the third reference strength, the portable electronic device 10 may be determined to be located in the third area.

As such, the area in which the portable electronic device 10 is located may be the distance information generated by the portable electronic device 10.

FIG. 4 shows a portable electronic device included in an image forming system generating location information of the portable electronic device, according to an embodiment.

As shown in FIG. 4, each of the plurality of beacons 2 outputs the beacon advertising signal BCN_ADV_SIG at predetermined intervals.

The portable electronic device 10 receives the beacon advertising signal BCN_ADV_SIG output from the beacon 2 as shown in FIG. 4, and calculates a distance between each beacon 2 and the portable electronic device 10 based on the received beacon advertising signal BCN_ADV_SIG.

The portable electronic device 10 may calculate the distance to the beacon 2 using the strength of the beacon advertising signal BCN_ADV_SIG output from the beacon 2. Using the output strength included in the beacon advertising signal BCN_ADV_SIG output from the beacon 2 and the received signal strength of the beacon advertising signal BCN_ADV_SIG received by the portable electronic device 10, the portable electronic device 10 may estimate a distance between the beacon 2 and the portable electronic device 10.

For example, the portable electronic device 10 may receive beacon advertising signals BCN_ADV_SIG output from first, second, and third beacons 2-1, 2-2, and 2-3, and calculate first, second, and third distances D1, D2, and D3 from the first, second, and third beacons 2-1, 2-1, and 2-3, respectively, based on the received beacon advertising signals BCN_ADV_SIG.

In another example, the portable electronic device 10 may determine an area in which the portable electronic device 10 is located, among a plurality of areas defined based on the distance from the beacon 2. As described above, an area around the beacon 2 may be divided into first, second, and third areas according to the distance from the beacon 2, and the portable electronic device 10 may determine one of the first, second, and third areas, in which the portable electronic device 10 is located, based on the signal strength of the beacon advertising signal BCN_ADV_SIG.

After this, the portable electronic device 10 may generate location information of the portable electronic device 10 based on the distances between the respective beacons 2 and the portable electronic device 10.

For example, as shown in FIG. 4, the portable electronic device 10 may calculate the coordinates of the portable electronic device 10 based on the first distance D1 from the first beacon 2-1, the second distance D2 from the second beacon 2-2, and the third distance D3 from the third beacon 2-3.

Specifically, the portable electronic device 10 may calculate the coordinates of the portable electronic device 10 based on the first, second, and third distances D1, D2, and D3 using a trilateration algorithm or a fingerprinting algorithm.

The distance information generated by the portable electronic device 10 is not limited to the coordinates of the location of the portable electronic device 10.

For example, the location information generated by the portable electronic device 10 may include distances between the respective beacons 2-1, 2-2, and 2-3 and the portable electronic device 10. This is because the coordinates of the portable electronic device 10 may be calculated using the distances between the respective beacons 2-1, 2-2, and 2-3 and the portable electronic device 10. For example, the location information of the portable electronic device 10 may include identification information of the respective beacons 2-1, 2-2, and 2-3, and the distance from the beacon corresponding to the identification information.

In another example, the location information generated by the portable electronic device 10 may include an area in which the portable electronic device 10 is located, among a plurality of areas defined based on the distances from the respective beacons 2-1, 2-2, and 2-3. For example, the location information of the portable electronic device 10 may include identification information of the respective beacons 2-1, 2-2, and 2-3, and an area in which the portable electronic device 10 is located, among surrounding areas of the beacon corresponding to the identification information.

In another example, the location information generated by the portable electronic device 10 may include received signal strengths of the beacon advertising signals BCN_ADV_SIG output from the respective beacons 2-1, 2-2, and 2-3 and received by the portable electronic device 10. For example, the location information of the portable electronic device 10 may include identification information of the respective beacons 2-1, 2-2, and 2-3, and a received signal strength of the beacon advertising signal BCN_ADV_SIG received from the beacon corresponding to the identification information.

As described above, the image forming system 1 in accordance with an embodiment may generate information about a location of the image forming apparatus 100 using the information about a distance between the image forming apparatus 100 and the portable electronic device 10, and the information about a location of the portable electronic device 10.

If the user searches the image forming apparatus 100, the image forming system 1 may display a printer map including the location information of the image forming apparatus 100 through the portable electronic device 10.

Features of the portable electronic device 10, the image forming apparatus 100, the image forming server 900, and the beacon 2, included in the image forming system 1, in accordance with an embodiment will now be described in detail.

FIG. 5 shows the exterior of an image forming apparatus included in an image forming system, according to an embodiment, FIG. 6 is a block diagram of an image forming apparatus included in an image forming system, according to an embodiment, and FIG. 7 is a side cross-sectional view of an image forming apparatus included in an image forming system, according to an embodiment.

Referring to FIGS. 5 to 7, the image forming apparatus 100 includes an image former 200 for forming an image on a print medium P, an image obtainer 300 for obtaining an image from a document, a user interface 400 for interacting with the user, a storage 500 for storing programs and data, a communication unit 600 for communicating with e.g., the portable electronic device 10, and a controller 700 for controlling operation of the image forming apparatus 100.

The image former 200 may form an image on the print medium P according to image data, and may be equipped in the inside of a main body 100 that forms the main exterior of the image forming apparatus 100. The image former 200 may pick up the print medium P contained in the paper box 111, form an image on the picked-up print medium P, and release the print medium P, on which the image has been formed, onto the output tray 113.

Furthermore, the image former 200 may include a feeding part 210, an exposure part 220, a developing part 230, a transfer part 240, a fusing part 250, an output part 260.

The feeding part 210 picks up the print medium P from a plurality of paper boxes that store print media P and transports the picked-up print medium P to the transfer part 240.

The feeding part 210 includes a pick-up plate 211 on which the print media P are loaded, a pick-up spring 212 for elastically supporting the pick-up plate 211, and a pick-up roller 213 for picking up the print media P loaded on the pick-up plate 211 one by one.

The exposure part 220 emits beams corresponding to an image of a document D obtained by the image obtainer 300 or an image received through the communication unit 600. The exposure part 220 may include a Laser Scanning Unit (LSU) or LED Print Head (LPH).

The LSU includes a light source for emitting light and a reflecting mirror rotated by a motor, and irradiates light onto a photosensitive drum 161 by reflecting the light irradiated from the light source onto the rotating reflecting mirror.

The LPH is equipped with an LED array and LEDs included in the LED array directly irradiate light.

The developing part 230 develops an electrostatic latent image formed by the light emitted by the exposure part 220 with toner.

The developing part 230 may include a first developing part 230K for developing the electrostatic latent image with black toner, a second developing part 230C for developing the electrostatic latent image with cyan toner, a third developing part 230M for developing the electrostatic latent image with magenta toner, and a fourth developing part 230Y for developing the electrostatic latent image with yellow toner.

The developing parts 230K, 230C, 230M, and 230Y may each include a photosensitive drum 231 on which an electrostatic latent image is formed by light, a charging roller 232 for charging the outer circumferential face of the photosensitive drum 231 with electricity, and a developing roller 233 for developing the electrostatic latent image with toner.

Briefly explaining a developing process through rotation of the photosensitive drum 221, the charging roller 222 first charges the outer circumferential face of the photosensitive drum 221.

After this, light is irradiated onto the outer circumferential face of the photosensitive drum 231 by the exposure part 220. An electrostatic latent image is formed on the outer circumferential face of the photosensitive drum 231, on which a photoconductive material is applied, by the light irradiated from the light exposure 220.

After this, charged toner is supplied by the developing roller 233 onto the outer circumferential face of the photosensitive drum 231. As a result, the charged toner is attached onto the electrostatic latent image formed on the outer circumferential face of the photosensitive drum 231, and the electrostatic latent image is developed. In other words, an image is formed on the circumferential face of the photosensitive drum 231 with toner.

The transfer part 240 transfers the toner image onto the print medium P transported by the feeding part 210.

The transfer part 240 includes a transfer belt 241 for transferring the toner image of the photosensitive drum 231 onto the print medium P, a first transfer roller 242 for transferring the toner image formed on the photosensitive drum 231 onto the photosensitive drum 231, a driving roller 243 for rotating the transfer belt 241, a tension roller 244 for keeping tension of the transfer belt 241, and a second transfer roller 245 for transferring the toner image transferred onto the transfer belt 241 onto the print medium P.

Briefly explaining a transfer procedure through rotation of the transfer belt 241, a black toner image is first transferred on the transfer belt 241 from the first developing part 230K.

In a color mode, a cyan toner image is transferred onto the transfer belt 241 from the second developing part 230C, a magenta toner image is transferred from the third developing part 230M, and a yellow toner image is transferred from the fourth developing part 230Y. The black, magenta, cyan, and yellow toner images are combined to form a colored toner image on the transfer belt 241. After this, the colored toner image is transferred by the second transfer roller 245 on the print medium P.

In a black and white mode, a black toner image is transferred by the second transfer roller 245 from the first developing part 230K onto the print medium P.

The fusing part 250 may settle the toner image transferred onto the print medium P onto the print medium P with heat and pressure, and may include a heating roller 251 for heating the print medium P with the toner image transferred thereon, and a pressing roller 252 for pressing the print medium P with the toner image transferred thereon.

The output part 260 includes an output roller 251 for outputting the print medium P with a toner image settled thereon onto the output tray 113 formed on the upper side of the main body 110.

The image obtainer 300 includes a scanner 310 for obtaining a two dimensional (2D) image of a document D.

The scanner 310 may be located in the sub-body 120 arranged on the upper side of the main body 110. Specifically, a transparent flatbed 121 may be arranged on the top face of the sub-body 120, and the scanner 310 may obtain an image from a document D lying on the flatbed 121.

The scanner 310 includes a photo-sensor module 311 for irradiating light toward the document D and receiving light reflected from the document D while in a linear motion, and a guide rail 312 for guiding the linear motion of the photo-sensor module 311.

For example, the photo-sensor module 311 extends along the x-axis while the guide rail 312 extends along the y-axis. As the photo-sensor module 311 extending along the x-axis moves along the guide rail 312 extending along the y-axis, the scanner 310 may obtain a 2D image.

The image obtainer 300 may include an Auto Document Feeder (ADF) 320 for selectively but automatically feeding documents D for the scanner 310.

The ADF 320 may be equipped inside a flatbed cover 130 that covers the flatbed 121 of the sub-body 120. Specifically, the ADF 320 may pick up the document D contained on a document tray 131, expose the picked-up document D to the photo-sensor module 311 of the scanner 320, and discharge it onto the document tray 133.

The ADF 320 includes a document pick-up roller 321 for picking up the document D placed on the document tray 131, a document transport roller 322 for transporting the picked-up document D toward the scanner 310, and a document release roller 323 for releasing the document D from which an image has been obtained.

If the document D is inserted to the ADF 320 and the image is obtained from the document D, the photo-sensor module 311 of the scanner 310 is not moved along the guide rail 312. For example, since the image from the document D is exposed to the photo-sensor module 311 of the scanner 310 while the document D is transported by the document transport roller 322, a 2D image may be obtained from the document D without moving the photo-sensor module 311.

The user interface 400 may include input buttons 410 to receive control commands from the user, and a display 420 for displaying operation information of the image forming apparatus 100.

For example, the input buttons 410 may include a power button to supply or cut off power, an operation button to perform copying or scanning, numeric keys to input numbers, etc.

The input buttons 410 may employ micro switches, membrane switches, touch switches, or the like.

The display 420 may use a Liquid Crystal Display (LCD) panel, Light Emitting Diode (LED) panel, an Organic Light Emitting Diode (OLED) panel, or the like.

Furthermore, in some embodiments, the display 420 may include a touch screen panel (TSP) for sensing contact of a part of the user's body and detecting the contact coordinates.

For example, the TSP may be equipped with a touch pad for detecting contact of the user on a display panel, such as the LCD panel, OLED panel, etc.

The TSP detects coordinates on which contact of the user is sensed, and determines a control command corresponding to the detected coordinates.

The storage 500 stores programs and data for controlling the image forming apparatus 100. The storage 500 may include a magnetic disk 510, an optical disk 520, or a solid state disk 530.

The communication unit 600 communicates with an external device, such as the portable electronic device 10 directly, or over a communication network NT.

The communication unit 600 may include a wired communication module 610 to communicate with an external device via a communication line, and a wireless communication module 620 to communicate with an external device in electromagnetic waves without the communication line.

The wired communication module 610 accesses the communication network NT via the communication line.

Specifically, the wireless communication module 610 may include a Local Area Network (LAN) communication module to connect between a plurality of terminals within a restricted area, or a Wide Area Network (WAN) communication module to connect between a number of unspecified terminals.

The wireless communication module 620 may include a Wireless Fidelity (WI-Fi) communication module, a Bluetooth communication module, a Near Field Communication (NFC) module, a Zigbee communication module.

The Wi-Fi communication module is mainly used for communication between a terminal and an AP to form a short range communication network, and the Bluetooth communication module is mainly used for low energy communication between terminals. The NFC communication module is mainly used for ultra-short range communication within 10 cm or less to improve security, and the Zigbee communication module is used to form a low energy communication network between a plurality of terminals.

The wireless communication module 620 may output the printer advertising signal PRI_ADV_SIG, and may directly communicate with an external device at a connection request from the external device while outputting the printer advertisement signal PRI_ADV_SIG. In addition, the wireless communication module 620 may receive an advertising signal ADV_SIG output from an external device, transmit a connection request to the external device that has output the advertising signal ADV_SIG, and directly communicate with the external device.

Operation of the wireless communication module 620 of the image forming apparatus 100 will now be described in detail.

The controller 700 may control overall operation of the image forming apparatus 100.

The controller 700 may include a memory 720 for temporarily storing programs and data to control operation of the image forming apparatus 100, and a microprocessor 710 for processing data according to the program stored in the memory 720.

The controller 700 may recognize the control command input from the user through the user interface 400 and control the user interface 400 to display operation information according to operation of the image forming apparatus 100.

The controller 700 may control the image obtainer 300 to obtain image data from the document D in response to a control command from the user, and control an image former 200 to form an image corresponding to the obtained image data on the print medium P.

The controller 700 may also manage data stored in the storage 500 and control the communication unit 600 to communicate with an external device. Specifically, the controller 700 may control the wireless communication module 620 to output the printer advertising signal PRI_ADV_SIG at predetermined intervals, or control the wireless communication module 620 to receive the advertising signal ADV_SIG output from an external device, such as the portable electronic device 10.

Upon reception of the advertising signal ADV_SIG, the controller 700 may calculate a distance between the image forming apparatus 100 and the external device based on the strength of the advertising signal ADV_SIG output from the external device, and control the image former 200 to perform image forming preparation operation or image forming operation according to the calculated distance.

The controller 700 may also control the image former 200 to form an image corresponding to image data included in a printing job on the print medium P, upon reception of the printing job through the communication unit 600.

As described above, the image forming apparatus 100 outputs the printer advertising signal PRI_ADV_SIG, and forms an image corresponding to image data included in the printing job.

Features of the portable electronic device 10 will now be described.

FIG. 8 shows the exterior of a portable electronic device included in an image forming system, according to an embodiment, and FIG. 9 is a block diagram of a portable electronic device included in an image forming system, according to an embodiment.

Referring to FIGS. 8 and 9, the portable electronic device 10 may include a terminal interface 40, a terminal storage 50, a terminal communication unit 60, a terminal controller 70.

The terminal interface 40 may include input buttons 41 to receive control commands from the user, and a touch screen 42 for displaying operation information according to a control command from the user.

The input buttons 41 may include a power button 41a to supply or cutoff power, and a home button 41b to stop operation of an application running in the portable electronic device 10.

The input buttons 41 may employ micro switches, membrane switches, touch switches, or the like.

The touch screen 42 includes a touch panel 42a for detecting coordinates of the user's contact and receiving a control command according to the detected contact coordinates, and a display 42b for displaying information corresponding to the received control command.

The touch panel 42a may employ a capacitive touch panel or a resistive film based touch panel, and the display 42b may use an LCD panel, an LED panel, or an OLED panel.

The terminal storage 50 stores control programs and control data to control operation of the portable electronic device 10.

Especially, the terminal storage 50 may include a solid state disk 51 for mobility and portability of the portable electronic device 10.

The terminal communication unit 60 may include a first wireless communication module 61 for wireless communication with an external device located at a long distance of more than hundreds of meters, and a second wireless communication module 62 for wireless communication with an external device located at a short distance within tens of meters.

The first wireless communication module 61 may communicate wirelessly with an external device located at a long distance using a communication scheme, such as Time Division Multiple Access (TDMA), Code Division Multiple Access (CDMA), Wide Code Division Multiple Access (WCDMA), Wireless Broadband (Wibro), World Interoperability for Microwave Access (WiMAX), Long Term Evolution (LTE), etc.

The second wireless communication module 62 may include a WI-Fi communication module, a Bluetooth communication module, an NFC communication module, a Zigbee communication module.

The Wi-Fi communication module is mainly used for communication between a terminal and an AP to form a short range communication network, and the Bluetooth communication module is mainly used for low energy communication between terminals. The NFC communication module is mainly used for ultra-short range communication within 10 cm or less to improve security, and the Zigbee communication module is used to form a low energy communication network between a plurality of terminals.

The second wireless communication module 62 may receive the printer advertising signal PRI_ADV_SIG and the beacon advertising signal BCN_ADV_SIG, transmit a connection request to an external device, such as the image forming apparatus 100, and communicate directly with the external device. In addition, the second wireless communication module 62 may output the advertising signal ADV_SIG, and may directly communicate with an external device at a connection request from the external device while outputting the advertisement signal ADV_SIG.

Operation of the second wireless communication module 62 of the portable electronic device 10 will now be described in detail.

The terminal controller 70 controls general operation of the portable electronic device 10.

The terminal controller 70 may include a memory 72 for temporarily storing programs and data to control operation of the portable electronic device 10, and a microprocessor 71 for processing data according to the program stored in the memory 72.

The terminal controller 70 may recognize the control command input from the user through the user interface 40 and control the terminal interface 40 to display operation information corresponding to the control command.

The terminal controller 70 may also run an application for which the user has entered a command to run, and control the terminal interface 40 to display information represented by the running application.

The terminal controller 70 may control the terminal communication unit 60 to output the advertising signal ADV_SIG at predetermined intervals or to scan the advertising signal ADV_SIG output from an external device, and calculate a distance between the external device and the portable electronic device 10 based on the strength of the advertising signal ADV_SIG when the advertising signal ADV_SIG is detected.

The terminal controller 70 may also control the terminal communication unit 60 for the second wireless communication module 62 of the terminal communication unit 60 to scan the beacon advertising signal BCN_ADV_SIG output from the beacon 2, and calculate the location of the portable electronic device 10 based on the strength of the beacon advertising signal BCN_ADV_SIG when the beacon advertising signal BCN_ADV_SIG is detected.

The terminal controller 70 also generates a printing job that includes image data corresponding to an image of a target to print out, user authentication information, identification information of the portable electronic device, identification of the image forming apparatus, etc., if the user enters a print command.

The terminal controller 70 may calculate a location of the portable electronic device 10 based on the strength of the beacon advertising signal BCN_ADV_SIG and the location of the image forming apparatus 100 received from the image forming server 900, and display a printer map through the terminal interface 40 based on the calculated location of the portable electronic device 10.

If the image forming apparatus 100 is selected on the printer map, the terminal controller 70 may control the terminal communication unit 60 to send the printing job to the selected image forming apparatus 100.

As described above, the portable electronic device 10 may calculate a distance from the image forming apparatus 100 based on the printer advertising signal PRI_ADV_SIG, and calculate the location of the portable electronic device 10 based on the beacon advertising signal BCN_ADV_SIG.

The image forming server 900 will now be described.

FIG. 10 is a block diagram of an image forming server included in an image forming system, according to an embodiment.

Referring to FIG. 10, the image forming server 900 may include a server storage 950, a server communication unit 960, and a server controller 970.

The server storage 950 stores programs and data for controlling the image forming server 900. The server storage 950 may include a magnetic disk 951, an optical disk 952, or a solid state disk 953.

The server storage 950 may store identification information and location information of the image forming apparatus 100, the output strength of the printer advertising signal PRI_ADV_SIG, identification information and location information of the beacon 2, the output strength of the beacon advertising signal BCN_ADV_SIG, a map of an area in which the image forming apparatus 100 is installed.

The server communication unit 960 may include a wired communication module 961 for communicating with an external device, such as the portable electronic device 10 and the image forming apparatus 100 over the communication network NT (see FIG. 1) or via a communication line.

Specifically, the wireless communication module 961 may include a LAN communication module to connect between a plurality of terminals withing a restricted area, or a WAN communication module to connect between a number of unspecified terminals.

The server controller 970 may control overall operation of the image forming server 900.

The server controller 970 may include a memory 972 for temporarily storing programs and data to control operation of the image forming server 900, and a microprocessor 971 for processing data according to the program stored in the memory 972.

Upon reception of the identification information and location information of the image forming apparatus 100 from the portable electronic device 10 or the image forming apparatus 100 through the server communication unit 960, the server controller 970 matches and stores the received identification information and location information in the server storage 950.

Upon reception of a request for the location information of the image forming apparatus 100 from the portable electronic device 10 through the server communication unit 960, the server controller 970 controls the server communication unit 960 to send the location information of the image forming apparatus 100 corresponding to the received identification information to the portable electronic device 10.

Although not shown, the image forming server 900 may further include a server interface (not shown) for receiving a control command from a manager, and displaying operation information of the image forming server 900.

As described above, the image forming server 900 may store the location information of the image forming apparatus 100, and send the location information of the image forming apparatus 100 to the portable electronic device 10.

Features of the beacon 2 will now be described.

FIG. 11 is a block diagram of a beacon included in an image forming system, according to an embodiment.

Referring to FIG. 11, the beacon 2 may include a beacon storage 5, a beacon communication unit 6, and a beacon controller 7.

The beacon storage 5 stores programs and data for controlling the beacon 2. The beacon storage 5 may include a solid state disk 5*a* for mobility of the beacon 2.

The beacon communication unit 6 may include a wireless communication module 6*a* for communicating with an external device, such as the portable electronic device 10, and outputting the beacon advertising signal BCN_ADV_SIG at predetermined intervals.

The wireless communication module 6*a* may include a WI-Fi communication module, a Bluetooth communication module, an NFC communication module, a Zigbee communication module.

The wireless communication module 6*a* may output the beacon advertising signal BCN_ADV_SIG, and may directly communicate with an external device at a connection request from the external device, such as the portable electronic device 10.

Operation of the wireless communication module 6*a* of the beacon 2 will now be described in detail.

The controller 7 may control overall operation of the beacon 2.

The controller 7 may include a memory 7*b* for temporarily storing programs and data to control operation of the beacon 2, and a microprocessor 7*a* for processing data according to the program stored in the memory 7*b*.

The controller 7 may also control the beacon communication unit 6 to output the beacon advertising signal BCN_ADV_SIG at predetermined intervals.

As described above, the beacon 2 outputs the beacon advertising signal BCN_ADV_SIG at predetermined intervals.

Operations of the wireless communication module 620 included in the image forming apparatus 100, the second wireless communication module 62 of the portable electronic device 10, and the wireless communication module 6*a* of the beacon 2 will now be described in detail.

FIG. 12 shows communication operation modes of an image forming apparatus, portable electronic device and beacon, according to an embodiment.

The image forming apparatus 100, the portable electronic device 10, and the beacon 2 (hereinafter, referred to as a terminal device) may each have five operation modes, as shown in FIG. 12.

Specifically, the terminal device may operate in a standby mode SBY, a scanning mode SCA, an advertising mode ADV, an initializing mode IN, and a connecting mode CON.

The standby mode SBY is a mode in which the terminal device waits for a communication command from the user or system.

In the standby mode SBY, the terminal device may perform a minimum operation to receive a command from the user or system, and as a result, the communication module may consume the lowest energy in the standby mode SBY.

The advertising mode ADV is a mode in which the terminal device transmits the advertising signal periodically.

In the advertising mode ADV, the terminal device only transmits the advertising signal at predetermined intervals and communication between the terminal device and the external device is not connected. That is, in the advertising mode ADV, the terminal device does not perform any operation to maintain communication with the external device, and only responds to a scan request if the scan request is received from the external device.

Furthermore, in the advertising mode ADV, since the terminal device only transmits the advertising signal at predetermined intervals, but does not perform any operation to scan a communication signal sent from an external device or to maintain communication with the external device, the terminal device consumes extremely low energy.

The scanning mode SCA is a state in which the terminal device scans the advertising signal.

In the scanning mode SCA, the terminal device scans the advertising signal, and identifies the external device transmitting the advertising signal based on advertising data included in the advertising signal if the advertising signal is scanned. The terminal device may also calculate a distance between the external device and the terminal device based on the received signal strength of the advertising signal.

Also in the scanning mode SCA, only the advertising signal is scanned, but the communication between the terminal device and the external device is not connected. That is, in the scanning mode SCA, the terminal device is not actually in a state of exchanging data.

The initializing mode IN is a state in which the terminal device performs a series of operations to make connection with an external device.

Specifically, if the advertising signal is scanned in the aforementioned scanning mode SCA, the terminal device may enter into the initializing mode IN from the scanning mode SCA through the standby mode SBY.

In the initializing mode IN, the terminal device performs an initializing operation for connection of communication with an external device. Specifically, the terminal device forwards a connection request to the external device that transmits the advertising signal, and if a response to the connection request is received, the wireless communication module 620 enters into the connecting mode CON, which will be described later, after setting a security level.

The connecting mode CON is a state in which communication between the terminal device and the external device is connected.

In the connecting mode CON, the terminal device may exchange data with the external device. Specifically, the terminal device transmits data to the external device for a transmit period, and receives data transmitted by the external device for a receive period after the transmit period.

Furthermore, in connecting mode CON, the terminal device may operate as a master device or a slave device.

The master device may set order of sending data among devices, between which connection is established, and set a transmit time to transmit data and a receive time to receive data, and the slave device may transmit data in the order in the transmit period set by the master device.

Furthermore, the terminal device that has requested connection becomes the master device. Specifically, a terminal device that detects the advertising signal transmitted from an external device in the scanning mode SCA and sends the connection request to the external device in the initializing mode INI becomes the master device, and a terminal device that enters into the connecting mode CON in response to the connection request while transmitting the advertising signal in the advertising mode ADV becomes the slave device.

As described above, the image forming apparatus 100 transmits the printer advertising signal PRI_ADV_SIG. Specifically, the image forming apparatus 100 may enter into the connecting mode CON upon reception of the connection request from the portable electronic device 10 in the advertising mode ADV. In the connecting mode CON, the image forming apparatus 100 operates as the slave device.

The portable electronic device 10 scans the printer advertising signal PRI_ADV_SIG transmitted by the image forming apparatus 100. Specifically, upon detection of the printer advertising signal PRI_ADV_SIG in the scanning mode SCA, the portable electronic device 10 may enter into the connecting mode CON by transmitting the connection request to the image forming apparatus 100. In the connecting mode CON, the portable electronic device 10 operates as the master device.

After completion of data transmission/reception, the terminal device in the connecting mode CON enters into the standby mode SBY.

The terminal device may only operate in one of the standby mode SBY, the scanning mode SCA, the advertising mode ADV, the initializing mode IN, and the connecting mode CON.

In the connecting mode CON, the terminal device may output or scan the advertising signal. In other words, in the connecting mode CON, the slave device may transmit the advertising signal while the master device may scan the advertising signal.

This will be described in detail later in connection with FIG. 13.

FIG. 13 shows frequency bands in which an image forming apparatus, a portable electronic device and a beacon perform communication, according to an embodiment.

The terminal device may perform communication using radio waves at the frequency of 2.4 Giga-Hertz (GHz), as shown in FIG. 13.

Furthermore, the terminal device divides the 2.4GHz frequency band (specifically, the frequency band from 2.4GHz to 2.48GHz) into 40 channels, and transmits/receives data in a frequency hopping method to prevent communication jam with the external device.

Among the 40 channels, the frequency band of 2.402GHz (frequency band centered at 2.402 GHz), the frequency band of 2.426GHz (frequency band centered at 2.426 GHz), the frequency band of 2.480GHz (frequency band centered at 2.480 GHz) correspond to advertising channels for transmitting the advertising signal, and the remaining frequency bands correspond to data channels for transmitting/receiving data.

In other words, the advertising channels for transmitting the advertising signal and the data channels for transmitting/receiving data are physically separated.

Since the advertising channels and data channels are physically separated, the master device in the connecting mode CON may additionally scan the advertising signal and the slave device in the connecting mode CON may transmit the advertising signal.

FIG. 14 shows communication signals transmitted/received by an image forming apparatus, portable electronic device and beacon, according to an embodiment.

A terminal device in the advertising mode ADV (hereinafter, called an advertiser) transmits the advertising signal ADV_SIG at predetermined intervals, as shown in (a) of FIG. 14, and a terminal device in the scanning mode SCA (hereinafter, called a scanner) scans the advertising signal ADV_SIG.

If the scanner detects the advertising signal ADV_SIG, the scanner identifies the advertiser using the advertising signal ADV_SIG, and sends a scan signal SCAN_SIG to the advertiser as shown in (a) of FIG. 14. Upon reception of the scan signal SCAN_SIG, the advertiser transmits a scan response signal SCAN_RSP in response to the scan signal SCAN_SIG.

The advertiser may then keep transmitting the advertising signal ADV_SIG, and the scanner may enter into the initializing mode INI to send the connection request to the advertiser.

The scanner that has entered into the initializing mode INI may send a connection request CON_REQ for requesting communication to the advertiser, as shown in (b) of FIG. 14, and the advertiser that receives the connection request CON_REQ sends a connection response CON_RSP in response to the connection request CON_REQ.

If communication between the advertiser and the scanner is connected, the advertiser operates as the slave device in the connecting mode CON and the scanner operates as the master device in the connecting mode CON.

After this, as shown in (c) of FIG. 14, the master device (scanner) and the slave device (advertiser) alternately transmit data according to the order, data transmit/receive period, and transmitting/receiving time set by the mater device (scanner).

For example, as shown in (c) of FIG. 14, after the master device (scanner) transmits a mater data signal MAS_DATA, the slave device (advertiser) transmits a slave data signal SLA_DATA. After that, the mater device (scanner) transmits the master data signal MAS_DATA again.

FIG. 15 shows information included in communication signals transmitted/received between an image forming apparatus, portable electronic device and beacon, according to an embodiment.

The advertising signal ADV_SIG transmitted by the advertiser has the form of a data packet including a plurality of pieces of information.

Specifically, the advertising signal ADV_SIG may include a preamble representing the advertising signal, an access address to access the advertiser, a device name to identify an image forming system, identification information to identify the advertiser, output strength of the advertiser signal ADV_SIG, and an error correction code for error correction, as shown in (a) of FIG. 15.

The scanner may identify a target system through the device name in the advertiser signal ADV_SIG.

For example, the portable electronic device 10 may distinguish the advertising signal ADV_SIG output by the image forming apparatus 100 of the image forming system 1 from an advertising signal output from an advertiser of another system (e.g., an advertiser signal output from a beacon for location detection) through the device name.

The scanner may identify a target device through the identification information in the advertiser signal ADV_SIG, and access the target device through the access address.

For example, the portable electronic device 10 may distinguish the image forming apparatus 100 that has received a printing job from another image forming apparatus through the identification information, and access the image forming apparatus 100 that has received the printing job through the access address.

The scanner may also calculate a distance between the advertiser and the scanner through the output strength. Specifically, the scanner may calculate the distance between the advertiser and the scanner by comparing the output strength information of the advertising signal ADV_SIG and the received signal strength of the advertising signal (ADV_SIG) received by the scanner.

For example, the portable electronic device 10 may calculate a distance between the image forming apparatus 100 and the portable electronic device 10 based on a ratio of the received signal strength of the advertising signal (ADV_SIG) that the portable electronic device 10 has received to the output strength information included in the advertising signal ADV_SIG.

Data signals transmitted/received by the master device and the slave device after communication between the advertiser and the scanner is connected, also have the form of data packets including a plurality of pieces of information.

Specifically, the data signal may include a preamble representing the data signal, an access address to access the device that transmits the data signal, data for transmission, and an error correction code for error correction, as shown in (b) of FIG. 15.

Features of the image forming apparatus 100, the portable electronic device 10, the image forming server 900, and the beacon 2 included in the image forming system 100 have been described above.

Operations of the image forming apparatus 100, the portable electronic device 10, the image forming server 900, and the beacon 2 included in the image forming system 100 will now be described.

The image forming system 1 registers the location of the image forming apparatus 100 automatically or at a command from the user. If the user enters a print command, the image forming system 1 displays information about the location of the registered image forming apparatus 100 through the portable electronic device 10.

How the image forming system 1 registers the location of the image forming apparatus 100 will be first described.

FIG. 16 is an example of operation of how an image forming system registers a location of an image forming apparatus, according to an embodiment.

Referring to FIG. 16, operation of how the image forming system 1 registers a location of the image forming apparatus 100 at the user's command to register the location of the image forming apparatus will be briefly described.

First, the image forming system 1 determines whether a command to register the location of the image forming apparatus (hereinafter, referred to as a 'register location command') is entered from the user, in 1010.

The user may enter the register location command through the portable electronic device 10 or the image forming apparatus 100.

For example, if the image forming apparatus 100 is newly installed or the image forming apparatus 100 whose location is unregistered is discovered, the user may enter the register location command through the portable electronic device 10 at a close distance to the image forming apparatus 100 or through the image forming apparatus 100.

Once the register location command is entered ('yes' in 1010), the image forming system 1 detects where the user is, in 1020.

Specifically, the image forming system 1 may detect the location of the portable electronic device 10 the user carries in order to detect where the user is. Since the portable electronic device 10 the user carries and the user are relatively close to each other, the image forming system 1 may use the location of the portable electronic device 10 for the location of the user.

After this, the image forming system 1 registers the location of the image forming apparatus 100, in 1030.

Specifically, the image forming system 1 may register the detected location of the portable electronic device 10 as the location of the image forming apparatus 100.

As described above, registration of the location of the image forming apparatus 100 may be tried after the user purchases the image forming apparatus 100 or moves the location of the image forming apparatus 100. In this case, it may be assumed that the user will enter the register location command to register the location of the image forming apparatus 100 at a close distance to the image forming device 100.

As described above, since it may be assumed that the user is at a close distance to the image forming apparatus 100 and the portable electronic device 10 is at a close distance to the user, the image forming system 1 may register the location of the portable electronic device 10 as the location of the image forming apparatus 100.

FIG. 17 is an example of location registration operation of an image forming apparatus, portable electronic device, and image forming server included in an image forming system, according to an embodiment, and FIG. 18 is an example of detecting the location of a portable electronic device included in an image forming system, according to an embodiment.

Referring to FIGS. 17 and 18, location registration operation 1100 of the image forming apparatus 100, portable electronic device 10, and image forming server 900 to register the location of the image forming apparatus 100 will be described.

First, the portable electronic device 10 determines whether a command to register the location of the image forming apparatus (hereinafter, referred to as the 'register location command') is entered from the user, in 1110.

The user who tries to register the location of the image forming apparatus 100 may enter the register location command through the terminal interface 40 of the portable electronic device 10 at a close distance to the image forming apparatus 100.

Once the register location command is entered ('yes' in 1110), the portable electronic device 10 scans the beacon advertising signal BCN_ADV_SIG, in 1120.

Specifically, the portable electronic device 10 searches channels 37 (channel with the center frequency of 2.402GHz), 38 (channel with the center frequency of 2.426GHz), and 39 (channel with the center frequency of 2.480GHz) shown in FIG. 13 for radio signals in the scanning mode SCA.

If a radio signal is received in the channel 37, 38, or 39, the portable electronic device 10 determines whether the received radio signal corresponds to the advertising signal ADV_SIG. For example, the portable electronic device 10 may determine whether the received radio signal is the advertising signal ADV_SIG according to whether the received radio signal includes information corresponding to the preamble shown in (a) of FIG. 15.

If the received radio signal corresponds to the advertising signal ADV_SIG, the portable electronic device 10 determines whether the received advertising signal ADV_SIG is the beacon advertising signal BCN_ADV_SIG of the image forming system 1. For example, the portable electronic device 10 may determine whether the received advertising signal ADV_SIG is the beacon advertising signal BCN_ADV_ SIG according to whether the device name corresponding to what is shown in (a) of FIG. 15 corresponds to the beacon 2 of the image forming system 1.

Furthermore, the portable electronic device 10 may identify the beacon 2 that outputs the beacon advertising signal BCN_ADV_SIG based on the information of the received radio signal included in the field corresponding to the identification information shown in (a) of FIG. 15. That is, if a plurality of the beacon advertising signals BCN_SDV_ SIG are received, the portable electronic device 10 may identify the beacons 2 that output the respective beacon advertising signals BCN_ADV_SIG.

In other words, as shown in FIG. 18, if a plurality of beacons 2-1, 2-2, and 2-3 output the beacon advertising signals BCN_ADV_SIG, the respective beacons 2-1, 2-2, and 2-3 may be identified through the identification information fields of the beacon advertising signals BCN_ADV_ SIG.

When the beacon advertising signal BCN_ADV_SIG is scanned, the portable electronic device 10 measures the received signal strength of the beacon advertising signal BCN_ADV_SIG, in 1130.

If a plurality of beacon advertising signals BCN_ADV_ SIG are received, the portable electronic device 10 may measure the received signal strengths of the respective beacon advertising signals BCN_ADV_SIG.

For example, the portable electronic device 10 may calculate an average of the strength of the beacon advertising signal BCN_ADV_SIG received for a certain period of time after digitizing the beacon advertising signal BCN_ADV_SIG using e.g., an analog-to-digital converter (ADC), and take the calculated average as the received signal strength of the beacon advertising signal BCN_ADV_SIG.

The portable electronic device 10 then generates information about a distance to the beacon 2, and sends the distance information to the image forming apparatus 100 or the image forming server 900, in 1140.

For example, the portable electronic device 10 may generate distance information D1, D2, D3 to the plurality of beacons 2-1, 2-2, and 2-3 based on the received signal strengths of the beacon advertising signals BCN_ADV_SIG output by the plurality of beacons 2-1, 2-2, and 2-3, as shown in FIG. 18. The distance information D1, D2, D3 to the beacon 2 generated by the portable electronic device 10 may include identification information of the beacon 2 to identify the plurality of beacons 2-1, 2-2, 2-3.

As described above, the distance information to the beacon 2 may have various forms.

For example, the distance information to the beacon 2 may include the identification information of the beacon 2 that outputs the beacon advertising signal BCN_ADV_SIG, and the received signal strength of the beacon advertising signal BCN_ADV_SIG. In this case, the portable electronic device 10 may generate the distance information by combining the identification information of the beacon 2 and the received signal strength of the beacon advertising signal BCN_ADV_SIG.

In another example, the distance information to the beacon 2 may include the identification information of the beacon 2 that outputs the beacon advertising signal BCN_ADV_SIG, and a distance between the portable electronic device 10 and the beacon 2. In this case, the portable electronic device 2 may calculate a distance to the beacon 2 from the received signal strength of the beacon advertising signal BCN_ADV_SIG based on the fact that the strength of the radio signal decreases in inverse proportion to the square of the distance, and generate the distance information by combining the identification information of the beacon 2 and the distance to the beacon 2.

The portable electronic device 10 may send the information about distances D1, D2, D3 between the beacons 2 and the portable electronic device 10 to the image forming apparatus 100, the image forming server 900, or the image forming apparatus 100 and the image forming server 900, over the communication network NT. For example, in a case that the image forming apparatus 100 and the image forming server 900 are integrally arranged, the portable electronic device 10 may send the information about the distances D1, D2, D3 between the beacons 2 and the portable electronic device 10 to the image forming apparatus 100. In a case that the image forming apparatus 100 and the image forming server 900 are separately arranged, the portable electronic device 10 may send the information about the distances D1, D2, D3 between the beacons 2 and the portable electronic device 10 to the image forming server 900 or the image forming apparatus 100.

The image forming apparatus 100 or the image forming server 900 that receives the information about the distance between the portable electronic device 10 and the beacon 2 calculates the location of the portable electronic device 10, in 1150.

Specifically, the image forming apparatus 100 or the image forming server 900 may calculate the location of the portable electronic device 10 using the distance information received from the portable electronic device 10.

For example, if the distance information includes the received signal strength of the beacon advertising signal BCN_ADV_SIG, the image forming apparatus 100 or the image forming server 900 calculates the distance between the portable electronic device 10 and the beacon 2 based on the received signal strength of the beacon advertising signal BCN_ADV_SIG. The image forming apparatus 100 or the image forming server 900 may then calculate the location of the portable electronic device 10 based on the calculated distance and the location of the beacon 2 stored in advance, using the trilateration algorithm or the finger printing algorithm.

In another example, if the distance information includes the distance between the portable electronic device 10 and the beacon 2, the image forming apparatus 100 or the image forming server 900 may then calculate the location of the portable electronic device 10 based on the distance between the beacon 2 and the portable electronic device 10 and the location of the beacon 2 stored in advance, using the trilateration algorithm or the finger printing algorithm.

The image forming apparatus 100 or the image forming server 900 then registers the location of the portable electronic device 10 as the location of the image forming apparatus 100, in 1160.

Specifically, the image forming apparatus 100 or the image forming server 900 matches and stores the identification information and the location information of the image forming apparatus 100 in the storage 500 or in the server storage 950.

As described above, since the user who tries to register the location of the image forming apparatus 100 is expected to be at a close distance to the image forming apparatus 100, the image forming apparatus 100 or the image forming server 900 may register the location of the portable electronic device 10 he/she carries as the location of the image forming apparatus 100.

As described above, if the register location command is entered, the image forming system 1 may calculate the location of the portable electronic device 10 and register the location of the portable electronic device 10 as the location of the image forming apparatus 100.

FIG. 19 is another example of location registration operation of an image forming apparatus, portable electronic device, and image forming server included in an image forming system, according to an embodiment, and FIG. 20 is another example of detecting the location of a portable electronic device included in an image forming system, according to an embodiment.

Referring to FIGS. 19 and 20, location registration operation 1200 of the image forming apparatus 100, portable electronic device 10, and image forming server 900 to register the location of the image forming apparatus 100 will be described.

First, the portable electronic device 10 determines whether a command to register the location of the image forming apparatus (hereinafter, referred to as the 'register location command') is entered from the user, in 1210.

The user who tries to register the location of the image forming apparatus 100 may enter the register location command through the terminal interface 40 of the portable electronic device 10 at a close distance to the image forming apparatus 100.

Once the register location command is entered ('yes' in 1210), the portable electronic device 10 scans the printer advertising signal PRI_ADV_SIG, in 1220.

Specifically, the portable electronic device 10 searches channels 37 (channel with the center frequency of 2.402GHz), 38 (channel with the center frequency of 2.426 GHz), and 39 (channel with the center frequency of 2.480GHz) shown in FIG. 13 for radio signals.

If a radio signal is received in the channel 37, 38, or 39, the portable electronic device 10 determines whether the received signal corresponds to the advertising signal ADV_SIG. For example, the portable electronic device 10 may determine whether the received radio signal is the advertising signal ADV_SIG according to whether the received radio signal includes information corresponding to the preamble shown in (a) of FIG. 15.

If the received radio signal corresponds to the advertising signal ADV_SIG, the portable electronic device 10 determines whether the received advertising signal ADV_SIG is the printer advertising signal PRI_ADV_SIG of the image forming system 1. For example, the portable electronic device 10 may determine whether the received advertising signal ADV_SIG is the printer advertising signal PRI_AD-V_SIG according to whether the device name corresponding to what is shown in (a) of FIG. 15 corresponds to the image forming apparatus 100 of the image forming system 1.

Furthermore, the portable electronic device 10 may identify the image forming apparatus 100 that outputs the printer advertising signal PRI_ADV_SIG based on the information of the received radio signal included in the field corresponding to the identification information shown in (a) of FIG. 15.

When the printer advertising signal PRI_ADV_SIG is scanned, the portable electronic device 10 measures the received signal strength of the printer advertising signal PRI_ADV_SIG, in 1230.

For example, the portable electronic device 10 may calculate an average of the strength of the printer advertising signal PRI_ADV_SIG received for a certain period of time after digitizing the printer advertising signal PRI_ADV_SIG using e.g., an analog-to-digital converter (ADC), and take the calculated average as the received signal strength of the printer advertising signal PRI_ADV_SIG.

The portable electronic device 10 then sets an offset of the received signal strength of the printer advertising signal PRI_ADV_SIG, in 1240.

As shown in FIG. 20, if there is an obstacle O located around the image forming apparatus 100, which interferes with radio signals, the printer advertising signal PRI_AD-V_SIG output from the image forming apparatus 100 may be attenuated. The obstacle O may correspond to anything that interferes with radio signals, such as a partition, a pot, or the like, located around the image forming apparatus 100.

If the printer advertising signal PRI_ADV_SIG output from the image forming apparatus 100 is attenuated by the obstacle O, an error may occur in calculating the distance between the image forming apparatus 100 and the portable electronic device 10 based on the printer advertising signal PRI_ADV_SIG.

As will be described below, the portable electronic device 10 calculates the distance between the portable electronic device 10 and the image forming apparatus 100 based on the received signal strength of the printer advertising signal PRI_ADV_SIG. If there is an obstacle O located between the portable electronic device 10 and the image forming apparatus 100 as shown in FIG. 20, an error is likely to occur in calculating the distance between the image forming apparatus 100 and the portable electronic device 10.

To prevent this error, the portable electronic device 10 scans the printer advertising signal PRI_ADV_SIG output from the image forming apparatus 100 while registering the location of the image forming apparatus 100, and measures the received signal strength of printer advertising signal PRI_ADV_SIG.

The portable electronic device 10 then compares the received signal strength of the printer advertising signal PRI_ADV_SIG with a predetermined reference strength. The reference strength herein refers to a received signal strength of the printer advertising signal PRI_ADV_SIG received by the portable electronic device 10, in the case that the portable electronic device 10 is located at a close distance to the image forming apparatus 100.

If the received signal strength of the printer advertising signal PRI_ADV_SIG is equal to or greater than the reference strength, the portable electronic device 10 may set the receive offset of the printer advertising signal to be "0". In other words, if the received signal strength of the printer advertising signal PRI_ADV_SIG is equal to or greater than the reference strength, the portable electronic device 10 may determine that the printer advertising signal PRI_ADV_SIG is not attenuated by any obstacle O around the image forming apparatus 100.

Furthermore, if the received signal strength of the printer advertising signal PRI_ADV_SIG is equal to or greater than the reference strength, the portable electronic device 10 may set the receive offset of the printer advertising signal to be a difference between the reference strength and the received signal strength of the printer advertising signal PRI_AD-V_SIG. In other words, the portable electronic device 10 may set the receive offset of the printer advertising signal to be as much as the printer advertising signal PRI_ADV_SIG is attenuated by the obstacle O.

Once the receive offset of the printer advertising signal is set as described above, the portable electronic device 10 may calculate a distance between the image forming apparatus 100 and the portable electronic device 10 based on the sum of the received signal strength of the printer advertising signal PRI_ADV_SIG and the offset when the printer advertising signal PRI_ADV_SIG is received.

The portable electronic device 10 then scans the beacon advertising signal BCN_ADV_SIG, in 1250.

Specifically, the portable electronic device 10 searches channels 37 (channel with the center frequency of 2.402GHz), 38 (channel with the center frequency of 2.426GHz), and 39 (channel with the center frequency of 2.480GHz) shown in FIG. 13 for radio signals.

If a radio signal is received in the channel 37, 38, or 39, the portable electronic device 10 determines whether the received radio signal corresponds to the advertising signal ADV_SIG.

If the received radio signal corresponds to the advertising signal ADV_SIG, the portable electronic device 10 determines whether the received advertising signal ADV_SIG is the beacon advertising signal BCN_ADV_SIG of the image forming system 1.

Furthermore, the portable electronic device 10 may identify the beacon 2 that outputs the beacon advertising signal BCN_ADV_SIG based on the information of the received radio signal included in the field corresponding to the identification information shown in (a) of FIG. 15.

When the beacon advertising signal BCN_ADV_SIG is scanned, the portable electronic device 10 measures the received signal strength of the beacon advertising signal BCN_ADV_SIG, in 1260.

If a plurality of beacon advertising signals BCN_ADV_SIG are received, the portable electronic device 10 may measure the received signal strengths of the respective beacon advertising signals BCN_ADV_SIG.

For example, the portable electronic device 10 may calculate an average of the strength of the beacon advertising signal BCN_ADV_SIG received for a certain period of time after digitizing the beacon advertising signal BCN_ADV_SIG using e.g., an ADC, and take the calculated average as the received signal strength of the beacon advertising signal BCN_ADV_SIG.

The portable electronic device 10 then generates information about a distance to the beacon 2, and sends the distance information to the image forming apparatus 100 or the image forming server 900, in 1270.

The portable electronic device 10 may generate distance information D1, D2, D3 to the plurality of beacons 2-1, 2-2, and 2-3 based on the received signal strengths of the beacon advertising signals BCN_ADV_SIG output by the plurality of beacons 2-1, 2-2, and 2-3, as shown in FIG. 20. The distance information D1, D2, D3 generated by the portable electronic device 10 may include identification information of the beacon 2 to identify the plurality of beacons 2-1, 2-2, 2-3.

The distance information to the beacon 2 may include the distance to the beacon 2 calculated based on the received signal strength of the beacon advertising signal BCN_ADV_SIG, or the received signal strength of the beacon advertising signal BCN_ADV_SIG.

The portable electronic device 10 may send the information about a distance between the beacon 2 and the portable electronic device 10 to the image forming apparatus 100 or the image forming server 900 over the communication network NT.

The image forming apparatus 100 or the image forming server 900 that receives the information about the distance between the portable electronic device 10 and the beacon 2 calculates the location of the portable electronic device 10, in 1280.

Specifically, the image forming apparatus 100 or the image forming server 900 may calculate the location of the portable electronic device 10 based on the distance information received from the portable electronic device 10, using the trilateration algorithm or the finger printing algorithm.

The image forming apparatus 100 or the image forming server 900 then registers the location of the portable electronic device 10 as the location of the image forming apparatus 100, in 1290.

Specifically, the image forming apparatus 100 or the image forming server 900 matches and stores the identification information and the location information of the image forming apparatus 100 in the storage 500 or in the server storage 950.

As described above, since the user who tries to register the location of the image forming apparatus 100 is expected to be at a close distance to the image forming apparatus 100, the image forming apparatus 100 or the image forming server 900 may store the location of the portable electronic device 10 he/she carries as the location of the image forming apparatus 100.

As described above, upon reception of the register location command, the image forming system 1 may set a receive offset of the printer advertising signal PRI_ADV_SIG, thereby preventing a potential error that might occur in calculating the distance between the image forming apparatus 100 and the portable electronic device 10.

FIG. 21 is another example of location registration operation of an image forming apparatus, portable electronic device, and image forming server included in an image forming system, according to an embodiment.

Referring to FIG. 21, location registration operation 1300 of the image forming apparatus 100, portable electronic device 10, and image forming server 900 to register the location of the image forming apparatus 100 will be described.

First, the portable electronic device 10 determines whether a command to register the location of the image forming apparatus (hereinafter, referred to as the 'register location command') is entered from the user, in 1310.

The user who tries to register the location of the image forming apparatus 100 may enter the register location command through the terminal interface 40 of the portable electronic device 10 at a close distance to the image forming apparatus 100.

Once the register location command is entered ('yes' in 1310), the portable electronic device 10 scans the beacon advertising signal BCN_ADV_SIG, in 1320.

Specifically, the portable electronic device 10 searches the channels 37 (the channel with the center frequency of 2.402GHz), 38 (the channel with the center frequency of 2.426GHz), and 39 (the channel with the center frequency of 2.480GHz) for radio signals, and upon reception of a radio signal in the channel 37, 38, or 39, determines whether the received radio signal corresponds to the advertising signal ADV_SIG.

If the received radio signal corresponds to the advertising signal ADV_SIG, the portable electronic device 10 determines whether the received advertising signal ADV_SIG is the beacon advertising signal BCN_ADV_SIG of the image forming system 1.

Furthermore, the portable electronic device 10 may identify the beacon 2 that outputs the beacon advertising signal BCN_ADV_SIG based on the information of the received radio signal included in the field corresponding to the identification information shown in (a) of FIG. 15.

When the beacon advertising signal BCN_ADV_SIG is scanned, the portable electronic device 10 measures the received signal strength of the beacon advertising signal BCN_ADV_SIG, in 1330.

If a plurality of beacon advertising signals BCN_ADV_SIG are received, the portable electronic device 10 may measure the received signal strengths of the respective beacon advertising signals BCN_ADV_SIG.

The portable electronic device 10 then calculates the location of the portable electronic device 10 based on the received signal strength of the beacon advertising signal BCN_ADV_SIG, in 1340.

Specifically, the portable electronic device 10 calculates a distance between the beacon 2 and the portable electronic device 10 based on the beacon advertising signal BCN_ADV_SIG, and calculates the location of the portable electronic device 10 based on the distance between the beacon 2 and the portable electronic device 10.

For example, the portable electronic device 10 may calculate the distance between the beacon 2 and the portable electronic device 10 based on the received signal strength of the beacon advertising signal BCN_ADV_SIG, using the fact that the signal strength of radio signals is attenuated by the square of a transmission distance.

The portable electronic device 10 may calculate the location of the portable electronic device 2 based on the distance to the beacon 2 and the location of the beacon 2 stored in advance, using the trilateration algorithm or the finger printing algorithm.

The portable electronic device 10 then transmits the location information of the portable electronic device 10 to the image forming apparatus 100 or the image forming server 900, in 1350. Specifically, the portable electronic device 10 may send the location information of the portable electronic device 10 to the image forming apparatus 100 or the image forming server 900 over the communication network NT.

The image forming apparatus 100 or the image forming server 900, which receives the location information of the portable electronic device 10, registers the location of the portable electronic device 10 as the location of the image forming apparatus 100, in 1360.

Specifically, the image forming apparatus 100 or the image forming server 900 matches and stores the identification information and the location information of the image forming apparatus 100 in the storage 950.

As described above, since the user who tries to register the location of the image forming apparatus 100 is expected to be at a close distance to the image forming apparatus 100, the image forming server 900 may store the location of the portable electronic device 10 he/she carries as the location of the image forming apparatus 100.

As described above, the portable electronic device 10 included in the image forming system 1 may calculate the location of the portable electronic device 10, and register the location as the location of the image forming apparatus 100 by sending the location to the image forming server 900.

In the above description, it is assumed that the user enters the register location command through the portable electronic device 10.

The register location command, however, may be entered not only through the portable electronic device 10 but also through the image forming apparatus 100.

FIG. 22 is another example of location registration operation of an image forming apparatus, portable electronic device, and image forming server included in an image forming system, according to an embodiment.

Referring to FIG. 22, location registration operation 1400 of the image forming apparatus 100, portable electronic device 10, and image forming server 900 to register the location of the image forming apparatus 100 will be described.

First, the image forming system 100 determines whether a command to register the location of the image forming apparatus (hereinafter, referred to as a 'register location command') is entered from the user, in 1410.

The user who tries to register the location of the image forming apparatus 100 may enter the register location command through the user interface 400 of the image forming apparatus 100 at a close distance to the image forming apparatus 100.

Once the register location command is entered ('yes' in 1310), the image forming apparatus 100 requests location information of the portable electronic device 10 from the portable electronic device 10, in 1420.

Specifically, the image forming apparatus 100 may request location information from the portable electronic device 10 directly, or over the communication network NT.

Especially, it is possible for the image forming apparatus 100 to request the location information directly from the portable electronic device 10 after the image forming apparatus 100 enters into the connecting mode CON at the connection request from the portable electronic device 10.

The portable electronic device 10 that has received the request of the location information scans the beacon advertising signal BCN_ADV_SIG, in 1430.

Specifically, the portable electronic device 10 searches the channels 37 (the channel with the center frequency of 2.402GHz), 38 (the channel with the center frequency of 2.426GHz), and 39 (the channel with the center frequency of 2.480GHz) for radio signals, and upon reception of a radio signal in the channel 37, 38, or 39, determines whether the received radio signal corresponds to the advertising signal ADV_SIG.

If the received radio signal corresponds to the advertising signal ADV_SIG, the portable electronic device 10 determines whether the received advertising signal ADV_SIG is the beacon advertising signal BCN_ADV_SIG of the image forming system 1.

Furthermore, the portable electronic device 10 may identify the beacon 2 that outputs the beacon advertising signal BCN_ADV_SIG based on the information of the received radio signal included in the field corresponding to the identification information shown in (a) of FIG. 15.

When the beacon advertising signal BCN_ADV_SIG is scanned, the portable electronic device 10 measures the received signal strength of the beacon advertising signal BCN_ADV_SIG, in 1440.

If a plurality of beacon advertising signals BCN_ADV_SIG are received, the portable electronic device 10 may measure the received signal strengths of the respective beacon advertising signals BCN_ADV_SIG.

The portable electronic device 10 then generates information about a distance to the beacon 2, and sends the distance information to the image forming server 900, in 1450.

Specifically, the portable electronic device 10 may send the information about a distance between the beacon 2 and the portable electronic device 10 to the image forming server 900 over the communication network NT.

As described above, the distance information to the beacon 2 may include the distance to the beacon 2 calculated based on the received signal strength of the beacon advertising signal BCN_ADV_SIG, or the received signal strength of the beacon advertising signal BCN_ADV_SIG.

The image forming server 900 that has received the information about the distance between the portable electronic device 10 and the beacon 2 calculates the location of the portable electronic device 10, in 1460.

Specifically, the image forming server 900 may calculate the location of the portable electronic device 10 based on the distance information received from the portable electronic device 10, using the trilateration algorithm or the finger printing algorithm.

The image forming server 900 then registers the location of the portable electronic device 10 as the location of the image forming apparatus 100, in 1470.

Specifically, the image forming server 900 stores the identification information and the location information of the image forming apparatus 100 in the storage 950.

As described above, since the user who tries to register the location of the image forming apparatus 100 is expected to be at a close distance to the image forming apparatus 100, the image forming server 900 may store the location of the portable electronic device 10 he/she carries as the location of the image forming apparatus 100.

As described above, the user may enter the register location command through the image forming apparatus 100, and the image forming system 100 may calculate the location of the portable electronic device 10 the user carries and register the location of the portable electronic device 10 as the location of the image forming apparatus 100.

In the above description, it is assumed that the image forming system 1 calculates the location of the portable electronic device 10 and registers the location of the portable electronic device 10 as the location of the image forming apparatus 100.

It is not, however, limited thereto, and the image forming system 1 may calculate the location of the image forming apparatus 100 and register the calculated location as the location of the image forming apparatus 100.

Specifically, the image forming apparatus 100 may operate as a scanner for searching for the advertising signal ADV_SIG, in which case the image forming apparatus 100 may directly receive the beacon advertising signal BCN_ADV_SIG of the beacon 2.

FIG. 23 is another example of location registration operation of an image forming apparatus, portable electronic device, and image forming server included in an image forming system, according to an embodiment, and FIG. 24 is another example of detecting the location of an image forming apparatus included in an image forming system, according to an embodiment.

Referring to FIGS. 23 and 24, location registration operation 1500 of the image forming apparatus 100, portable electronic device 10, and image forming server 900 to register the location of the image forming apparatus 100 will be described.

First, the image forming apparatus 100 determines whether a command to register the location of the image forming apparatus (hereinafter, referred to as a 'register location command') is entered from the user, in 1510.

The user who tries to register the location of the image forming apparatus 100 may enter the register location command through the user interface 400 of the image forming apparatus 100 at a close distance to the image forming apparatus 100.

Once the register location command is entered ('yes' in 1510), the image forming apparatus 100 scans the beacon advertising signal BCN_ADV_SIG, in 1520.

Specifically, the image forming apparatus 100 searches the channels 37 (the channel with the center frequency of 2.402GHz), 38 (the channel with the center frequency of 2.426GHz), and 39 (the channel with the center frequency of 2.480GHz) for radio signals, and upon reception of a radio signal in the channel 37, 38, or 39, determines whether the received radio signal corresponds to the advertising signal ADV_SIG.

If the received radio signal corresponds to the advertising signal ADV_SIG, the image forming apparatus 100 determines whether the received advertising signal ADV_SIG is the beacon advertising signal BCN_ADV_SIG of the image forming system 1.

Furthermore, the image forming apparatus 100 may identify the beacon 2 that outputs the beacon advertising signal BCN_ADV_SIG based on the information of the received radio signal included in the field corresponding to the identification information shown in (a) of FIG. 15.

When the beacon advertising signal BCN_ADV_SIG is scanned, the image forming apparatus 100 measures the received signal strength of the beacon advertising signal BCN_ADV_SIG, in 1530.

If a plurality of beacon advertising signals BCN_ADV_SIG are received, the image forming apparatus 100 may measure the received signal strengths of the respective beacon advertising signals BCN_ADV_SIG.

For example, the image forming apparatus 100 may calculate an average of the strength of the beacon advertising signal BCN_ADV_SIG received for a certain period of time after digitizing the beacon advertising signal BCN_ADV_SIG using e.g., an analog-to-digital converter (ADC), and take the calculated average as the received signal strength of the beacon advertising signal BCN_ADV_SIG.

The image forming apparatus 100 then generates information about a distance to the beacon 2, and sends the distance information to the image forming server 900, in 1540.

The image forming apparatus 100 may generate distance information D1, D2, D3 to the plurality of beacons 2-1, 2-2, and 2-3 based on the received signal strengths of the beacon advertising signals BCN_ADV_SIG output by the plurality of beacons 2-1, 2-2, and 2-3, as shown in FIG. 24. The distance information D1, D2, D3 generated by the image forming apparatus 100 may include identification information of the beacon 2 to identify the plurality of beacons 2-1, 2-2, 2-3. The distance information to the beacon 2 may include the distance to the beacon 2 calculated based on the received signal strength of the beacon advertising signal BCN_ADV_SIG, or the received signal strength of the beacon advertising signal BCN_ADV_SIG.

The image forming apparatus 100 may send the distance information to the image forming server 900 over the communication network NT.

The image forming server 900 that has received the information about the distance between the image forming apparatus 100 and the beacon 2 calculates the location of the image forming apparatus 100, in 1550.

Specifically, the image forming server 900 may calculate the location of the image forming apparatus 100 based on the distance information received from the image forming apparatus 100, using the trilateration algorithm or the finger printing algorithm.

The image forming server 900 then registers the location of the image forming apparatus 100, in 1560.

Specifically, the image forming server 900 stores the identification information and the location information of the image forming apparatus 100 in the storage 950.

As described above, the image forming system 1 may register the location of the image forming apparatus 100 using the information about a distance between the image forming apparatus 100 and the beacon 2.

FIG. 25 is another example of location registration operation of an image forming apparatus, portable electronic device, and image forming server included in an image forming system, according to an embodiment.

Referring to FIG. 25, location registration operation 1600 of the image forming apparatus 100, portable electronic device 10, and image forming server 900 to register the location of the image forming apparatus 100 will be described.

First, the image forming apparatus 100 determines whether a command to register the location of the image forming apparatus (hereinafter, referred to as a 'register location command') is entered from the user, in 1610.

The user who tries to register the location of the image forming apparatus 100 may enter the register location command through the user interface 400 of the image forming apparatus 100 at a close distance to the image forming apparatus 100.

Once the register location command is entered ('yes' in 1610), the image forming apparatus 100 scans the beacon advertising signal BCN_ADV_SIG, in 1620.

Specifically, the image forming apparatus 100 searches the channels 37 (the channel with the center frequency of 2.402GHz), 38 (the channel with the center frequency of 2.426GHz), and 39 (the channel with the center frequency of 2.480GHz) for radio signals, and upon reception of a radio signal in the channel 37, 38, or 39, determines whether the received radio signal corresponds to the advertising signal ADV_SIG.

If the received radio signal corresponds to the advertising signal ADV_SIG, the image forming apparatus 100 determines whether the received advertising signal ADV_SIG is the beacon advertising signal BCN_ADV_SIG of the image forming system 1.

Furthermore, the image forming apparatus 100 may identify the beacon 2 that outputs the beacon advertising signal BCN_ADV_SIG based on the information of the received radio signal included in the field corresponding to the identification information shown in (a) of FIG. 15.

When the beacon advertising signal BCN_ADV_SIG is scanned, the image forming apparatus 100 measures the received signal strength of the beacon advertising signal BCN_ADV_SIG, in 1630.

If a plurality of beacon advertising signals BCN_ADV_SIG are received, the image forming apparatus 100 may measure the received signal strengths of the respective beacon advertising signals BCN_ADV_SIG.

The image forming apparatus 100 then calculates the location of the image forming apparatus 100 based on the received signal strength of the beacon advertising signal BCN_ADV_SIG, in 1640.

Specifically, the image forming apparatus 100 calculates a distance between the beacon 2 and the image forming apparatus 100 based on the beacon advertising signal BCN_ADV_SIG, and calculates the location of the image forming apparatus 100 based on the distance between the beacon 2 and the image forming apparatus 100.

For example, the image forming apparatus 100 may calculate the distance between the beacon 2 and the image forming apparatus 100 based on the received signal strength of the beacon advertising signal BCN_ADV_SIG, using the fact that the signal strength of radio signals is attenuated by the square of a transmission distance.

The image forming apparatus 100 may calculate the location of the image forming apparatus 100 based on the distance to the beacon 2 and the location of the beacon 2 stored in advance, using the trilateration algorithm or the finger printing algorithm.

The image forming apparatus 100 then sends the location information of the image forming apparatus 100 to the image forming server 900, in 1650.

Specifically, the image forming apparatus 100 may send the location information of the image forming apparatus 100 to the image forming server 900 over the communication network NT.

The image forming server 900 that has received the location information of the image forming apparatus 100 registers it as the location of the image forming apparatus 100, in 1660.

As described above, the image forming system 1 may register the location of the image forming apparatus 100 using the information about a distance between the image forming apparatus 100 and the beacon 2.

In the above description, it is assumed that the image forming system 1 registers the location of the image forming apparatus 100 according to the register location command from the user, in accordance with an embodiment. It is not, however, limited thereto, and the image forming system 1 accordance with an embodiment may automatically register the location of the image forming apparatus 100.

FIG. 26 is another example of operation of how an image forming system registers a location of an image forming apparatus, according to an embodiment.

Referring to FIG. 26, operation of how the image forming system 1 automatically registers a location of the image forming apparatus 100 will be briefly described.

First, the image forming system 1 determines whether the user approaches the image forming apparatus 100, in 2010.

Specifically, in the image forming system 1, the image forming apparatus 100 may output the printer advertising signal PRI_ADV_SIG and the portable electronic device 10 may calculate a distance between the portable electronic device 10 and the image forming apparatus 100 based on the printer advertising signal PRI_ADV_SIG.

It is not, however, limited thereto, and it is also possible for the portable electronic device 10 to output the advertising signal ADV_SIG and for the image forming apparatus 100 to calculate a distance between the portable electronic device 10 and the image forming apparatus 100 based on the advertising signal ADV_SIG output from the portable electronic device 10.

If the user approaches the image forming apparatus 100 ('yes' in 2010), the image forming system 1 detects where the user is, in 2020.

Specifically, if the distance between the portable electronic device 10 and the image forming apparatus 100 is less than a predetermined reference distance, the image forming system 1 may detect the location of the portable electronic device 10 the user carries. Since the portable electronic device 10 the user carries and the user are relatively close to each other, the image forming system 1 may use the location of the portable electronic device 10 for the location of the user.

After this, the image forming system 1 registers the location of the image forming apparatus 100, in 2030.

Specifically, the image forming system 1 may register the detected location of the portable electronic device 10 as the location of the image forming apparatus 100.

Since whether the user is located at a close distance to the image forming apparatus 100 may be determined based on the received signal strength of the printer advertising signal PRI_ADV_SIG output from the image forming apparatus 100, the image forming system 1 may register the location of the portable electronic device 10 as the location of the image forming apparatus 100.

FIG. 27 is an example of location registration operation of an image forming apparatus, portable electronic device, and image forming server included in an image forming system, according to an embodiment. FIG. 28 is an example of detecting a distance between an image forming apparatus and a portable electronic device included in an image forming system, according to an embodiment, FIG. 29 shows a portable electronic device approaching an image forming apparatus in an image forming system, according to an embodiment, and FIG. 30 is an example of detecting the location of a portable electronic device included in an image forming system, according to an embodiment.

Referring to FIGS. 27 to 30, location registration operation 1100 of the image forming apparatus 100, portable electronic device 10, and image forming server 900 to register the location of the image forming apparatus 100 will be described.

First, the image forming apparatus 100 outputs the printer advertising signal PRI_ADV_SIG, in 2110.

Specifically, the image forming apparatus 100 outputs the printer advertising signal PRI_ADV_SIG at predetermined intervals in the advertising mode ADV.

The portable electronic device 10 scans the printer advertising signal PRI_ADV_SIG, in 2120. Specifically, the portable electronic device 10 scans the printer advertising signal PRI_ADV_SIG in the scanning mode SCA.

For example, the portable electronic device 10 searches channels 37 (channel with the center frequency of 2.402GHz), 38 (channel with the center frequency of 2.426GHz), and 39 (channel with the center frequency of 2.480GHz) shown in FIG. 13 for radio signals.

If a radio signal is received in the channel 37, 38, or 39, the portable electronic device 10 determines whether the received signal corresponds to the advertising signal ADV_SIG. Specifically, the portable electronic device 10 may determine whether the received radio signal is the advertising signal ADV_SIG according to whether the received radio signal includes information corresponding to the preamble shown in (a) of FIG. 15.

If the received radio signal corresponds to the advertising signal ADV_SIG, the portable electronic device 10 determines whether the received advertising signal ADV_SIG is the printer advertising signal PRI_ADV_SIG of the image forming system 1. Specifically, the portable electronic device 10 may determine whether the received advertising signal ADV_SIG is the printer advertising signal PRI_ADV_SIG according to whether the device name corresponding to what is shown in (a) of FIG. 15 corresponds to the image forming apparatus 100 of the image forming system 1.

Furthermore, the portable electronic device 10 may identify the image forming apparatus 100 that outputs the printer advertising signal PRI_ADV_SIG based on the information of the received radio signal included in the field corresponding to the identification information shown in (a) of FIG. 15.

When the printer advertising signal PRI_ADV_SIG is scanned, the portable electronic device 10 measures the received signal strength of the printer advertising signal PRI_ADV_SIG, in 2130.

For example, the portable electronic device 10 may calculate an average of the strength of the printer advertising signal PRI_ADV_SIG received for a certain period of time after digitizing the printer advertising signal PRI_ADV_SIG using e.g., an analog-to-digital converter (ADC), and take the calculated average as the received signal strength of the printer advertising signal PRI_ADV_SIG.

The portable electronic device 10 then determines whether the portable electronic device 10 is located at a close distance to the image forming apparatus 100, in 2140.

The portable electronic device 10 may determine whether the portable electronic device 10 is located at a close distance to the image forming apparatus 100 in two methods.

The first method is to calculate a distance between the portable electronic device 10 and the image forming apparatus 100 and compare the distance with a reference distance.

The portable electronic device 10 may calculate the distance between the portable electronic device 10 and the image forming apparatus 100 based on the printer advertising signal PRI_ADV_SIG, as shown in FIG. 28.

Accordingly, the portable electronic device 10 may calculate the distance between the image forming apparatus 100 and the portable electronic device 10 based on the printer advertising signal PRI_ADV_SIG, and determine whether the calculated distance is less than the reference distance, as shown in FIG. 29.

The second method is to compare the received signal strength of the printer advertising signal PRI_ADV_SIG with the reference strength.

The shorter the distance between the image forming apparatus 100 and the portable electronic device 10, the stronger the signal strength of the printer advertising signal PRI_ADV_SIG.

Accordingly, assuming that the received signal strength of printer advertising signal PRI_ADV_SIG received by the portable electronic device 10, when the distance between the image forming apparatus 100 and the portable electronic device 10 is the reference distance, is determined as the reference strength, whether the distance between the portable electronic device 10 and the image forming apparatus 100 is less than the reference distance may be determined by comparing a received signal strength of the printer advertising signal PRI_ADV_SIG with the reference strength.

In other words, if a received signal strength of the printer advertising signal PRI_ADV_SIG is less than the reference strength, the portable electronic device 10 may determine that the distance between the portable electronic device 10 and the image forming apparatus 100 is greater than the reference distance, as shown in FIG. 28, and if a received signal strength of the printer advertising signal PRI_AD-V_SIG exceeds the reference strength, the portable electronic device 10 may determine that the distance between the portable electronic device 10 and the image forming apparatus 100 is less than the reference distance, as shown in FIG. 29.

If the portable electronic device 10 approaches the image forming apparatus 100 ('yes' in 2140), the portable electronic device 10 scans the beacon advertising signal BCN_ADV_SIG, in 2150.

Specifically, the portable electronic device 10 searches channels 37 (channel with the center frequency of 2.402GHz), 38 (channel with the center frequency of 2.426GHz), and 39 (channel with the center frequency of 2.480GHz) shown in FIG. 13 for radio signals in the scanning mode SCA.

Once a radio signal is received in the channel 37, 38, or 39, the portable electronic device 10 determines whether the received radio signal corresponds to the advertising signal ADV_SIG and determines whether the advertising signal ADV_SIG is the beacon advertising signal BCN_ADV_SIG of the image forming system 1.

Furthermore, the portable electronic device 10 may identify the beacon 2 that outputs the beacon advertising signal BCN_ADV_SIG based on the information of the received radio signal included in the field corresponding to the identification information shown in (a) of FIG. 15.

When the beacon advertising signal BCN_ADV_SIG is scanned, the portable electronic device 10 measures the received signal strength of the beacon advertising signal BCN_ADV_SIG, in 2160.

As shown in FIG. 30, if a plurality of beacon advertising signals BCN_ADV_SIG are received, the portable electronic device 10 may measure the received signal strengths of the respective beacon advertising signals BCN_ADV_SIG.

The portable electronic device 10 then generates information about a distance to the beacon 2, and sends the distance information to the image forming server 900, in 2170.

Specifically, the portable electronic device 10 may generate distance information D1, D2, D3 to the plurality of beacons 2-1, 2-2, and 2-3 based on the received signal strengths of the beacon advertising signals BCN_ADV_SIG output by the plurality of beacons 2-1, 2-2, and 2-3, as shown in FIG. 30.

The distance information to the beacon 2 may include the distance to the beacon 2 calculated based on the received signal strength of the beacon advertising signal BCN_ADV_SIG, or the received signal strength of the beacon advertising signal BCN_ADV_SIG.

Furthermore, the portable electronic device 10 may send the information about a distance D1, D2, D3 to the beacon 2 to the image forming server 900 over the communication network NT.

The image forming server 900 that has received the information about the distance between the portable electronic device 10 and the beacon 2 calculates the location of the portable electronic device 10, in 2180.

Specifically, the image forming server 900 may calculate the location of the portable electronic device 10 based on the distance information received from the portable electronic device 10, using the trilateration algorithm or the finger printing algorithm.

The image forming server 900 then registers the location of the portable electronic device 10 as the location of the image forming apparatus 100, in 2190.

Specifically, the image forming server 900 stores the identification information and the location information of the image forming apparatus 100 in the storage 950.

As described above, if the portable electronic device 10 approaches the image forming apparatus 100, the image forming system 1 may calculate the location of the portable electronic device 10 and register the location of the portable electronic device 10 as the location of the image forming apparatus 100.

In the above description, various methods for the image forming system 1 to register the location of the image forming apparatus 100 will be described.

How the image forming system 1 displays the location information of the image forming apparatus 100 based on the location of the registered image forming apparatus 100 will now be described.

FIG. 31 is an example of image forming operation of how an image forming system displays a location of an image forming apparatus, according to an embodiment.

Referring to FIG. 31, image forming operation 3000 of how the image forming system 1 displays a location of the image forming apparatus 1 for the user and performs image forming operation will be described.

First, the image forming system 1 determines whether a command to search for the location of the image forming apparatus (hereinafter, referred to as a 'search location command') is entered from the user, in 3010.

For example, the user who is not aware of the location of the image forming apparatus 100 may enter the search location command to the image forming system 1 through the portable electronic device 10 in order to search for the location of the image forming apparatus 100.

Once the search location command is entered ('yes' in 3010), the image forming system 1 displays a printer map on which the location of the image forming apparatus 100 is represented, through the portable electronic device 10, in 3020.

The print map herein refers to what represents locations of image forming apparatuses 100 in a map of a region in which the user is located or a map of the inside of a building. The user may obtain information about locations of image forming apparatuses 100 together with information around the user or information about the inside of a building.

The image forming system 1 then determines whether the user has selected one of the image forming apparatuses 100 represented on the printer map, in 3030.

The user may know of the locations of the image forming apparatuses 100 around the user through the printer map displayed on the portable electronic device 10, and select one of the image forming apparatuses 100 represented on the printer map to perform a printing job.

Once the image forming apparatus 100 is selected ('yes' in 3040), the image forming system 1 performs image forming operation through the image forming apparatus 100 selected by the user, in 3040.

The user may send a printing job to the image forming apparatus 100 by pointing the image forming apparatus 100 on the printer map displayed on the portable electronic device 10.

The image forming apparatus 100 that receives the printing job may perform image forming operation to form an image corresponding to image data included in the printing job.

As described above, with an image forming system in accordance with an embodiment, the user who is not aware of where image forming apparatuses 100 are may easily search locations of the image forming apparatuses 100 and send a printing job to one of the image forming apparatuses 100.

FIG. 32 is an example of image forming operation of an image forming apparatus, portable electronic device, and image forming server included in an image forming system, according to an embodiment. FIG. 33 is an example of how an image forming system detects where the user is, according to an embodiment, and FIG. 34 is an example of how an image forming system displays a printing map, according to an embodiment. FIG. 35 shows an example of how an image forming system receives a selection of an image forming apparatus from the user, according to an embodiment, and FIG. 36 shows another example of how an image forming system receives a selection of an image forming apparatus from the user, according to an embodiment.

Referring to FIGS. 32 to 36, image forming operation 3100 of the image forming apparatus 100, portable electronic device 10, and image forming server 900 to display the location of the image forming apparatus 100 and perform image forming will be described.

First, the portable electronic device 10 determines whether a command to search a location of an image forming apparatus (hereinafter, referred to as the 'search location command') is entered from the user, in 3110.

The user may enter the search location command to the portable electronic device 10 through the terminal interface 40 of the portable electronic device 10 to search a location of the image forming apparatus 100.

Once the search location command is entered ('yes' in 3110), the portable electronic device 10 scans the beacon advertising signal BCN_ADV_SIG, in 3120.

Specifically, the portable electronic device 10 searches channels 37 (channel with the center frequency of 2.402GHz), 38 (channel with the center frequency of 2.426GHz), and 39 (channel with the center frequency of 2.480GHz) shown in FIG. 13 for radio signals in the scanning mode SCA.

Once a radio signal is received in the channel 37, 38, or 39, the portable electronic device 10 determines whether the received radio signal corresponds to the advertising signal ADV_SIG and determines whether the advertising signal ADV_SIG is the beacon advertising signal BCN_ADV_SIG of the image forming system 1.

Furthermore, the portable electronic device 10 may identify the beacon 2 that outputs the beacon advertising signal BCN_ADV_SIG based on the information of the received radio signal included in the field corresponding to the identification information shown in (a) of FIG. 15.

In other words, as shown in FIG. 33, if a plurality of beacons 2-4, 2-5, 2-6 and 2-7 output the beacon advertising signals BCN_ADV_SIG, the respective beacons 2-4, 2-5, 2-6 and 2-7 may be identified through the identification information fields of the beacon advertising signals BCN_ADV_SIG.

When the beacon advertising signal BCN_ADV_SIG is scanned, the portable electronic device 10 measures the received signal strength of the beacon advertising signal BCN_ADV_SIG, in 3130.

If a plurality of beacon advertising signals BCN_ADV_SIG are received, the portable electronic device 10 may measure the received signal strengths of the respective beacon advertising signals BCN_ADV_SIG.

The portable electronic device 10 then generates information about a distance to the beacon 2, and sends the distance information to the image forming server 900, in 3140.

For example, the portable electronic device 10 may generate distance information D4, D5, D6, D7 to the plurality of beacons 2-4, 2-5, 2-6 and 2-7 based on the received signal strengths of the beacon advertising signals BCN_ADV_SIG output by the plurality of beacons 2-4, 2-5, 2-6 and 2-7, as shown in FIG. 33.

The distance information D4, D5, D6, D7 to the beacon 2 generated by the portable electronic device 10 may include identification information of the respective beacons 2-4, 2-5, 2-6, 2-7 to identify the plurality of beacons 2-4, 2-5, 2-6, 2-7, and the distance to the beacon 2 calculated based on the received signal strength of the beacon advertising signal BCN_ADV_SIG, or the received signal strength itself of the beacon advertising signal BCN_ADV_SIG.

The portable electronic device 10 may send the information about distances D4, D5, D6, D7 between the beacons 2 and the portable electronic device 10 to the image forming server 900 over the communication network NT.

The image forming server 900 that has received the information about the distances D4, D5, D6, D7 between the portable electronic device 10 and the beacons 2 calculates the location of the portable electronic device 10, in 3140.

For example, the image forming server 900 may calculate the location of the portable electronic device 10 based on the distance information D4, D5, D6, D7 received from the portable electronic device 10, using the trilateration algorithm or the finger printing algorithm.

The image forming server 900 that calculates the location of the portable electronic device 10 sends a printer map that represents the location of the image forming apparatus 100 and the location information of the portable electronic device 10 to the portable electronic device 10, in 3150.

Specifically, the image forming server 900 searches an outdoor map or a map of the inside of a building corresponding to the location of the portable electronic device 10 in the storage 950, and creates a printer map representing the location of the image forming apparatus 100 on the searched map.

The image forming server 900 then sends location information of the portable electronic device 10 along with the printer map to the portable electronic device 10 over the communication network NT, in 3150.

The portable electronic device 10 that has received the printer map and location information of the user from the image forming server 900 displays the printer map and location information of the user, in 3160.

Specifically, the terminal controller 70 of the portable electronic device 10 adds the location information of the portable electronic device 10 onto the printer map received from the image forming server 900, and the terminal interface 40 displays the printer map to which the location information of the portable electronic device 10 is added.

For example, the portable electronic device 10 displays a first printer map PM1 in which an image of the user U, an image of a first image forming apparatus 100-1, and an image of a second image forming apparatus 100-2 are displayed on a map around the user, as shown in FIG. 34.

The user U may determine locations of the first and second image forming apparatuses 100-1 and 100-2 based on the location of the user U through the first printer map PM1.

Furthermore, the first printer map PM1 may display not only the locations of the first and second image forming apparatuses 100-1 and 100-2, but also product information (model name of the image forming apparatus, maximum resolution, size of printable print media, information relating to color/mono mode, remaining amount of toner or ink, remaining quantity of print medium, etc.) of the first and second image forming apparatuses 100-1 and 100-2, or operation information (whether image forming operation is being performed, remaining quantity of image forming, etc.).

The portable electronic device 10 then determines whether the user has selected an image forming apparatus to perform a printing job, in 3170.

The user may select the image forming apparatus 100 to perform a printing job based on the location information, the product information, or the operation information of the plurality of image forming apparatuses 100-1, 100-2 displayed on the first printer map PM1.

For example, the user who wants the first image forming apparatus 100-1 to perform a printing job may select the first image forming apparatus 100-1 by pointing an image of the first image forming apparatus 100-1, as shown in FIG. 35. Specifically, if the user points an area corresponding to an image of the first image forming apparatus 100-1 on the first printer map PM1, the portable electronic device 10 may determine that the first image forming apparatus 100-1 is selected.

In another example, the user who wants the first image forming apparatus 100-1 to perform a printing job may select the first image forming apparatus 100-1 by dragging the image of the user U toward the first image forming apparatus 100-1, as shown in FIG. 36. Specifically, if the user touches the image of the user U on the first printer map PM1 and moves the touch toward the first image forming apparatus 100-1 while remaining in the touching state, the portable electronic device 10 may determine that the first image forming apparatus 100-1 is selected.

Once the image forming apparatus 100 is selected by the user ('yes' in 3170), the portable electronic device 10 sends a printing job to the selected image forming apparatus 100, in 3180.

As described above, the printing job herein may include the image forming command, image data, authentication information of the user who sends the image forming command, identification information of the image forming apparatus 100 to perform image forming operation, etc.

The printing job may be sent from the portable electronic device 10 to the image forming apparatus 100 over the communication network NT or in one-to-one communication between the portable electronic device 10 and the image forming apparatus 100.

The image forming apparatus 100 that has received the printing job from the portable electronic device 10 performs image forming operation according to the printing job, in 3190.

Specifically, the image forming apparatus 100 forms an image corresponding to the image data included in the printing job onto a print medium by a series of operations, such as supply of the print medium, light exposure to a photosensitive drum, development of electrostatic latent image, transfer of a developed toner image onto the print medium, settlement of the toner image onto the print medium, printout of the formed image, etc.

According to the aforementioned image forming operation, a print map is displayed for the user to select the image forming apparatus 100 to perform a printing job, and the image forming apparatus 100 selected by the user may perform the printing job.

In addition, the image forming system 1 may send the printing job to the image forming apparatus 100 located at a shortest distance from the user at the selection of the user, and guide the user to the image forming apparatus 100 at the shortest distance through the portable electronic device 10.

FIG. 37 is an example of image forming operation of how an image forming system selects an optimal image forming apparatus, according to an embodiment.

Referring to FIG. 37, image forming operation 4000 of the image forming system 1 that selects the optimal image forming apparatus 100 and performs image forming will be described.

First, the image forming system 1 determines whether a print command has been entered from the user, in 4010.

For example, the user who is not aware of the location of the image forming apparatus 100 may first enter the print command for an image displayed on the portable electronic device 10 through the portable electronic device 10 before searching the location of the image forming apparatus 100.

Once the print command is entered ('yes' in 4010), the image forming system 1 scans the image forming apparatus 100 within the shortest distance from the user.

For example, the image forming system 1 may detect the location of the user, and determine the image forming apparatus 100 within the shortest distance from the user based on the detected location of the user and registered locations of image forming apparatuses 100, using a shortest-path algorithm.

The image forming system 1 may search the image forming apparatus 100 according to a print option input by the user.

For example, if the user enters the print command for a color image in relation to the color/mono mode, the image forming system 1 may search image forming apparatuses available to print color images, among the registered image forming apparatuses. The image forming system 1 may then determine the image forming apparatus 100 within the shortest distance from the user, among the image forming apparatuses available to print color images.

In another example, if there are lots of things to print out, the image forming system 1 may search the registered image forming apparatuses for ones having sufficient toner left. The image forming system 1 may then determine the image forming apparatus 100 within the shortest distance from the user, among the image forming apparatuses that have sufficient toner left.

In another example, as for the size of the print medium, if the user enters the print command for an image of B5 size (International Organization for Standardization (ISO) standard size, 176 mm×250 mm), the image forming system 1 may search the registered image forming apparatuses for ones available to supply print media of B5 size. The image forming system 1 may then determine the image forming apparatus 100 within the shortest distance from the user, among the image forming apparatuses available to supply print media of B5 size.

The image forming system 1 then displays a path to the image forming apparatus 100 within the shortest distance, in 4030.

For example, the image forming system 1 may display a location of the user and a location of the image forming apparatus 100 within the shortest distance on a printer map displaying location information of a plurality of image forming apparatuses, and display a shortest path from the location of the user to the location of the image forming apparatus 100.

The image forming system 1 then performs image forming operation, in 4040.

For example, if the user approaches the image forming apparatus 100, the image forming system 1 may perform user authentication operation, image forming preparation operation, and image forming operation in order, depending on the distance between the user and the image forming apparatus 100.

As described above, with an image forming system in accordance with an embodiment, even a user who is not aware of where image forming apparatuses 100 are may easily send a printing job to the image forming apparatus 100 within the shortest distance and obtain the print results.

FIG. 38 is an example of image forming operation of an image forming apparatus, portable electronic device, and image forming server included in an image forming system, according to an embodiment, FIG. 39 shows an example of how an image forming system selects an optimal image forming apparatus, according to an embodiment, and FIG. 40 shows an example of how an image forming system guides the user to an optimal image forming apparatus, according to an embodiment.

Referring to FIGS. 37 to 40, image forming operation 4100 of the image forming apparatus 100, portable electronic device 10, and image forming server 900 for the image forming system 1 to select the optimal image forming apparatus 100 and perform image forming will be described in detail.

First, the portable electronic device 10 determines whether the print command is entered from the user, in 4110.

The user may enter the print command for an image displayed on the terminal interface 40 of the portable electronic device 10 through the portable electronic device 10 without selecting the image forming apparatus 100.

Once the print command is entered ('yes' in 4110), the portable electronic device 10 scans the beacon advertising signal BCN_ADV_SIG, in 4120.

Specifically, the portable electronic device 10 searches channels 37 (channel with the center frequency of 2.402GHz), 38 (channel with the center frequency of 2.426GHz), and 39 (channel with the center frequency of 2.480GHz) shown in FIG. 13 for radio signals in the scanning mode SCA.

Once a radio signal is received in the channel 37, 38, or 39, the portable electronic device 10 determines whether the received radio signal corresponds to the advertising signal ADV_SIG and determines whether the advertising signal ADV_SIG is the beacon advertising signal BCN_ADV_SIG of the image forming system 1.

Furthermore, the portable electronic device 10 may identify the beacon 2 that outputs the beacon advertising signal BCN_ADV_SIG based on the information of the received radio signal included in the field corresponding to the identification information shown in (a) of FIG. 15.

When the beacon advertising signal BCN_ADV_SIG is scanned, the portable electronic device 10 measures the received signal strength of the beacon advertising signal BCN_ADV_SIG, in 4130.

If a plurality of beacon advertising signals BCN_ADV_SIG are received, the portable electronic device 10 may measure the received signal strengths of the respective beacon advertising signals BCN_ADV_SIG.

The portable electronic device 10 then generates information about a distance to the beacon 2, and sends the distance information and a printing job to the image forming server 900, in 4140.

For example, the portable electronic device 10 may generate information about distances to the respective beacons 2 based on received signal strengths of beacon advertising signals BCN_ADV_SIG output from the plurality of beacons 2.

The information about distances to the beacons 2 generated by the portable electronic device 10 may include identification information of the beacons 2 to identify the plurality of beacons 2, and distances to the beacons 2 calculated based on the received signal strengths of the beacon advertising signals BCN_ADV_SIG or the received signal strengths themselves of the beacon advertising signals BCN_ADV_SIG.

Furthermore, the printing job herein may include the image forming command, image data, authentication information of the user who sends the image forming command, identification information of the image forming apparatus 100 to perform image forming operation, etc.

The portable electronic device 10 may send the information about the distance between the beacon 2 and the portable electronic device 10 to the image forming server 900 over the communication network NT.

The image forming server 900 that has received the information about the distance between the portable electronic device 10 and the beacon 2 calculates the location of the portable electronic device 10, in 4140.

For example, the image forming server 900 may calculate the location of the portable electronic device 10 based on the distance information received from the portable electronic device 10, using the trilateration algorithm or the finger printing algorithm.

The image forming server 900 then selects the image forming apparatus 100 within the shortest distance from the user, in 4150.

For example, the image forming server 900 may select the image forming apparatus 100 located at the shortest distance from the user based on the location information of the user, the location information of the image forming apparatus 100 and a map around the user, using the shortest-path algorithm.

Specifically, the image forming apparatus 100 may calculate a first shortest path P1 to the first image forming apparatus 100-1 from where the user is, and calculate the distance of the first shortest path P1, as shown in FIG. 39. Furthermore, the image forming apparatus 100 may calculate a second shortest path P2 to the second image forming apparatus 100-2 from where the user is, and calculate the distance of the second shortest path P2.

After this, the distances of the first and second shortest paths P1 and P2 are compared, and the first image forming apparatus 100-1 with the shorter distance of the shortest path may be selected as an image forming apparatus to perform the printing job of the user.

The image forming server 900 may select the image forming apparatus 100 according to a print option input by the user.

For example, if the user enters the print command for a color image in relation to the color/mono mode, the image forming server 900 may search image forming apparatuses available to print color images among the registered image forming apparatuses, and select the image forming apparatus 100 within the shortest distance from the user from among the image forming apparatuses available to print color images.

In another example, if there are lots of things to print out, the image forming server 900 may search the registered image forming apparatuses for ones having sufficient toner left, and select the image forming apparatus 100 within the shortest distance from the user from among the image forming apparatuses that have sufficient toner left.

In another example, as for the size of the print medium, if the user enters the print command for an image of B5 size (ISO standard size, 176 mm×250 mm), the image forming server 900 may search the registered image forming apparatuses for ones available to supply print media of B5 size, and select the image forming apparatus 100 within the shortest distance from the user from among the image forming apparatuses available to supply print media of B5 size.

In this regard, the image forming server 900 may request information about the image forming apparatus 100 from the registered image forming apparatus 100.

For example, the image forming server 900 may communicate with the image forming apparatus 100 using e.g., Simple Network Management Protocol (SNMP), and while in communication with the image forming apparatus 100, request product information (model name of the image forming apparatus, maximum resolution, size of printable print media, information relating to color/mono mode, remaining amount of toner or ink, remaining quantity of print medium, etc.) or operation information (whether image forming operation is being performed, remaining quantity of image forming, etc.) of the image forming apparatuses 100 from the image forming apparatus 100.

The image forming server 900 then sends a printer map and information about a location of the user to the portable electronic device 10, in 4160.

The image forming server 900 generates the printer map representing location information of the selected image forming apparatus 100 and information about a path to the selected image forming apparatus 100, and send the generated printer map and the location information of the user to the portable electronic device 10.

The image forming server 900 also sends a printing job to the selected image forming apparatus 100, in 4170.

The portable electronic device 10 that has received the printer map and location information of the user from the image forming server 900 displays the printer map and location information of the user, in 4180.

Specifically, the terminal controller 70 of the portable electronic device 10 adds the location information of the portable electronic device 10 onto the printer map received from the image forming server 900, and the terminal interface 40 displays the printer map to which the location information of the portable electronic device 10 is added.

For example, the portable electronic device 10 displays a second printer map PM2 in which an image of the user U, an image of the first image forming apparatus 100-1, and a path P1 to the first image forming apparatus 100-1 are displayed on a map around the user, as shown in FIG. 40.

The user U may determine the path P1 to the first image forming apparatus 100-1 based on the location of the user U through the second printer map PM2.

Furthermore, the image forming apparatus 100 that has received the printing job from the image forming server 900 performs image forming operation according to a distance to the user, in 4190.

Specifically, if the user approaches the image forming apparatus 100, the image forming system 1 may perform user authentication operation, image forming preparation operation, and image forming operation in order, based on the distance between the user and the image forming apparatus 100.

According to the image forming operation as described above, the image forming apparatus 100 located at the nearest distance from the user may perform a printing job, and the user may check the path to the image forming apparatus 100 that performs the printing job.

Several embodiments have been described, but a person of ordinary skill in the art will understand and appreciate that various modifications can be made without departing the scope. Thus, it will be apparent to those ordinary skilled in the art that the disclosure is not limited to the embodiments described, which have been provided only for illustrative purposes.

The invention claimed is:

1. A user equipment comprising:
a transceiver to receive at least one beacon advertising signal; and
a processor to:
receive a command to register a location of an image forming apparatus,
measure a received signal strength of the at least one beacon advertising signal,
determine a location of the user equipment based on the determined signal strength of the at least one beacon advertising signal, and
control the transceiver to transmit a printing job to the image forming apparatus,
wherein the location of the image forming apparatus is registered in an image forming server of an image forming system including the image forming apparatus based on the determined location of the user equipment.

2. The user equipment of claim 1,
wherein the at least one beacon advertising signal includes identification information of the image forming apparatus, and
wherein the processor controls the transceiver to transmit the printing job to the image forming apparatus in response to the identification information of the image forming apparatus.

3. The user equipment of claim 2, wherein the at least one beacon advertising signal is transmitted to the user equipment in a wireless signal broadcasted from the beacon, and the wireless signal includes information about an output intensity of the wireless signal.

4. The user equipment of claim 1,
wherein the at least one beacon advertising signal includes identification information of the image forming server connected to the beacon,
wherein the processor controls the transceiver to transmit the printing job to the image forming server in response to the identification information of the image forming apparatus, and
wherein the printing job is transmitted from the image forming server to the image forming apparatus.

5. The user equipment of claim 1, further comprising a display,
wherein the processor receives the location information of the image forming apparatus through the transceiver, and displays the location information of the image forming apparatus on the display.

6. The user equipment of claim 5, wherein the location information includes a path for reaching the image forming apparatus.

7. The user equipment of claim 5, wherein the location information includes a direction indicator for reaching the image forming apparatus.

8. The user equipment of claim 1, wherein the command to register the location of the image forming apparatus is received from a user of the user equipment.

9. The user equipment of claim 1, wherein the command to register the location of the image forming apparatus is received from the image forming apparatus.

10. The user equipment of claim 1, wherein the processor determines if the user terminal is located at a close distance to the image forming apparatus.

11. The user equipment of claim 1,
wherein the transceiver receives an advertising signal of the image forming apparatus, and
wherein the processor sets a received signal strength offset of the image forming apparatus advertising signal.

* * * * *